(12) United States Patent
Miyasaka et al.

(10) Patent No.: US 8,295,143 B2
(45) Date of Patent: Oct. 23, 2012

(54) ABERRATION CORRECTING DEVICE, OPTICAL DEVICE, AND OPTICAL HEAD DEVICE

(75) Inventors: Koji Miyasaka, Koriyama (JP); Takuji Nomura, Koriyama (JP); Koichi Murata, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/096,783

(22) Filed: Apr. 28, 2011

(65) Prior Publication Data

US 2011/0199884 A1 Aug. 18, 2011

Related U.S. Application Data

(63) Continuation of application No. PCT/JP2009/068685, filed on Oct. 30, 2009.

(30) Foreign Application Priority Data

| Oct. 31, 2008 | (JP) | 2008-281615 |
| Dec. 5, 2008 | (JP) | 2008-310927 |
| Mar. 19, 2009 | (JP) | 2009-068414 |
| Jun. 25, 2009 | (JP) | 2009-151262 |

(51) Int. Cl.
*G11B 7/00* (2006.01)

(52) U.S. Cl. ............ 369/112.01; 369/44.23; 369/112.28

(58) Field of Classification Search ............... 369/44.23, 369/44.32, 112.01, 112.02, 112.23, 112.24, 369/94, 22.22, 112.28
See application file for complete search history.

(56) References Cited

U.S. PATENT DOCUMENTS 5,202,875 A * 4/1993 Rosen et al. ............... 369/112.2

(Continued)

FOREIGN PATENT DOCUMENTS

| JP | 2000-067453 | 3/2000 |
| JP | 2005-116045 | 4/2005 |
| JP | 3666632 | 4/2005 |
| JP | 2007-18558 | 1/2007 |

(Continued)

OTHER PUBLICATIONS

International Search Report issued Dec. 15, 2009, in PCT/JP09/068685 filed Dec. 2, 2009.

*Primary Examiner* — Thang Tran
(74) *Attorney, Agent, or Firm* — Oblon, Spivak, McClelland, Maier & Neustadt, L.L.P.

(57) ABSTRACT

The present invention relates to an aberration correcting device comprising: an aberration correcting element which modulates the phase of incident light; and a position adjusting section which can move the aberration correcting element in a direction perpendicular to an optical axis of the incident light, wherein the aberration correcting element includes first and second aberration correction plates, each of which is disposed such that the phase of transmitted light beam differs with transmission position of the incident light beam with the same phase, and the aberration correcting element has a reference arrangement which is an arrangement of the first and second aberration correction plates in which the light beams transmitted through the aberration correcting element have the same phase, and assuming that a point on the first aberration correction plate crossing the optical axis is a point $O_a$ and a point on the second aberration correction plate crossing the optical axis is a point $O_b$ in the reference arrangement, the position adjusting section includes a mechanism which can move the first and second aberration correction plates in a direction perpendicular to the optical axis and the points $O_a$ and $O_b$ in opposite directions from the reference arrangement and/or a mechanism which can rotate and move the first and second aberration correction plates by the same angle in different directions from the reference arrangement with the points $O_a$ and $O_b$ as the center.

31 Claims, 23 Drawing Sheets

U.S. PATENT DOCUMENTS

| | | | |
|---|---|---|---|
| 5,726,436 A * | 3/1998 | Oka et al. | 369/44.23 |
| 6,320,699 B1 * | 11/2001 | Maeda et al. | 369/44.23 |
| 6,751,175 B1 * | 6/2004 | Maeda et al. | 369/112.01 |
| 2008/0107870 A1 | 5/2008 | Kawaguchi et al. | |

FOREIGN PATENT DOCUMENTS

| | | |
|---|---|---|
| WO | 2006/114958 | 11/2006 |

* cited by examiner (a)  (b)

ABERRATION CORRECTING DEVICE, OPTICAL DEVICE, AND OPTICAL HEAD DEVICE

TECHNICAL FIELD

The present invention relates to an aberration correcting device which corrects the aberration of light, an optical device, and an optical head device which performs recording and/or reading (hereinafter, simply referred to as "recording reading") of an optical recording medium (hereinafter, referred to as an "optical disc").

BACKGROUND ART

In an optical head device, light of each wavelength is focused to its approximate diffraction limit in order to perform recording reading of an optical disc. In order to obtain a focusing spot near the diffraction limit, it is necessary to set the aberration of an optical system to a small value. For this reason, strict accuracy is required for the aberration of each optical component used in an optical head device. Moreover, also for the arrangement position of each component, strict accuracy is requested in the assembly process.

As the aberration of an optical disc, there is an astigmatism or a coma aberration occurring due to deviation of the optical axis of the optical system, which is caused by an error of the arrangement position at the time of assembly or the accuracy of an optical component, or by tilt (inclination) with respect to an optical disc. These aberrations become different values in respective optical head devices due to various factors occurring in a manufacturing process even if they are optical head devices with the same optical design. In order to suppress an individual difference in such an aberration, an improvement in the accuracy of an optical component or precise assembly is necessary.

Meanwhile, a plurality of kinds of specifications including a CD with a wavelength of 785 nm and a numerical aperture (NA) of 0.45, a DVD with a wavelength of 660 nm and NA of 0.6, and a "Blu-ray" (registered trademark: hereinafter, referred to as BD) with a wavelength of 405 nm and NA of 0.85 are widely used as optical disc specifications. Generally, in the case of using an objective lens with a high NA, such as an objective lens for a BD, it is necessary to manufacture and assemble optical components more accurately than in the case of using an objective lens with an NA for a DVD, a CD, or the like.

Moreover, in order to perform recording reading of optical discs based on different specifications, a device in which a plurality of objective lenses is provided in one lens holder may be used. In such a case, however, the position of the objective lens holder is almost fixed when one optical system is adjusted. Accordingly, at the time of adjustment of other optical systems, it is necessary to perform assembly in a state where the position adjustment of an objective lens cannot be sufficiently performed.

For example, in such a case, an out-of-specification aberration may occur when focusing light on an optical disc because deviation of an optical axis occurs in other optical systems. In order to suppress such an aberration, an aberration correcting device including a liquid crystal panel which changes the phase of incident light by applying a voltage to liquid crystal in order to correct an aberration occurring in the assembly process of an optical head device has been reported (Patent Citation 1).

In addition, as another aberration correcting device which corrects a coma aberration occurring in the optical system, an aberration correcting device which corrects an aberration by generating a coma aberration component with the opposite sign to the coma aberration occurring in the optical system by performing movement adjustment of the position of one of a pair of light transmissive substrates, which have complementary curved surfaces, by the distance of $\Delta x$ in a direction perpendicular to the optical axis has been reported (Patent Citation 2).

RELATED ART DOCUMENT

Citation List
  [PTL 1] JP-A-2000-67453
  [PTL 2] Japanese Patent No. 3666632

SUMMARY OF INVENTION

Technical Problem

In the aberration correcting device disclosed in Patent Citation 1, however, it is necessary to maintain the orientation of liquid crystal by applying a specific voltage all the time when correcting a fixed amount of aberration in a state where the position of the optical head device including a liquid crystal panel, which performs aberration correction, is fixed. For this reason, there has been a problem in that the optical system becomes large because electric wiring lines or an electric driving circuit for driving a liquid crystal device should be included in an optical component or the driving circuit becomes complicated in order to realize stabilization of a supply voltage because a stable voltage should be supplied throughout in order to keep the amount of aberration correction constant. In addition, since a refractive index change caused by a temperature change is large when driving liquid crystal, there is a problem in that reliability is insufficient. For this reason, although a circuit which compensates for a temperature change may be added, there has been a problem that the cost increases or the circuit becomes complicated because a temperature sensor needs to be provided externally.

Moreover, in the aberration correcting device disclosed in Patent Citation 2, one light transmissive substrate is made to move by the distance $\Delta x$ only in the X direction and high-order terms equal to or larger than the square of $\Delta x$, among the aberration component amounts calculated when moving the light transmissive substrate, are neglected. Accordingly, when deviation or the inclination of the optical axis of an optical component of an assembled optical head device is large, the component amounts of high-order terms among the aberration component amounts also become large and cannot be neglected. In addition, since an aberration which cannot be corrected occurs, there has been a problem in that the focusing characteristics of the optical head device deteriorate due to such an aberration. In addition, there is an astigmatism as one kind of aberration occurring in assembly of an optical head device. Although this astigmatism component should also be suppressed in order to obtain good focusing characteristics, correction of this astigmatism is not described.

In view of the above-mentioned point, the present invention provides an aberration correcting device comprising:

an aberration correcting element which modulates the phase of incident light; and a position adjusting section which can move the aberration correcting element in a direction perpendicular to an optical axis of the incident light, wherein the aberration correcting element includes first and second aberration correction plates, each of which is disposed such that the phase of transmitted light beam differs with transmission position of the incident light beam with the same phase, and the aberration correcting element has a reference arrangement which is an arrangement of the first and second aberration correction plates in which the light beams transmitted through the aberration correcting element have the same phase, and assuming that a point on the first aberration correction plate crossing the optical axis is a point $O_a$ and a point on the second aberration correction plate crossing the optical axis is a point $O_b$ in the reference arrangement, the position adjusting section includes a mechanism which can move the first and second aberration correction plates in a direction perpendicular to the optical axis and the points $O_a$ and $O_b$ in opposite directions from the reference arrangement and/or a mechanism which can rotate and move the first and second aberration correction plates by the same angle in different directions from the reference arrangement with the points $O_a$ and $O_b$ as the center.

The present invention provides the above-mentioned aberration correcting device wherein the aberration correcting element is an astigmatism correcting element which generates an astigmatism for the incident light, and the first aberration correction plate is a first astigmatism correction plate and the second aberration correction plate is a second astigmatism correction plate, assuming that the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape of a curved surface in which the point $O_a$ on an X-Y plane perpendicular to the optical axis is the origin and a distribution function $f_{1T}(x, y)$ of a phase difference, which is a difference between the phase of the light transmitted through the point $O_a$ and the phase of the light transmitted through an arbitrary position (x, y) of the first astigmatism correction plate, is has a shape of a curved surface as follows $$f_{1T}(x,y)=ax^3+bxy^2+t_Ax+t_By,$$

a/b=−⅓(a, b, $t_A$, $t_B$ are coefficients),
or has a shape obtained by approximating the curved surface to a step shape, and the second astigmatism correction plate has a shape of a curved surface in which the point $O_b$ on the X-Y plane perpendicular to the optical axis is the origin and a distribution function $g_{1T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{1T}(x,y)=-f_{1T}(x/k,y/k),$$

or has a shape obtained by approximating the curved surface to a step shape, and the position adjusting section includes a mechanism which can move the first astigmatism correction plate by a distance $x_0$ along an X axis from the reference arrangement and can move the second astigmatism correction plate by a distance $k \times x_0$ in an opposite direction to the movement direction of the first astigmatism correction plate.

The present invention provides the above-mentioned aberration correcting device wherein the aberration correcting element is an astigmatism correcting element which generates an astigmatism for the incident light, and the first aberration correction plate is a first astigmatism correction plate and the second aberration correction plate is a second astigmatism correction plate, assuming that the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape in which the point $O_a$ on an X-Y plane perpendicular to the optical axis is the origin and a distribution function $f_U(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_U(x,y)=AU(x),$$

(A is a coefficient and U(x) is a step function which is 1 when x≧0 and 0 when x<0), and the second astigmatism correction plate has a shape in which the point $O_b$ on the X-Y plane perpendicular to the optical axis is the origin and a distribution function $g_U(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_U(x,y)=-f_U(x/k,y/k),$$

and the position adjusting section includes a mechanism which can move the first astigmatism correction plate by a distance $x_0$ along an X axis from the reference arrangement and can move the second astigmatism correction plate by a distance $k \times x_0$ in an opposite direction to the movement direction of the first astigmatism correction plate.

The present invention provides the above-mentioned aberration correcting device wherein the aberration correcting element is an astigmatism correcting element which generates an astigmatism for the incident light, and the first aberration correction plate is a first astigmatism correction plate and the second aberration correction plate is a second astigmatism correction plate, assuming that the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape of a curved surface in which the point $O_a$ on an X-Y plane perpendicular to the optical axis is the origin and a distribution function $f_{7T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{7T}(x,y)=Dx^3+t_Ax+t_By,$$

(D, $t_A$, and $t_B$ are coefficients) or has a shape obtained by approximating the curved surface to a step shape, and the second astigmatism correction plate has a shape of a curved surface in which the point $O_b$ on the X-Y plane perpendicular to the optical axis is the origin and a distribution function $g_{7T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{7T}(x,y)=-f_{7T}(x/k,y/k),$$

or has a shape obtained by approximating the curved surface to a step shape, and the position adjusting section includes a mechanism which can move the first astigmatism correction plate by a distance $x_0$ along an X axis from the reference arrangement and can move the second astigmatism correction plate by a distance $k \times x_0$ in an opposite direction to the movement direction of the first astigmatism correction plate.

The present invention provides the above-mentioned aberration correcting device wherein the position adjusting section includes a mechanism which can rotate and move the astigmatism correcting element in a direction perpendicular to the optical axis in a range of 0° to 90° from the reference arrangement with the optical axis as the center.

The present invention provides the above-mentioned aberration correcting device wherein the position adjusting section includes a mechanism which can move the first astigmatism correction plate by a distance $y_0$ along a Y axis from the reference arrangement and can move the second astigmatism correction plate by a distance $k \times y_0$ in an opposite direction to the movement direction of the first astigmatism correction plate.

The present invention provides the above-mentioned aberration correcting device wherein the aberration correcting device has the two astigmatism correcting elements, assuming that the two astigmatism correcting elements are first and second astigmatism correcting elements, respectively, the first astigmatism correcting element includes the first and second astigmatism correction plates, and the second astigmatism correcting element includes a third astigmatism correction plate with the same configuration as the first astigmatism correction plate and a fourth astigmatism correction plate with the same configuration as the second astigmatism correction plate, assuming that the effective diameter of light incident on the third astigmatism correction plate is $D_3$, the effective diameter of light incident on the fourth astigmatism correction plate is $D_4$, and $D_4/D_3$ is an effective diameter ratio k', the second astigmatism correcting element is disposed to have the same phase difference distribution in an arrangement rotated by $(m \times 45)°$ on the X-Y plane perpendicular to the optical axis with respect to the first astigmatism correcting element with the optical axis as the center (m is 1, 3, 5, or 7), and the position adjusting section includes a mechanism which can move the third astigmatism correction plate by a distance $x_0'$ along a direction, which forms an angle of the $(m \times 45)°$ from the X axis, from the reference arrangement and can move the fourth astigmatism correction plate by a distance $k' \times x_0'$ in an opposite direction to the movement direction of the third astigmatism correction plate.

The present invention provides the above-mentioned aberration correcting device wherein the aberration correcting device has a first astigmatism correcting element, which is the astigmatism correcting element, and a second astigmatism correcting element, which is different from the astigmatism correcting element, the first astigmatism correcting element includes the first and second astigmatism correction plates, in the second astigmatism correcting element, third and fourth astigmatism correction plates having a distribution in which the incident light beams with the same phase have different phases at transmission positions, the effective diameter of light incident on the third astigmatism correction plate is set to $D_3$, the effective diameter of light incident on the fourth astigmatism correction plate is set to $D_4$, and $D_4/D_3$ is set to an effective diameter ratio k', a reference arrangement which is an arrangement of the first and second astigmatism correction plates in which the light beams transmitted through the second astigmatism correcting element have the same phase is set, assuming that a point on the third astigmatism correction plate crossing the optical axis is $O_d$ and a point on the fourth astigmatism correction plate crossing the optical axis is $O_e$ in the reference arrangement, the third astigmatism correction plate has a shape of a curved surface in which the point $O_d$ on an X-Y plane perpendicular to the optical axis is an origin and a distribution function $f_{2T}(x, y)$ of a phase difference, which is a difference between the phase of the light transmitted through the point $O_d$ and the phase of the light transmitted through an arbitrary position (x, y) of the third astigmatism correction plate, has a shape of a curved surface as follows $$f_{2T}(x,y)=Ax^2y+t_A x+t_B y$$

(A, $t_A$, and $t_B$ are coefficients) or has a shape obtained by approximating the curved surface to a step shape, and the fourth astigmatism correction plate has a shape of a curved surface in which the point $O_e$ on the X-Y plane perpendicular to the optical axis is the origin and a distribution function $g_{2T}(x, y)$ of a phase difference, which is a difference between the phase of the light transmitted through the point $O_e$ and the phase of the light transmitted through an arbitrary position (x, y) of the fourth astigmatism correction plate, has a shape of a curved surface as follows $$g_{2T}(x,y)=-f_{2T}(x/k, y/k)$$

or has a shape obtained by approximating the curved surface to a step shape, and the position adjusting section includes a mechanism which can move the third astigmatism correction plate by a distance $x_0'$ along an X axis from the reference arrangement and can move the fourth astigmatism correction plate by a distance $k' \times x_0'$ in an opposite direction to the movement direction of the third astigmatism correction plate.

The present invention provides an aberration correcting device comprising:

an aberration correcting element which modulates the phase of incident light; and a position adjusting section which can move the aberration correcting element in a direction perpendicular to an optical axis of the incident light, wherein the aberration correcting element includes first and second astigmatism correction plates, each of which is disposed such that the phase of transmitted light beam differs with transmission position of the incident light beam with the same phase, the effective diameter of light incident on the first astigmatism correction plate is set to $D_1$, the effective diameter of light incident on the second astigmatism correction plate is set to $D_2$, and $D_2/D_1$ is set to an effective diameter ratio k, a reference arrangement which is an arrangement of the first and second astigmatism correction plates in which the light beams transmitted through the aberration correcting element have the same phase is set, assuming that a point on the first astigmatism correction plate crossing the optical axis is $O_a$ and a point on the second astigmatism correction plate crossing the optical axis is $O_b$ in the reference arrangement, the first astigmatism correction plate has a shape of a curved surface in which the point $O_a$ on an X-Y plane perpendicular to the optical axis is the origin and a distribution function $f_{1T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{1T}(x,y)=ax^3+bxy^2+t_Ax+t_By,$$

(a/b=−⅓, where a, b, $t_A$, and $t_B$ are coefficients) or has a shape obtained by approximating the curved surface to a step shape, and the second astigmatism correction plate has a shape of a curved surface in which the point $O_b$ on the X-Y plane perpendicular to the optical axis is the origin and a distribution function $g_{1T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{1T}(x,y)=-f_{1T}(x/k,y/k)$$

or has a shape obtained by approximating the curved surface to a step shape, and the position adjusting section includes a mechanism which can move either the first astigmatism correction plate or the second astigmatism correction plate in a direction perpendicular to the optical axis and along X-axis and Y-axis directions.

The present invention provides an aberration correcting device comprising:

an aberration correcting element which modulates the phase of incident light; and a position adjusting section which can move the aberration correcting element in a direction perpendicular to an optical axis of the incident light, wherein the aberration correcting element includes first and second astigmatism correction plates, each of which is disposed such that the phase of transmitted light beam differs with transmission position of the incident light beam with the same phase, the effective diameter of light incident on the first astigmatism correction plate is set to $D_1$, the effective diameter of light incident on the second astigmatism correction plate is set to $D_2$, and $D_2/D_1$ is set to an effective diameter ratio k, a reference arrangement which is an arrangement of the first and second astigmatism correction plates in which the light beams transmitted through the aberration correcting element have the same phase is set, assuming that a point on the first astigmatism correction plate crossing the optical axis is $O_a$ and a point on the second astigmatism correction plate crossing the optical axis is $O_b$ in the reference arrangement, the first astigmatism correction plate has a shape of a curved surface in which the point $O_a$ on an X-Y plane perpendicular to the optical axis is the origin and a distribution function $f_{7T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{7T}(x,y)=Dx^3+t_Ax+t_By,$$

(D, $t_A$, and $t_B$ are coefficients) or has a shape obtained by approximating the curved surface to a step shape, and the second astigmatism correction plate has a shape of a curved surface in which the point $O_b$ on the X-Y plane perpendicular to the optical axis is the origin and a distribution function $g_{7T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{7T}(x,y)=-f_{7T}(x/k,y/k),$$

or has a shape obtained by approximating the curved surface to a step shape, and the position adjusting section includes a mechanism which can move either the first astigmatism correction plate or the second astigmatism correction plate in a direction perpendicular to the optical axis and along an X-axis direction.

The present invention provides an aberration correcting device comprising:

an aberration correcting element which modulates the phase of incident light; and a position adjusting section which can move the aberration correcting element in a direction perpendicular to an optical axis of the incident light, wherein the aberration correcting element includes first and second astigmatism correction plates, each of which is disposed such that the phase of transmitted light beam differs with transmission position of the incident light beam with the same phase, the effective diameter of light incident on the first astigmatism correction plate is set to $D_1$, the effective diameter of light incident on the second astigmatism correction plate is set to $D_2$, and $D_2/D_1$ is set to an effective diameter ratio k, a reference arrangement which is an arrangement of the first and second astigmatism correction plates in which the light beams transmitted through the aberration correcting element have the same phase is set, assuming that a point on the first astigmatism correction plate crossing the optical axis is $O_a$ and a point on the second astigmatism correction plate crossing the optical axis is $O_b$ in the reference arrangement, the first astigmatism correction plate has a shape of a curved surface in which the point $O_a$ on an X-Y plane perpendicular to the optical axis is an origin and a distribution function $f_{8T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{8T}(x,y)=Ex^2y+Fx^2+t_Ax+t_By,$$

(E, F, $t_A$, and $t_B$ are coefficients) or has a shape obtained by approximating the curved surface to a step shape, and the second astigmatism correction plate has a shape of a curved surface in which the point $O_b$ on the X-Y plane perpendicular to the optical axis is the origin and a distribution function $g_{8T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{8T}(x,y)=-f_{8T}(x/k,y/k),$$

or has a shape obtained by approximating the curved surface to a step shape, and the position adjusting section includes a mechanism which can move either the first astigmatism correction plate or the second astigmatism correction plate in a direction perpendicular to the optical axis and along an X-axis direction.

The present invention provides an aberration correcting device comprising:

an aberration correcting element which modulates the phase of incident light; and a position adjusting section which can move the aberration correcting element in a direction perpendicular to an optical axis of the incident light, wherein the aberration correcting element includes first and second coma aberration correction plates, each of which is disposed such that the phase of transmitted light beam differs with transmission position of the incident light beam with the same phase, the effective diameter of light incident on the first coma aberration correction plate is set to $D_1$, the effective diameter of light incident on the second coma aberration correction plate is set to $D_2$, and $D_2/D_1$ is set to an effective diameter ratio k, a reference arrangement which is an arrangement of the first and second coma aberration correction plates in which the light beams transmitted through the aberration correcting element have the same phase is set, assuming that a point on the first coma aberration correction plate crossing the optical axis is $O_a$ and a point on the second coma aberration correction plate crossing the optical axis is $O_b$ in the reference arrangement, the first coma aberration correction plate has a shape of a curved surface in which the point $O_a$ on an X-Y plane perpendicular to the optical axis is the origin and a distribution function $f_{9T}(x, y)$ of a phase difference, which is a difference between the phase of the light transmitted through the point $O_a$ and the phase of the light transmitted through an arbitrary position (x, y) of the first coma aberration correction plate, has a shape of a curved surface as follows $$f_{9T}(x,y) = Gx^2(x^2+Hy^2) + Jx^2 + t_A x + t_B y,$$

(G, H, J, $t_A$, and $t_B$ are coefficients) or has a shape obtained by approximating the curved surface to a step shape, and the second coma aberration correction plate has a shape of a curved surface in which the point $O_b$ on the X-Y plane perpendicular to the optical axis is the origin and a distribution function $g_{9T}(x, y)$ of a phase difference, which is a difference between the phase of the light transmitted through the point $O_b$ and the phase of the light transmitted through an arbitrary position (x, y) of the second coma aberration correction plate, has a shape of a curved surface as follows $$g_{9T}(x,y) = -f_{9T}(x/k, y/k),$$

or has a shape obtained by approximating the curved surface to a step shape, and the position adjusting section includes a mechanism which can move either the first coma aberration correction plate or the second coma aberration correction plate in a direction perpendicular to the optical axis and along an X-axis direction.

The present invention provides the above-mentioned aberration correcting device wherein the aberration correcting element is formed of a material having a resin.

The present invention provides the above-mentioned aberration correcting device wherein the resin is a material obtained by curing resin monomers containing a fluorine-containing monomer.

The present invention provides the above-mentioned aberration correcting device wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light.

The present invention provides the above-mentioned aberration correcting device wherein the aberration correcting element includes first and second aberration correcting sections, and assuming that the refractive index of the first aberration correcting section with respect to the wavelength $\lambda_1$ is $n_1(\lambda_1)$, the refractive index of the second aberration correcting section with respect to the wavelength $\lambda_1$ is $n_2(\lambda_1)$, the refractive index of the first aberration correcting section with respect to the wavelength $\lambda_2$ is $n_1(\lambda_2)$, and the refractive index of the second aberration correcting section with respect to the wavelength $\lambda_2$ is $n_2(\lambda_2)$, $n_1(\lambda_1)$ and $n_2(\lambda_1)$ are equal and $n_1(\lambda_2)$ and $n_2(\lambda_2)$ are different or $n_1(\lambda_2)$ and $n_2(\lambda_2)$ are equal and $n_1(\lambda_1)$ and $n_2(\lambda_1)$ are different.

The present invention provides an optical device comprising:

a lens; and the aberration correcting device according to any one of claims 2 to 4 and 10 to 12 which is disposed in the optical path of light incident on the lens, wherein the lens is displaced in a direction perpendicular to the optical axis and along to a Y-axis direction.

The present invention provides an optical head device comprising:

a light source;

an objective lens which focuses light emitted from the light source on an information recording surface of an optical disc; and a photodetector which detects signal light reflected from the information recording surface of the optical disc, wherein the aberration correcting device according to any one of claims 1 to 16 is disposed in the optical path between the light source and the objective lens.

Advantageous Effects of Invention

According to the present invention, since a device including liquid crystal capable of changing the optical properties by an applied voltage is not used, electric wiring lines or a circuit for driving liquid crystal is not necessary. In addition, since it becomes possible to correct the coma aberration or the astigmatism occurring in assembly of optical devices, such as an optical head device, without generating a high-order aberration component, an inexpensive and highly reliable phase correcting device and optical head device can be achieved.

DESCRIPTION OF EMBODIMENTS (First Embodiment)

Figure 1:
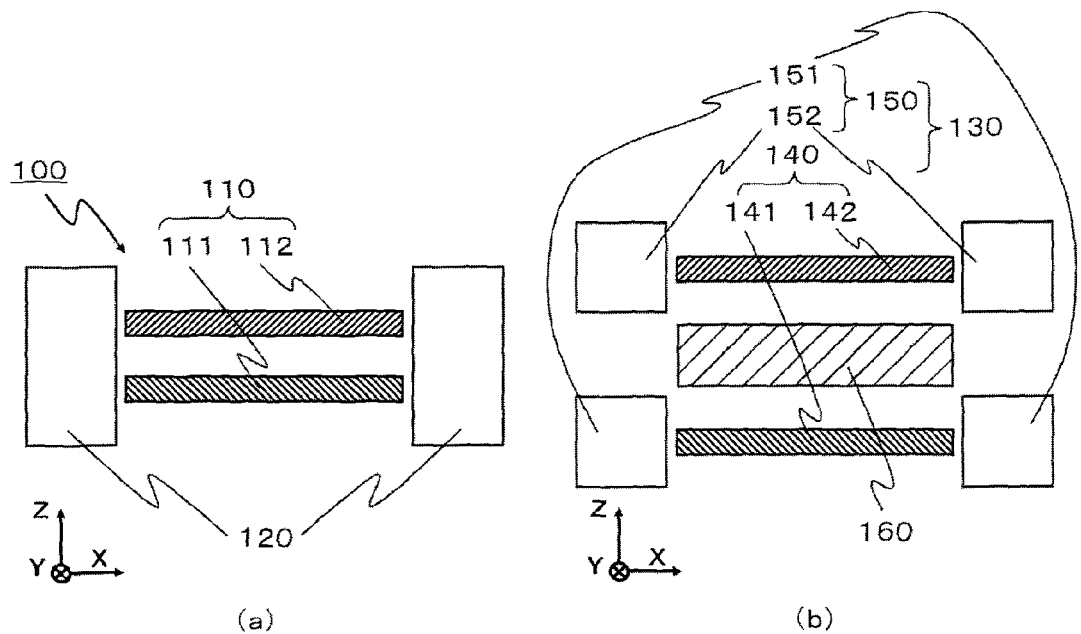
FIGS. 1(a) and 1(b) are schematic views showing the basic configuration of an aberration correcting device.

FIG. 1(a) is a schematic view showing the basic configuration of an aberration correcting device 100 of the present invention, and the aberration correcting device 100 is configured to include a first aberration correction plate 111, a second aberration correction plate 112, and a position adjusting section 120. The first aberration correction plate 111 and the second aberration correction plate 112 are disposed in parallel, and the position adjusting section 120 includes a mechanism which moves the first aberration correction plate 111 and the second aberration correction plate 112 in the parallel direction. In addition, the first aberration correction plate 111 and the second aberration correction plate 112 are collectively called an aberration correcting element 110. In addition, in FIG. 1(a), light propagates in the Z direction to pass through the aberration correcting element 110, and the aberration correcting element 110 can be moved in parallel to the X-Y surface by the position adjusting section.

Specifically, the position adjusting section 120 includes a mechanism which moves the first aberration correction plate 111 and the second aberration correction plate 112 in parallel to the X direction and/or the Y-direction, for example, or a mechanism which moves the first aberration correction plate 111 and the second aberration correction plate 112 so as to rotate around the optical axis (Z direction) of incident light. Such a position adjusting section 120 may include a device capable of performing manual adjustment, such as a micrometer, or a device capable of controlling the position adjustment of the first aberration correction plate 111 and the second aberration correction plate 112 electrically by motor driving, such as an actuator, for example. In addition, the position adjusting section 120 may include a holder for exclusive use in order to make it easy to move the first aberration correction plate 111 and the second aberration correction plate 112 in parallel. These functions can be applied in the following embodiments.

In addition, although the aberration correcting device 100 in FIG. 1(a) shows a configuration in which the first aberration correction plate 111 and the second aberration correction plate 112 are disposed so as to be adjacent to each other, this is not limited to this. FIG. 1(b) is a schematic view showing the configuration of an aberration correcting device 130 which is different from the aberration correcting device 100, and shows an optical system in which an optical element 160 is disposed between a first aberration correction plate 141 and a second aberration correction plate 142. In this case, even when a first position adjusting section 151, which moves the first aberration correction plate 141 in a direction perpendicular to the optical axis, and a second position adjusting section 152, which moves the second aberration correction plate 142 in a direction perpendicular to the optical axis, are disposed so as to be spaced apart from each other, the first position adjusting section 151 and the second position adjusting section 152 are collectively called a position adjusting section 150. In addition, when there are three or more aberration correction plates, as will be described later, and they are disposed in the optical path so as to be spaced apart from each other without being adjacent to each other, aberration correction plates having a function of adjusting the positions of these aberration correction plates are collectively called a position adjusting section. Moreover, in other embodiments to be described later, for example, in the case of disposing two aberration correction plates and moving only one plate, a position adjusting section which moves only an aberration correction plate to be moved may be disposed.

Here, although an aberration correction plate may be independently present in the optical path, the aberration correction plate may be laminated on other optical elements and be moved together with the laminated optical elements, for example. In this case, it is preferable that the optical properties of the optical element itself on which an aberration correction plate is laminated are largely unchanged even if they move in a direction perpendicular to the optical axis. In addition, in the aberration correcting device 130 shown in FIG. 1(b), light propagates in the Z direction and moves to the X-Y plane perpendicular to the optical axis (Z direction). However, the aberration correcting device 130 is not limited to this. For example, when a rising prism which deflects light by 90° is disposed in the optical path between the first aberration correction plate 141 and the second aberration correction plate 142, the movement direction may be the combination of a direction of the Y-Z plane and a direction of the X-Y plane, for example. In addition, although the direction perpendicular to the optical axis is set, the movement direction is not limited to this and they may be disposed so as to have an inclination from the direction perpendicular to the optical axis. This is preferable in a point that reflected light generated in the interface with different refractive indices does not become stray light with respect to the optical system. Thus, in the case of disposing the aberration correction plate with an inclination from the direction perpendicular to the optical axis, it is preferable to design an aberration correction plate so that aberration correction can be satisfactory performed.

In addition, when the optical element 160 serves as a lens and has a function of changing the effective diameter of transmitted light, it is possible to consider a combination in which light propagates through the first aberration correction plate 141 in FIG. 1(b) while the effective diameter of light diverges so that it propagates as parallel light whose effective diameter is not changed by the optical element 160. In this case, it is preferable to perform the design in consideration of the effective diameter of light incident on these aberration correction plates. The following explanation will be given assuming that a plurality of aberration correction plates is disposed so as to be adjacent to each other and the optical axis of light incident on these aberration correction plates is in the same direction (Z direction) so that spreading/narrowing and divergence/convergence of the effective diameter of light in the propagation direction can be neglected, that is, an aberration correcting device is disposed in an optical system in which the effective diameter of light incident on these aberration correction plates is equal. In addition, the effective diameter refers to a diameter of a circular region where the light intensity approximated by Gaussian distribution is equal to or larger than $1/e^2$ on the plane perpendicular to the optical axis assuming that the light intensity of a point crossing the optical axis is 1.

Figure 2:
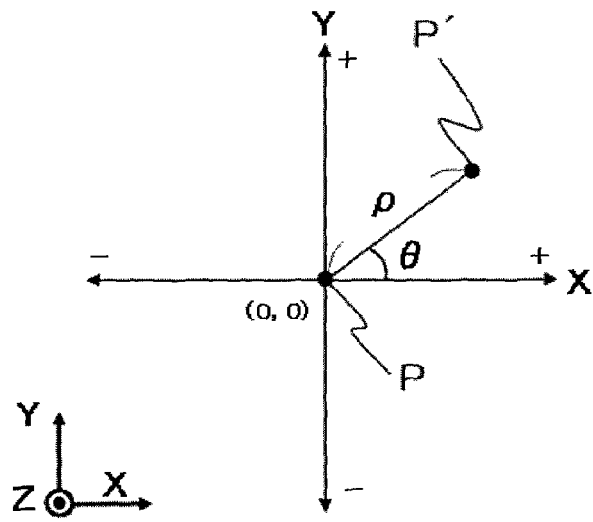
FIG. 2 is a view showing the polar coordinates of the plane perpendicular to the optical axis.

Next, an astigmatism and a coma aberration occurring in the optical system will be described. FIG. 2 is a schematic view showing the plane perpendicular to the optical axis of light including an astigmatism and a coma aberration, and the point P is assumed to be an optical axis (center of light). In addition, it is assumed that the optical axis direction is a Z direction and the plane perpendicular to the Z direction is the X-Y plane. In this case, polar coordinates having the point P as the origin is considered; an arbitrary point on the X-Y plane other than the point P is set as a point P', the distance of P-P' is set as ρ, and the angle between the X axis as a reference and the line segment P-P' is θ. In addition, regarding the angle θ, a counterclockwise direction with the X axis as a reference is assumed to be positive. In this case, the astigmatism and the coma aberration occur due to the difference of phases of light transmitted through each position of the X-Y plane. In particular, when a difference (=phase difference) between the phase of light, which is transmitted through the point P, as a reference and the phase of light, which is transmitted through each position (τ, θ), is considered, the astigmatism occurring symmetrically with the X and Y directions as axes has the relationship of (1a) assuming that a function of the astigmatism in the polar coordinate is A(ρ, θ).

$$A(\rho,\theta) \propto \rho^2(2\cos^2\theta - 1) \tag{1a}$$

In addition, the astigmatism occurring symmetrically with directions of θ=45° and θ=135° as axes has the relationship of (1b).

$$A(\rho,\theta) \propto \rho^2 \sin\theta \cdot \cos\theta \tag{1b}$$

Similarly, assuming that the phase of light transmitted through the point P is a reference and the function of the coma aberration in the polar coordinates is C(ρ, θ), the coma aberration occurring with the X direction as an axis has the relationship of (2a).

$$C(\rho,\theta) \propto (3\rho^3 - 2\rho)\cos\theta \tag{2a}$$

In addition, the coma aberration occurring with the Y direction as an axis has the relationship of (2b).

$$C(\rho,\theta) \propto (3\rho^3 - 2\rho)\sin\theta \tag{2b}$$

The aberration correcting device 100 of the present invention generates the distribution of the phase difference corresponding to expression (1a), expression (1b), expression (2a), or expression (2b) by moving the first aberration correction plate 111 and the second aberration correction plate 112 in a direction perpendicular to the optical axis. Then, the aberration correcting device 100 corrects the aberration by offsetting the astigmatism and the coma aberration occurring in another optical system by the distribution of the phase difference. For example, when the astigmatism of $4\rho^2(2\cos^2\theta-1)$ occurs in another optical system, it is preferable to offset it by generating the astigmatism of $-4\rho^2(2\cos^2\theta-1)$ in the aberration correcting device 100. First, in the first embodiment, an aberration correcting device which corrects the astigmatism occurring especially when an optical component is disposed so as to be shifted from the optical axis, among aberrations occurring due to assembly adjustment of each optical component which forms an optical head device, will be described.

Figure 3:
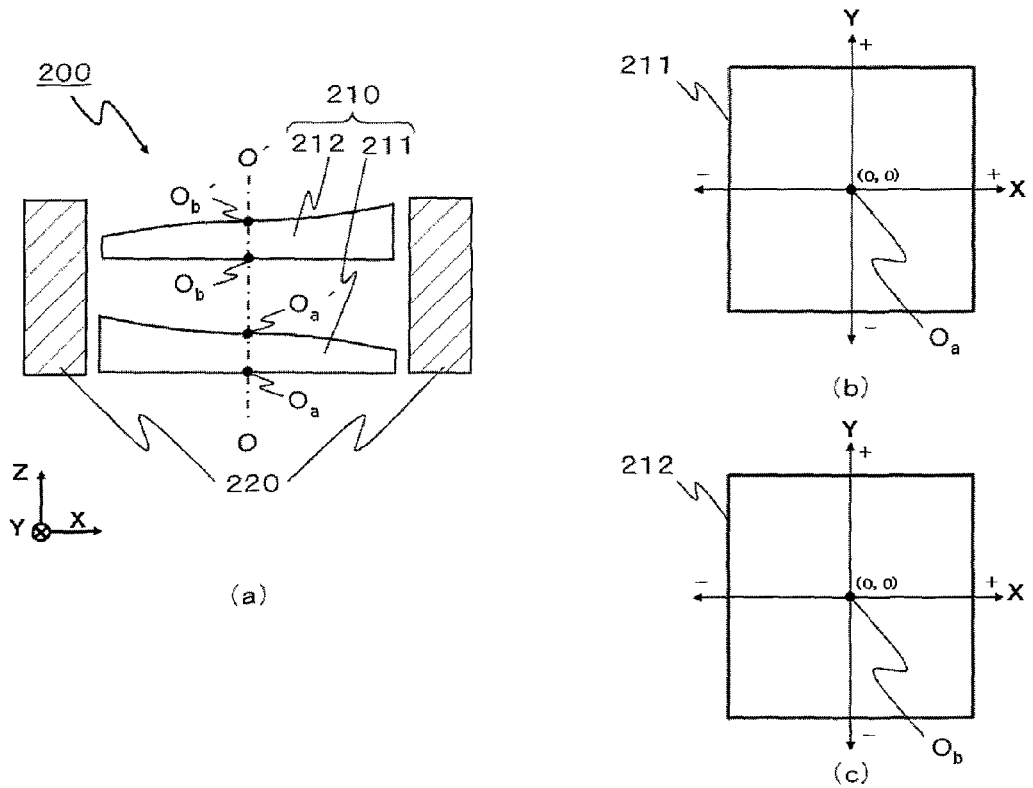
FIG. 3(a) is a schematic view of an astigmatism correcting device related to a first embodiment.
FIGS. 3(b) and 3(c) are schematic plan views of a first astigmatism correction plate and a second astigmatism correction plate.

FIG. 3(a) is a schematic view showing an aberration correcting device 200 for correcting especially the astigmatism, as the aberration correcting device 100 in FIG. 1(a). The aberration correcting device 200 is configured to include an astigmatism correcting element 210, which includes a first astigmatism correction plate 211 and a second astigmatism correction plate 212, and a position adjusting section 220. In addition, FIGS. 3(b) and 3(c) show schematic planar views of the first astigmatism correction plate 211 and the second astigmatism correction plate 212, respectively.

In addition, the first astigmatism correction plate 211 and the second astigmatism correction plate 212 are configured to have different distribution in the thickness (Z direction) of the X-Y plane. In addition, the shape of the outer edge of two astigmatism correction plates is not limited to the rectangular shape shown in FIGS. 3(b) and 3(c), and there is no particular limitation as long as the shape includes the entire region (effective region) where aberration correction is to be performed due to incident light. In addition, various materials, such as a resin plate, a resin film, glass, or quartz glass, may be used for the two astigmatism correction plates as long as they are transparent for incident light. In addition, the two astigmatism correction plates may be formed of a birefringent material showing birefringence without being limited to an isotropic material showing an optically isotropic property, or each astigmatism correction plate may be formed of a material with a different refraction index. In addition, for example, using a material having wavelength dependency of a refractive index (wavelength dispersion characteristic), the two astigmatism correction plates may be formed using a material which generates distribution of the phase difference for light with a wavelength $\lambda_1$ and does not generate the phase difference for light with a wavelength $\lambda_2$ ($\lambda_1 \neq \lambda_2$), for example, pigment or dye and a multi-layered film. In this case, they may be formed of two materials among other materials with the same refractive index as the refractive index with respect to the light with a wavelength $\lambda_2$. The following explanation will be given assuming for the sake of simplicity that both the astigmatism correction plates are formed of an isotropic material with a refractive index of $n_s$. In addition, these configurations can be applied in the following embodiments.

Next, the relationship between light incident on the astigmatism correcting element 210 and the phase of transmitted light will be described. In the case of the first astigmatism correction plate 211 shown in FIG. 3(a), transmitted light has distribution of a phase corresponding to the thickness of the first astigmatism correction plate 211, compared with light incident from the surface on the side of a point $O_a$ with the same phase. Similarly, in the case of the second astigmatism correction plate 212, transmitted light has distribution of a phase corresponding to the thickness of the second astigmatism correction plate 212, compared with light incident from the surface on the side of a point $O_b$ with the same phase. In addition, although FIG. 3(a) shows an arrangement in which both the light incidence sides of the first astigmatism correction plate 211 and the second astigmatism correction plate 212 are flat surfaces, two astigmatism correction plates may be disposed such that their flat surface and curved surface face each other as long as the phase difference distribution, which will be described later, can be acquired, without being limited to the above arrangement.

The points $O_a$ and $O_a'$ of the first astigmatism correction plate 211 are points present on two surfaces of the first astigmatism correction plate 211, and both the points are present on one normal line of the X-Y plane. Similarly, the points $O_b$ and $O_b'$ of the second astigmatism correction plate 212 are points present on two surfaces of the second astigmatism correction plate 212, and both the points are present on one normal line of the X-Y plane. In addition, as shown in FIGS. 3(b) and 3(c), each of the points $O_a$ and $O_b$ is located in the middle and is set as (Cartesian) coordinates (x, y)=(0, 0) in the X-Y plane.

Figure 4:
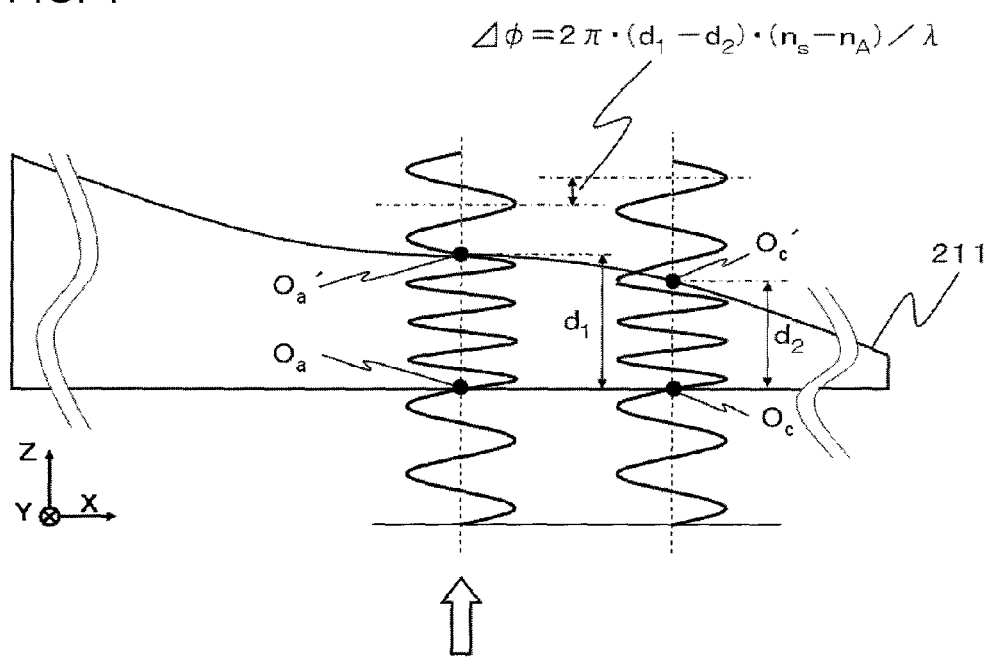
FIG. 4 is a schematic view explaining the thickness of an aberration correction plate and the phase difference of light which is incident and emitted in the same phase.

FIG. 4 shows a cross-sectional surface including the points $O_a$ and $O_a'$ of the first astigmatism correction plate 211 which has thickness distribution as an example, and is a schematic view for explaining the phase of transmitted light. Here, it is assumed that light with a wavelength $\lambda$ is incident with the same phase from the normal line direction (Z direction) of the X-Y plane including the point $O_a$. In addition, the line-segment $O_a$-$O_a'$ is equivalent to the thickness $d_1$ and the line-segment $O_c$-$O_c'$ is equivalent to the thickness $d_2$ ($d_1 \neq d_2$). Here, a phase difference $\Delta\phi$ of light beams transmitted therethrough is considered. When the refractive index of the first astigmatism correction plate 211 is $n_s$ and the refractive index of a medium present on the transmission side of light is $n_A$, the difference (=Optical path length difference) between the path length of light transmitted through the position of the thickness $d_1$ and the path length of light transmitted through the position of the thickness $d_2$ becomes $(d_1-d_2)\cdot(n_s-n_A)$ in the first astigmatism correction plate 211, as shown in FIG. 4. Accordingly, the phase difference $\Delta\phi$ can be expressed as (3a).

$$\Delta\phi = 2\pi \cdot (d_1-d_2) \cdot (n_s-n_A)/\lambda \text{[rad]} \tag{3a}$$

In addition, when the medium on the light transmission side is air, $n_A=1$. Accordingly, the above expression (3a) can be expressed as (3b).

$$\Delta\phi = 2\pi \cdot (d_1-d_2) \cdot (n_s-1)/\lambda \text{[rad]} \tag{3b}$$

In addition, the relationship of the phase difference between light transmitted through the point $O_a$, which is the origin of the (Cartesian) coordinates on the X-Y plane of the first astigmatism correction plate 211, and light transmitted through the arbitrary position (x, y) on the X-Y plane in the Z direction is set as a function expressed as $f_1(x, y)$. In this case, the first astigmatism correction plate 211 is configured such that the distribution $f_1(x, y)$ of the phase difference becomes (4a).

$$f_1(x,y) = ax^3 + bxy^2 \tag{4a}$$

(where $a/b = -1/3$)

For example, when the first astigmatism correction plate 211 is formed of a material with a refractive index of $n_s$, the thickness distribution is given on the basis of expression (3a) or (3b) so as to satisfy expression (4a). That is, a thickness on each coordinates may be given with $d_2$ of expression (3a) or (3b) as a variable of the thickness corresponding to the coordinates (x, y). In addition, the values of a and b are coefficients which gives the size of the phase difference, and the size of the astigmatism to be corrected may be determined by the size of the amount of displacement ($x_0$) as will be described later.

In addition, the thickness distribution may be given to have a physical curved surface which satisfies expression (4a), or may be given such that the cross section has a step shape by approximating the above expression (4a) to have a step difference, for example. As a method of giving a physical curved surface, it is possible to use cutting, electron beam processing, lithography, injection molding, and the like. Here, for the cross section with a step shape, the maximum gap (height) of the shape of the curved surface of the first astigmatism correction plate 211 corresponding to the distribution given by expression (4a) is divided into a plurality of (N) ranges, and the heights (thicknesses) included in one range are made to approximate to the same height (thickness). In this case, since it can also be made to have a shape with the number of steps of N, it can be approximated from N=2 or more. It is preferable if N is 4 or more, and it is more preferable if N is 8 or more since it becomes close to the curved surface shape.

Moreover, as a method of giving a physical curved surface, it is possible to use a method of applying resin monomers on a planar substrate, interposing the resin monomers with an uneven molded substrate and then curing it with ultraviolet rays or the like, and releasing the molded substrate or a method of injecting resin monomers into the gap made when the planar substrate and the molded substrate are made to face each other. Although release processing may be performed on the molded substrate in order to generate the release property, using resin containing a fluorine-containing monomer is preferable since release processing on the molded substrate is not necessary. Instead of the fluorine-containing monomer, a fluorine-containing surfactant or resin containing fluoropolymer may be used. In addition, resin monomers which can be used are listed below.

The resin monomer is not particularly limited as long as it is a monomer having a polymerizable group. Preferable examples of the resin monomer include a monomer having an acryloyl group or a methacryloyl group, a monomer having a vinyl group, and a monomer having an allyl group or a monomer having a an oxiranyl group, and a monomer having an acryloyl group or a methacryloyl group is more preferable. The number of polymerizable groups in the main monomer is preferably 1 to 4, more preferably 1 to 2, and particularly preferably 1.

Preferable examples of the monomer having a polymerizable group include (meth)acrylic acid, (meth)acrylate, (meth)acrylamide, vinyl ether, vinyl ester, allyl ether, allyl ester, or styrene-based compounds and particularly preferably (meth)acrylate. However, in the specification, acryl acid and methacryl acid are collectively referred to as (meth)acryl acid, acrylate and methacrylate are collectively referred to as (meth)acrylate, and acryl amide and methacryl amide are collectively referred to as (meth)acryl amide.

Specific examples of the (meth)acrylate include the following compounds.

Mono(meth)acrylates such as phenoxyethyl (meth)acrylate, benzyl (meth)acrylate, stearyl (meth)acrylate, lauryl (meth)acrylate, 2-ethyl hexyl (meth)acrylate, ethoxyethyl (meth)acrylate, methoxyethyl (meth)acrylate, glycidyl (meth)acrylate, tetrahydrofurfuryl (meth)acrylate, allyl (meth)acrylate, 2-hydroxyethyl (meth)acrylate, 2-hydroxypropyl (meth)acrylate, N,N-diethyl aminoethyl (meth)acrylate, N,N-dimethyl aminoethyl (meth)acrylate, dimethyl aminoethyl (meth)acrylate, methyl adamantyl (meth)acrylate, ethyl adamantyl (meth)acrylate, hydroxyadamantyl (meth)acrylate, adamantyl (meth)acrylate, isobornyl (meth)acrylate are exemplified.

In addition, di(meth)acrylates such as 1,3-butanediol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, neopentyl glycol di(meth)acrylate, polyoxyethylene glycol di(meth)acrylate, tripropylene glycol di(meth)acrylate are exemplified. In addition, (meth)acrylates having four or more polymerizable groups such as dipentaerythritol hexa(meth)acrylate are exemplified.

Specific examples of the vinyl ether include alkyl vinyl ethers such as ethyl vinyl ether, propyl vinyl ether, isobutyl vinyl ether, 2-ethylhexyl vinyl ether, cyclohexyl vinyl ether, (hydroxyalkyl)vinyl such as 4-hydroxybutyl vinyl ether. Specific examples of the vinyl ester include vinyl esters such as vinyl acetate, vinyl propionate, vinyl (iso)butyrate, vinyl valerate, vinyl cyclohexane carboxylate, and vinyl benzoate.

Specific examples of the allyl ether include alkyl allyl ethers such as ethyl allyl ether, propyl allyl ether, (iso)butyl allyl ether and cyclohexyl allyl ether. Examples of the monomer having an oxiranyl group include a monomer having an epoxy group, a monomer having an oxetane group, and a monomer having an oxazoline group.

The fluorine-containing monomer is not particularly limited as long as it is a fluorine-containing monomer having a polymerizable group. Preferable examples of the fluorine-containing monomer include a fluorine-containing monomer having an acryloyl group or a methacryloyl group, a fluorine-containing monomer having a vinyl group, a fluorine-containing monomer having a fluorovinyl group, a fluorine-containing monomer having an allyl group, or a fluorine-containing monomer having an oxiranyl group. The number of polymerizable group in the fluorine-containing monomer is preferably 1 to 4, more preferably 1 or 2 and particularly preferably 1.

In addition, the fluorine-containing monomer is preferably:

(A) Compound represented by the formula $CF_2=CR^1-Q-CR^2=CH_2$ (where, $R^1$ and $R^2$ each independently represent a hydrogen atom, a fluorine atom, an alkyl group having 1 to 3 carbon atoms, a fluoroalkyl group having 1 to 3 carbon atoms, Q represents an oxygen atom, a group represented by the formula $-NR^3-$ ($R^3$ represents a hydrogen atom, an alkyl group having 1 to 6 carbon atoms, an alkyl carbonyl group or a tosyl group) or a divalent organic group which may have a functional group; the same definition applies as well below.)

(B) Compound represented by the formula $(CH_2=CXCOO)_nR^F$ (where, n represents an integer of 1 to 4, X represents a hydrogen atom, a fluorine atom, a methyl group or a trifluoromethyl group, $R^F$ represents an n-valent fluorine-containing organic group having 1 to 30 carbon atoms, provided that when n is 2 to 4, a plurality of X may be the same or different.)

When Q of a compound represented by the formula $CF_2=CR^1-Q-CR^2=CH_2$ is a divalent organic group, it is preferably a group having a main chain comprising a group selected from the group consisting of methylene, dimethylene, trimethylene, tetramethylene, oxymethylene, oxydimethylene, oxytrimethylene and dioxymethylene, a hydrogen atom(s) in the main chain being substituted with a group selected from a fluorine atom, a hydroxyl group, an alkyl group having 1 to 6 carbon atoms, a hydroxyalkyl group having 1 to 6 carbon atoms, a hydroxyalkyl group having 1 to 6 carbon atoms in which an etheric oxygen atom is interposed between a carbon atom and a carbon atom, and one or more hydrogen atoms that form a carbon atom-hydrogen atom bond(s) in the group being substituted with a fluorine atom(s). Of these, $-CF_2C(CF_3)(OH)CH_2-$, $-CF_2C(CF_3)(OH)-$, $-CF_2C(CF_3)(OCH_2OCH_3)CH_2-$, $-CH_2CH(CH_2C(CF_3)_2(OH)CH_2-$, or $-CH_2CH(CH_2C(CF_3)OH)-$ are particularly preferable. Here, the left side end of the group means to be bonded to $CF_2=CR^1-$.

Specific examples of the compound represented by the formula $CF_2=CR^1-Q-CR^2=CH_2$ include the following:

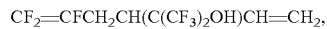

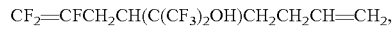

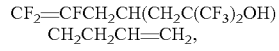

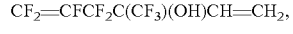

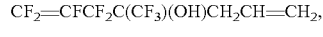

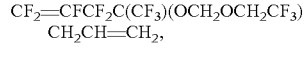

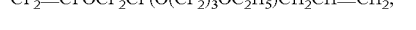

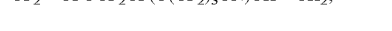

CF$_2$=CFOCF$_2$CF(O(CF$_2$)$_3$PO(OC$_2$H$_5$)$_2$)
CH$_2$CH=CH$_2$,

CF$_2$=CFOCF$_2$CF(OCF$_2$CF$_2$SO$_2$F)CH$_2$CH=CH$_2$.

The symbol n in the compound represented by the formula (CH$_2$=CXCOO)$_n$R$^F$ is preferably 1 or 2. X is preferably a hydrogen atom or a methyl group. The number of carbon atoms of R$^F$ is particularly preferably 4 to 24.

When n is 1, R$^F$ is a monovalent fluorine-containing organic group. The monovalent fluorine-containing organic group is preferably a monovalent fluorine-containing organic group having a polyfluoroalkyl group where an etheric oxygen atom may be interposed between a carbon atom and a carbon atom. This monovalent fluorine-containing organic group is particularly preferably a group represented by the formula —(CH$_2$)$_{f1}$R$^{F1}$, —SO$_2$NR$^4$(CH$_2$)$_{f1}$R$_{F1}$, or —(C=O)NR$^4$(CH$_2$)$_{f1}$R$^{F1}$ (where, f1 represents an integer of 1 to 3, R$^{F1}$ represents a polyfluoroalkyl group having 4 to 16 carbon atoms where an etheric oxygen atom may be interposed between a carbon atom and a carbon atom, R$^4$ represents a hydrogen atom, a methyl group, or an ethyl group). The polyfluoroalkyl group (R$^{F1}$) is preferably a perfluoroalkyl group and particularly preferably a linear perfluoroalkyl group.

When n is 2, R$^F$ is a divalent fluorine-containing organic group. The divalent fluorine-containing organic group is preferably a polyfluoroalkylene group where an etheric oxygen atom may be interposed between a carbon atom and a carbon atom, preferably a group represented by formula —(CH$_2$)$_{f2}$R$^{F2}$(CH$_2$)$_{f3}$ (where, f2 and f3 each represent an integer of 1 to 3, R$^{F2}$ represents a polyfluoroalkylene group having 4 to 16 carbon atoms where an etheric oxygen atom may be interposed between a carbon atom and a carbon atom). The polyfluoroalkylene group (R$^{F2}$) is preferably a perfuloroalkylene group, particularly a linear perfluoroalkylene group and a perfluorooxyalkylene group having an etheric oxygen atom interposed between a carbon atom and a carbon atom and having a trifluoromethyl group in a side chain.

In addition, specific examples of the compound represented by formula (CH$_2$=CXCOO)$_n$R$^F$ include the following.

CH$_2$=CHCOO$_2$(CH$_2$)$_2$(CF$_2$)$_8$F,

CH$_2$=CHCOO$_2$(CH$_2$)$_2$(CF$_2$)$_6$F,

CH$_2$=C(CH$_3$)COO$_2$(CH$_2$)$_2$(CF$_2$)$_8$F,

CH$_2$=C(CH$_3$)COO$_2$(CH$_2$)$_2$(CF$_2$)$_6$F,

CH$_2$=CHCOOCH$_2$(CF$_2$)$_7$F,

CH$_2$=C(CH$_3$)COOCH$_2$(CF$_2$)$_7$F,

CH$_2$=CHCOOCH$_2$CF$_2$CF$_2$H,

CH$_2$=CHCOOCH$_2$(CF$_2$CF$_2$)$_4$H,

CH$_2$=C(CH$_3$)COOCH$_2$CF$_2$CF$_2$H,

CH$_2$=C(CH$_3$)COOCH$_2$(CF$_2$CF$_2$)$_4$H,

CH$_2$=CHCOOCH$_2$CF$_2$OCF$_2$CF$_2$OCF$_3$,

CH$_2$=CHCOOCH$_2$CF$_2$O(CF$_2$CF$_2$O)$_3$CF$_3$,

CH$_2$=C(CH$_3$)COOCH$_2$CF$_2$OCF$_2$CF$_2$OCF$_3$,

CH$_2$=C(CH$_3$)COOCH$_2$CF$_2$O(CF$_2$CF$_2$O)$_3$CF$_3$,

CH$_2$=CHCOOCH$_2$(CF$_3$)O(CF$_2$CF(CF$_3$)O)$_2$(CF$_2$)$_3$CF,

CH$_2$=C(CH$_3$)COOCH$_2$CF(CF$_3$)O(CF$_2$CF(CF$_3$)O)$_2$(CF$_2$)$_3$CF,

CH$_2$=CHCOOCH$_2$CF$_2$O(CF$_2$CF$_2$O)$_6$CF$_2$CH$_2$OCOCH=CH$_2$,

CH$_2$=C(CH$_3$)COOCH$_2$CF$_2$O(CF$_2$CF$_2$O)$_6$CF$_2$CH$_2$OCOC(CH$_3$)=CH$_2$,

CH$_2$=CHCOOCH$_2$(CF$_2$)$_4$CH$_2$OCOCH=CH$_2$,

CH$_2$=C(CH$_3$)COOCH$_2$(CF$_2$)$_4$CH$_2$OCOC(CH$_3$)=CH$_2$.

In addition, the fluorine-containing surfactant is preferably a fluorine-containing surfactant having a fluorine content of 10 to 70% by mass, and particularly preferably a fluorine-containing surfactant having a fluorine content of 20 to 40% by mass. The fluorine-containing surfactant may be water-soluble or lipid-soluble.

The fluorine-containing surfactant is preferably an anionic fluorine-containing surfactant, a cationic fluorine-containing surfactant, an amphoteric fluorine-containing surfactant, or a nonionic fluorine-containing surfactant. From the viewpoint of good dispersibility, a nonionic fluorine-containing surfactant is particularly preferable.

The anionic fluorine-containing surfactant is preferably polyfluoroalkyl carboxylate, polyfluoroalkyl phosphate, or polyfluoroalkyl sulfonate. Specific examples of these surfactants include Surflon S-111 (trade name, made by Seimi Chemical Co., Ltd.), Fluorad FC-143 (trade name, made by 3M), Megafac F-120 (trade name, made by Dainippon Ink and Chemicals Inc.).

The cationic fluorine-containing surfactant is preferably a trimethyl ammonium salt of polyfluoroalkyl carboxylate, or a trimethyl ammonium salt of polyfluoroalkyl sulfonic amide. Specific examples of these surfactants include Surflon S-121 (trade name, made by Seimi Chemical Co., Ltd.), Fluorad FC-134 (trade name, made by 3M), Megafac F-450 (trade name, made by Dainippon Ink and Chemicals Inc.).

The amphoteric fluorine-containing surfactant is preferably polyfluoroalkyl betaine. Specific examples of these surfactants include Surflon S-132 (trade name, made by Seimi Chemical Co., Ltd.), Fluorad FX-172 (trade name, made by 3M).

The nonionic fluorine-containing surfactant includes polyfluoroalkyl amine oxide, or polyfluoroalkyl alkylene oxide additives, or an oligomer or a polymer containing monomer unit based on a monomer having a fluoroalkyl group. The fluoroalkyl group is preferably the polyfluoroalkyl group (R$^{F1}$). The nonionic fluorine-containing surfactant is preferably an oligomer or polymer containing monomer unit based on a monomer having a fluoroalkyl group (mass average molecular weight 1000 to 8000). The monomer having a fluoroalkyl group is preferably fluoro(meth)acrylate, and particularly preferably fluoroalkyl (meth)acrylate. The fluoroalkyl (meth)acrylate is preferably a compound represented by the formula (CH$_2$=CXCOO)$_n$R$^F$ in which n represents 1 and X represents a hydrogen atom or a methyl group.

In addition, specific examples of the nonionic fluorine-containing surfactant include Surflon S-145 (trade name, made by Seimi Chemical Co., Ltd.), Surflon S-393 (trade name, made by Seimi Chemical Co., Ltd.), Surflon KH-40 (trade name, made by Seimi Chemical Co., Ltd.), Fluorad FC-170 (trade name, made by 3M), Fluorad FC-430 (trade name, made by 3M), Megafac F-444 (trade name, made by Dainippon Ink and Chemicals Inc.), and Megafac F-479 (trade name, made by Dainippon Ink and Chemicals Inc.).

The fluorine-containing polymer includes fluorine-containing polymers obtained by polymerizing compounds represented by the formula $CF_2=CR^1-Q-CR^2=CH_2$, and fluorine-containing polymer obtained by copolymerizing $CF_2=CF_2$ and $CH_2=CHOCOCH_3$. Specific examples of the compound represented by the formula $CF_2=CR^1-Q-CR^2=CH_2$ include the compound described above.

The fluorine-containing polymer is preferably fluorine-containing polymers obtained by polymerizing compounds represented by the formula $CF_2=CR^1-Q-CR^2=CH_2$. It is particularly preferred that $R^1$ represents a fluorine atom, $R^2$ represents a hydrogen atom, and Q is a group selected from: $-CF_2C(CF_3)(OH)CH_2-$, $-CF_2C(CF_3)(OH)-$, $-CF_2C(CF_3)(OCH_2OCH_3)CH_2-$, $-CH_2CH(CH_2C(CF_3)_2OH)CH_2-$, and $-CH_2CH(CH_2C(CF_3)_2OH)-$.

FIG. 5(a) is a schematic cross-sectional view of a first astigmatism correction plate 211a (solid line) as an example when approximating the curved surface (dotted line) of the first astigmatism correction plate 211 with the number of steps N=8. Here, in the case of the number of steps N=8, it is approximated to each step with the middle height of a possible step difference g when dividing the size of the largest gap in the function shown by expression (4a) equally into seven parts as a reference. In FIG. 5(a), assuming that the step at the highest position is $S_1$ and the other steps, in order, are $S_2, S_3, \ldots$, it is preferable to approximate a position, which is higher than $S_2$ by g/2, and a position, which is lower than $S_2$ by g/2, to the position of $S_2$, for example, for the position of $S_2$. In addition, a similar approximation can also be applied so that the cross section has a step shape in aberration correcting elements related to subsequent embodiments.

In addition, the approximation for the step shape is not limited to the example shown in FIG. 5(a). FIG. 5(b) is a schematic cross-sectional view of a first astigmatism correction plate 211b (solid line) approximated to have the same number of steps (N=8) as in FIG. 5(a) and a different step shape. Here, the approximated maximum and minimum values are determined on the basis of the function shown in expression (4a), and the range of the gap is divided. Specifically, the approximated maximum value is lower than the maximum value of the function of expression (4a) and the approximated minimum value is higher than the minimum value of the function of expression (4a). In FIG. 5(b), the size of the gap of the approximated maximum and minimum values is equally divided into seven parts and eight steps are determined by setting the highest position to $S_1$ and setting $S_2$, $S_3, \ldots, S_8$ in order. In this case, a range where the value of the function of expression (4a) is larger than $S_1$ is approximated with the height of $S_1$, and a range where the value of the function is smaller than $S_1$ and larger than $S_2$ is approximated with the height of $S_2$. In addition, $S_8$ is approximated to a value smaller than $S_7$. In this way, it is also possible to make a step shape with no step difference near the optical axis. In addition, the approximation method is not limited to this, and the approximated maximum value may be higher than the maximum value of the function of expression (4a) and the approximated minimum value may be lower than the minimum value of the function of expression (4a). The number of steps may also be appropriately changed without being limited to 8. In addition, performing approximation such that such a step shape is formed is not limited to the first astigmatism correction plate 211, and may also be applied to the second astigmatism correction plate 212 and each aberration correction plate in the second and subsequent embodiments. However, the following explanation will be given on the basis of an aberration correction plate with a curved surface if it is not specially mentioned.

Next, the second astigmatism correction plate 212 is considered. As shown in FIG. 3(a), the second astigmatism correction plate 212 has distribution of the phase difference (thickness) of light transmitted in the Z direction, similar to the first astigmatism correction plate 211. In addition, assuming that the relationship of the phase difference between light transmitted through the point $O_b$, which is the origin of the (Cartesian) coordinates on the X-Y plane, and light transmitted through the arbitrary position (x, y) on the X-Y plane in the Z direction is a function expressed as $g_1(x, y)$, it has a configuration in which the distribution of the relationship satisfying (4b) is given.

$$g_1(x,y)=-f_1(x,y) \quad (4b)$$

Moreover, in this case, if all surfaces on the light incidence side are flat, it has the same shape as the first astigmatism correction plate 211 if it is rotated by 180° with the Z-direction line, which connects the points $O_b$ and $O_b'$ of the second astigmatism correction plate 212, as an axis. Accordingly, the manufacturing process is easily simplified.

In addition, the above explanation was given on the assumption that the effective diameters of light beams incident on the first astigmatism correction plate 211 and the second astigmatism correction plate 212 were the same as described above. However, when the effective diameter of light incident on each astigmatism correction plate is different, that is, when the effective diameter ratio of the effective diameter $D_2$ of light incident on the second astigmatism correction plate 212 to the effective diameter $D_1$ of light incident on the first astigmatism correction plate 211 is generalized as k ($=D_2/D_1$), it is preferable to have a configuration in which the distribution of the relationship satisfying (4c) is given by transforming the above expression (4b).

$$g_1(x,y)=-f_1(x/k,y/k) \quad (4c)$$

The following explanation will be given assuming that $D_1=D_2$, that is, the effective diameter ratio k=1 for simplicity of explanation.

Moreover, as shown in FIG. 3(a), the points $O_a$ and $O_a'$ of the first astigmatism correction plate 211 and the points $O_b$ and $O_b'$ of the second astigmatism correction plate 212 are disposed to be present on one Z-direction straight line and to satisfy expression (4b). In this case, if light with a wavelength λ is incident from the Z direction, distribution of the phase difference is offset in light transmitted through the astigmatism correcting element 210 from the relationship of expression (4b). The phase of light transmitted through any position becomes equal. That is, $g_1(x, y)+f_1(x, y)=0$. Accordingly, when light is incident on the astigmatism correcting element 210 in the same phase, light transmitted through the astigmatism correcting element 210 has the same phase. Thus, without being limited to the astigmatism correcting element 210, the positional relationship between two aberration correction plates when light incident on the aberration correcting element of the present invention and light transmitted therethrough have the same phase is defined as a "reference arrangement".

Thus, for example, when optical components which form an optical head device are assembled in the ideal state where an aberration does not occur, the phase difference of transmitted light beams can be made not to occur by the first astigmatism correction plate 211 and the second astigmatism correction plate 212 which form the astigmatism correcting element 210. Moreover, when the astigmatism occurs due to assembly of an optical device, such as an optical head device, it is possible to correct the aberration by changing the positions of the first astigmatism correction plate 211 and the second astigmatism correction plate 212, which will be described later. Here, specifically, correcting the astigmatism refers to generating an astigmatism component with the opposite sign to an astigmatism component generated by assembly using the astigmatism correcting element 210.

Figure 6:
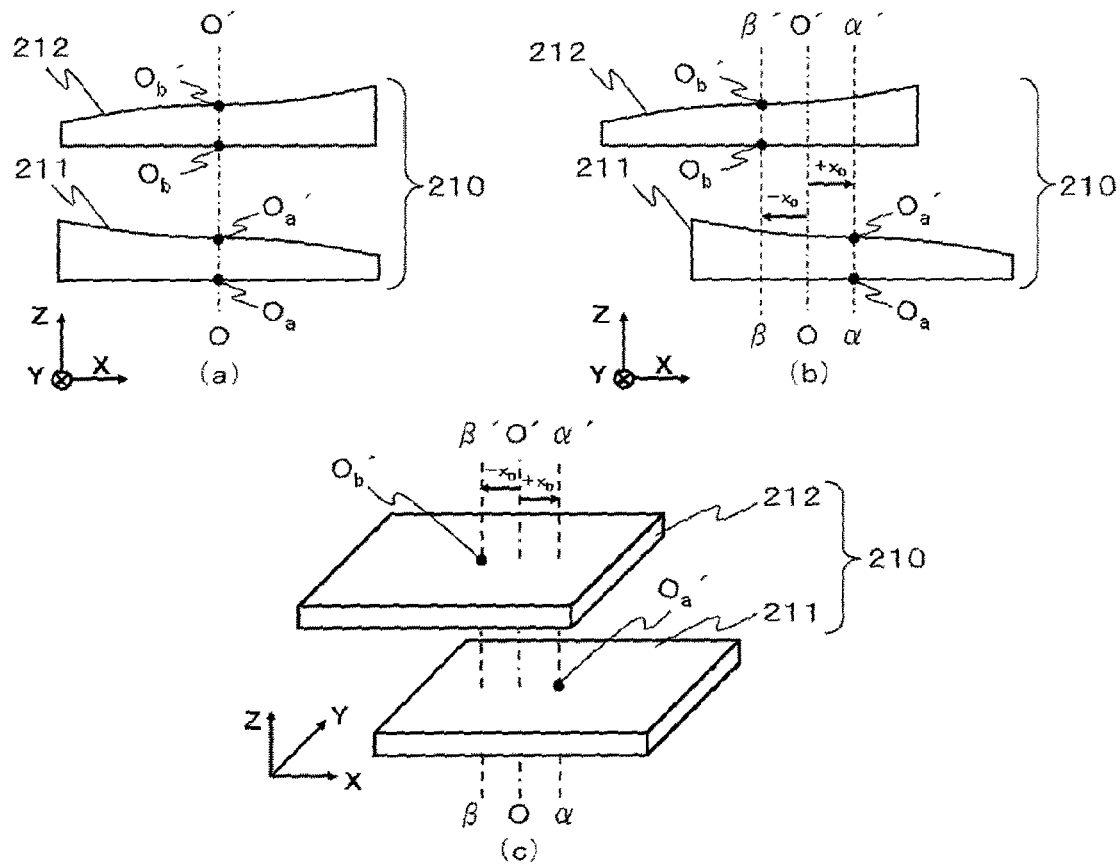
FIGS. 6(a) to 6(c) are schematic views when the astigmatism correcting element related to the first embodiment is moved.

Next, the positional relationship between the first astigmatism correction plate 211 and the second astigmatism correction plate 212 for correcting the astigmatism when the astigmatism occurs by assembly of an optical device, such as an optical head device, and the principle will be described. FIG. 6 shows the positional relationship between two astigmatism correction plates which form the astigmatism correcting element 210. FIG. 6(*a*) shows the same arrangement as in FIG. 3(*a*), that is, positional relationship in which the points $O_a$ and $O_a'$ of the first astigmatism correction plate 211 and the points $O_b$ and $O_b'$ of the second astigmatism correction plate 212 are present on one Z-direction straight line. In this case, the distribution of the phase difference with respect to transmitted light does not occur as described above. In this case, a straight line connecting the points $O_a$, $O_a'$, $O_b$, and $O_b'$ is assumed to be a straight line O-O'. Hereinafter, the straight line O-O' is assumed to be an "optical axis".

FIGS. 6(*b*) and 6(*c*) are schematic views showing the positional relationship when the first astigmatism correction plate 211 and the second astigmatism correction plate 212 are displaced along the X-axis direction by $+x_0$ and $-x_0$, respectively, from the optical axis (reference arrangement). That is, the absolute values of the amounts of displacement are equal ($=|x_0|$), and the amounts of displacement of two astigmatism correction plates from the optical axis (reference arrangement) along the X direction preferably have opposite signs. Here, it is assumed that the straight line shifted in parallel from the optical axis (straight line O-O') by $+x_0$ is a straight line α-α' and the straight line shifted in parallel from the optical axis (straight line O-O') by $+x_0$ is a straight line β-β'.

Figure 7:
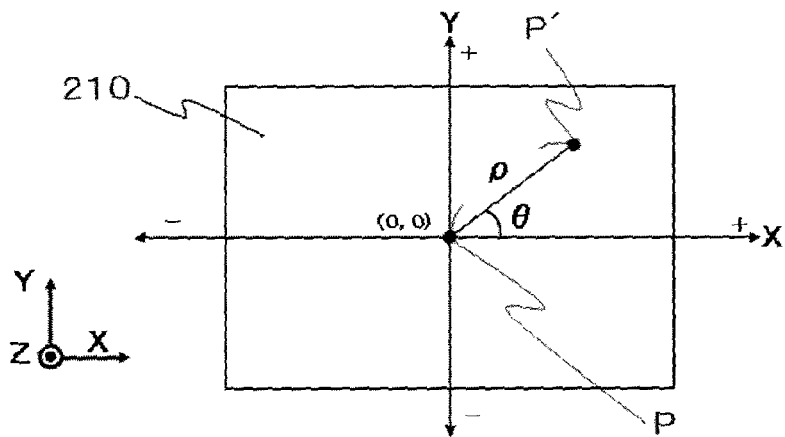
FIG. 7 is a schematic plan view explaining the plane position of the astigmatism correcting element related to the first embodiment.

Moreover, in this case, the distribution of the phase difference of light transmitted through the astigmatism correcting element 210 which has the amount of displacement $|x_0|$ from the optical axis (reference arrangement) is considered. FIG. 7 is a schematic view showing the X-Y plane of the astigmatism correcting element 210 when viewed from the side through which light is transmitted, and it is assumed that the point of intersection between the astigmatism correcting element 210 and the optical axis is a point P and this point P is the origin (x, y)=(0, 0) on the X-Y plane. In this case, the distribution of the phase difference of light incident on the astigmatism correcting element 210 and transmitted therethrough in the same phase is as follows from the above expressions (4a) and (4b).

$$f_1(x-x_0,y)+g_1(x+x_0,y)(=h_1(x,y))=\{a(x-x_0)^3+b(x-x_0)y^2\}-\{a(x+x_0)^3+b(x+x_0)y^2\}$$

By expanding this, (5a) can be obtained since b=−3a.

$$h_1(x,y)=-6a(x^2-y^2)x_0-2ax_0^3 \quad (5a)$$

Since the last term of the above expression (5a) is an offset of the phase difference occurring in light transmitted through the entire surface of the astigmatism correcting element 210, it can be neglected. A function $h_1'(x, y)$ excluding this $-2ax_0^3$ is assumed to be (5b).

$$h_1'(x,y)=-6a(x^2-y^2)x_0 \quad (5b)$$

The above expression (5b) is the distribution of the phase difference based on the Cartesian coordinates. If this is transformed into polar coordinates, (5c) can be obtained assuming that an arbitrary point P' is given with the point P as the origin (0, 0) as shown in FIG. 7 and that the distance of P-P' is ρ and the angle formed by the X axis as a reference and the line segment P-P' is θ (counterclockwise direction is positive).

$$h_1'(\rho,\theta)=-6a\rho^2(2\cos^2\theta-1)x_0 \quad (5c)$$

That is, expression (5c) can generate an astigmatism component in proportion to the size of the amount of displacement $x_0$. For example, when the distribution of the astigmatism occurring in another optical system is $3\rho^2(2\cos^2\theta-1)$ from the relational expression of the astigmatism based on the above expression (1a) and it is necessary to correct the distribution of the phase difference based on this, it is possible to offset the astigmatism occurring in the optical system by generating the astigmatism of $-3\rho^2(2\cos^2\theta-1)$ by performing adjustment such that the amount of displacement $x_0$ becomes 0.5 when a=1 is set in expression (5c).

Thus, although the X-axis direction is set as the movable direction of the astigmatism correcting element 210, a direction (in this case, Y-axis direction) perpendicular to the movable direction of a lens (pupil) may be set as the movable direction of the astigmatism correcting element 210, for the following reasons, when the optical system using the aberration correcting device 200 is an optical device including a mechanism which moves a lens (pupil) in a direction perpendicular to the optical axis. For example, when the movable direction of the astigmatism correcting element 210 and the movable direction of a lens (not shown) are the same, it is necessary to increase the width of each astigmatism correction plate by the distance obtained by adding the maximum movable distance of the lens and the maximum displacement distance of each of the first astigmatism correction plate 211 and the second astigmatism correction plate 212. On the other hand, when the movable direction of the lens (pupil) and the movable direction of the astigmatism correcting element 210 are perpendicular to each other, it is not necessary to consider an astigmatism correction plate with a large width in one direction. This is effective in the optical system with no limitation of the width at the position of the astigmatism correction plate. For example, when an objective lens used in an optical head device is the object, it is preferable to be able to move the astigmatism correcting element 210 in a direction perpendicular to the lens shift direction of the objective lens as described above.

In addition, as described above, when both the movable direction of the astigmatism correcting element 210 and the movable direction of a lens are the same, the width of each astigmatism correction plate is increased. Assuming that this direction is the X-axis direction, a difference (=phase difference) between the maximum and minimum values of the curved surface is increased by the increase in the X-direction width of the first astigmatism correction plate 211 and the second astigmatism correction plate 212. For example, it is assumed that the possible range of x in expression (4a) is $-1.0 \leq x \leq +1.0$ and the possible range of x when the width increases is $-1.1 \leq x \leq +1.1$. In addition, when a=1 and y=0 (cross section on the X axis) are assumed for the sake of simplicity, the phase difference of the first astigmatism correction plate 211 on the Y axis is 2 in the case of $-1.0 \leq x \leq +1.0$, but the phase difference of the first astigmatism correction plate 211 on the Y axis becomes as large as about 2.7 in the case of $-1.1 \leq x \leq +1.1$. That is, if the width increases, the physical step difference of the curved surface also increases according to the phase difference.

Figure 5:
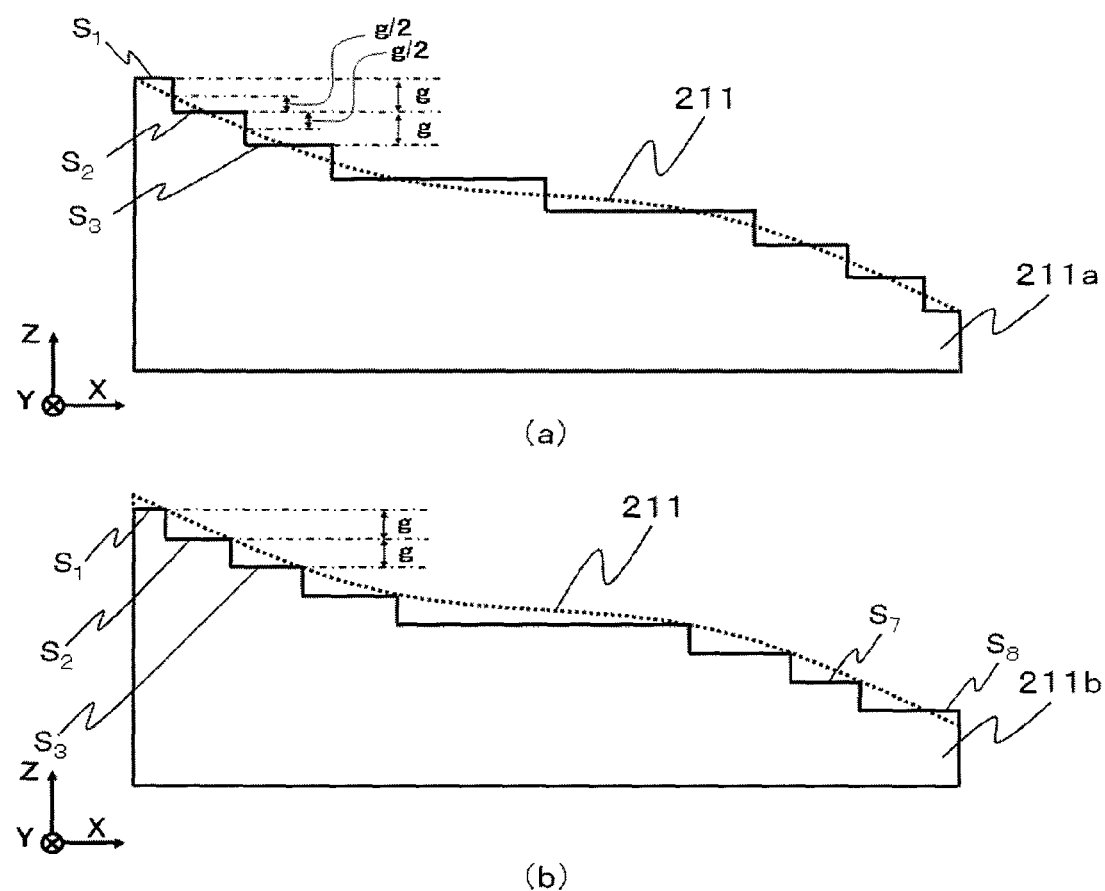
FIGS. 5(a) and 5(b) are schematic cross-sectional views showing examples where the curved surface of the first astigmatism correction plate has a step shape.

In this case, for example, if it is approximated in a step shape as shown in FIG. 5(*a*), the step difference g between adjacent steps also increases as an uneven step difference (difference between the maximum and minimum values of the height) increases. Accordingly, a large remaining aberration occurs for the function of the curved surface of expression (4a). On the other hand, when the movable direction of a lens is the Y-direction, the width of each astigmatism correction plate can be made small. Accordingly, even when it is approximated to the step shape with the same number of steps N, the remaining aberration occurring for the function of the curved surface of expression (4a) can be made small.

In addition, functions obtained by adding a tilt component with respect to the X-Y plane to expressions (4a) and (4b) may be adopted. Here, assuming that the distribution of the phase difference of a tilt component of the first astigmatism correction plate 211 is $t_1(x, y)$ and the distribution of the phase difference of a tilt component of the second astigmatism correction plate 212 is $t_2(x, y)$, they can be specifically expressed as (4d) and (4e).

$$t_1(x,y) = t_A x + t_B y \quad (4d)$$

$$t_2(x,y) = -t_1(x,y) \quad (4e)$$

(where $t_A$ and $t_B$ are constant)

In addition, it is preferable to add the component of expression (4d) to the distribution of the phase difference of the first astigmatism correction plate 211 based on expression (4a) and to add the component of expression (4e) to the distribution of the phase difference of the second astigmatism correction plate 212 based on expression (4b).

Here, the function $f_{1T}(x, y)$ generalized on the basis of $f_1(x, y)$ as the first astigmatism correction plate 211 in consideration of the distribution of the phase difference when a tilt component is added becomes (4f)

$$f_{1T}(x,y) = ax^3 + bxy^2 + t_A x + t_B y \quad (4f)$$

$a/b = -\frac{1}{3}$ (a, b, $t_A$, and $t_B$ are coefficients),
and the function $g_{1T}(x, y)$ generalized on the basis of $g_1(x, y)$ as the second astigmatism correction plate 212 in consideration of the distribution of the phase difference when a tilt component is added is set to have a curved surface satisfying (4g) or a shape approximated to the step shape on the basis of these functions.

$$g_{1T}(x,y) = -f_{1T}(x,y) \quad (4g)$$

In addition, in expressions (40 and (4g), $t_A$ and $t_B$ may be 0. If $t_A = t_B = 0$, expressions (40 and (4g) are equivalent to expressions (4a) and (4b), respectively.

In this case, when the first astigmatism correction plate 211 including a tilt component and the second astigmatism correction plate 212 including a tilt component are made to move by $+x_0$ and $-x_0$, respectively, the distribution of the phase difference of light incident on the astigmatism correcting element 210 and transmitted therethrough in the same phase has phase difference distribution obtained by adding a tilt component to expression (5a). In addition, the distribution of the phase difference of a tilt component is given as (4h) from the above expressions (4d) and (4e).

$$t_1(x-x_0,y) + t_2(x+x_0,y)(=t_s(x,y)) = \{t_1(x-x_0) + t_2 y\} - \{t_1(x+x_0) + t_2 y\}, \text{ and}$$

$$t_s(x,y) = -2t_1 x_0 \quad (4h)$$

Figure 8:
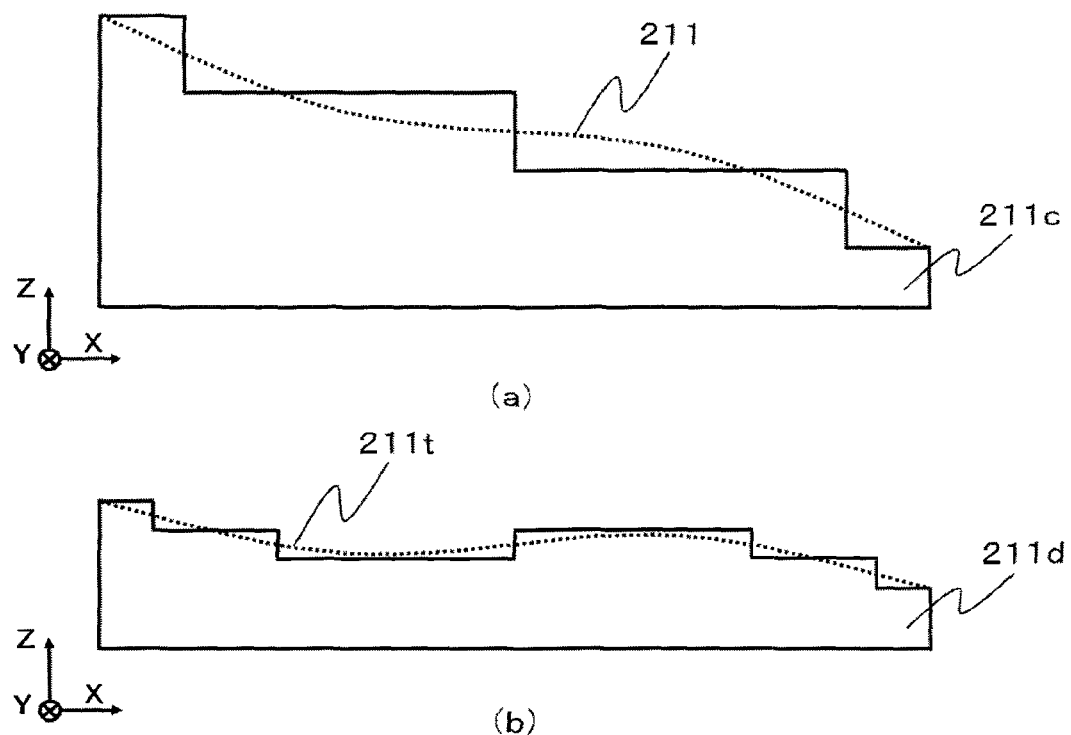
FIGS. 8(a) and 8(b) are schematic cross-sectional views showing examples where the curved surface of the first astigmatism correction plate including a tilt component is approximated to a step shape.

Here, expression (4h) can be neglected because it is an offset of the phase difference occurring in light transmitted through the entire surface of the astigmatism correcting element 210. Accordingly, even if the first astigmatism correction plate 211 and the second astigmatism correction plate 212 have tilt components which make the functions complementary to each other as shown in the expression (4g), the distribution of the phase difference does not change. Next, the relationship between a function of phase difference distribution including a tilt component and the cross-sectional shape of an astigmatism correction plate approximated to a step shape will be described. FIG. 8(a) is a schematic cross-sectional view of a first astigmatism correction plate 211c (solid line) when approximating the curved surface (dotted line) of the first astigmatism correction plate 211 with the number of steps N=4 on the basis of expression (4a) on the cross section of y=0. In addition, FIG. 8(b) is a schematic cross-sectional view of a first astigmatism correction plate 211d (solid line) when approximating the curved surface (dotted line) of a first astigmatism correction plate 211t with a curved surface of expression (4f), which is obtained by adding a tilt component to the curved surface in FIG. 8(a), with the number of steps N=4.

For example, when the cross section of the first astigmatism correction plate 211 is approximated in a step shape, it may be formed so that the step difference is reduced by increasing the number of steps N so as to approach expression (4a). However, even if the number of steps N is not increased, distribution near the curved surface can be acquired by giving the curved surface of expression (4f) in which a tilt component is added. Thus, if the difference between the curved surface and the position of a step can be made small, the remaining aberration occurring due to this difference can also be made small. Accordingly, compared with the first astigmatism correction plate 211c when the curved surface which does not include a tilt component is approximated with the number of steps N=4 as shown in FIG. 8(a), the remaining aberration can be further reduced in the first astigmatism correction plate 211d when the curved surface including a tilt component is approximated even in the case of the same number of steps. As a result, the aberration correction can be realized with high precision. In addition, the aberration correcting element including the phase difference of a tilt component as described above is not limited to the astigmatism correcting element 210, similar application can also be made to each aberration correcting element of the second and subsequent embodiments to be described later.

In addition, although the above explanation was given on the assumption that the amounts of displacement of two astigmatism correction plates were $|x_0|$ since the effective diameter ratio was k=1, the position adjusting section may make a control such that the moving distance of the second astigmatism correction plate 212 becomes $-k \times x_0$ when the effective diameter ratio k is not 1 and the moving distance of the first astigmatism correction plate 211 is $+x_0$.

Moreover, by the astigmatism distribution of expression (5c), the astigmatism occurring symmetrically with the X and Y directions on the X-Y plane as axes can be offset. However, for the astigmatism (for example, +45° direction) occurring symmetrically with an arbitrary direction between the X and Y directions on the X-Y plane as an axis, it is preferable to rotate the astigmatism correcting element 210 (+45° around the optical axis (point P) of the astigmatism correcting element 210 in FIG. 7 so that the X-axis direction or the Y-axis direction is matched to the symmetrical axis of the astigmatism that occurs. In this case, it is preferable that the position adjusting section 220 includes a mechanism, which moves the first astigmatism correction plate 211 and the second astigmatism correction plate 212 in opposite directions, and a mechanism which moves the astigmatism correcting element 210 around the optical axis. By the aberration correcting device related to the present embodiment, the astigmatism can be accurately corrected without a large error and without neglecting a high-order term for the astigmatism which occurs.

(Second Embodiment)

Figure 9:
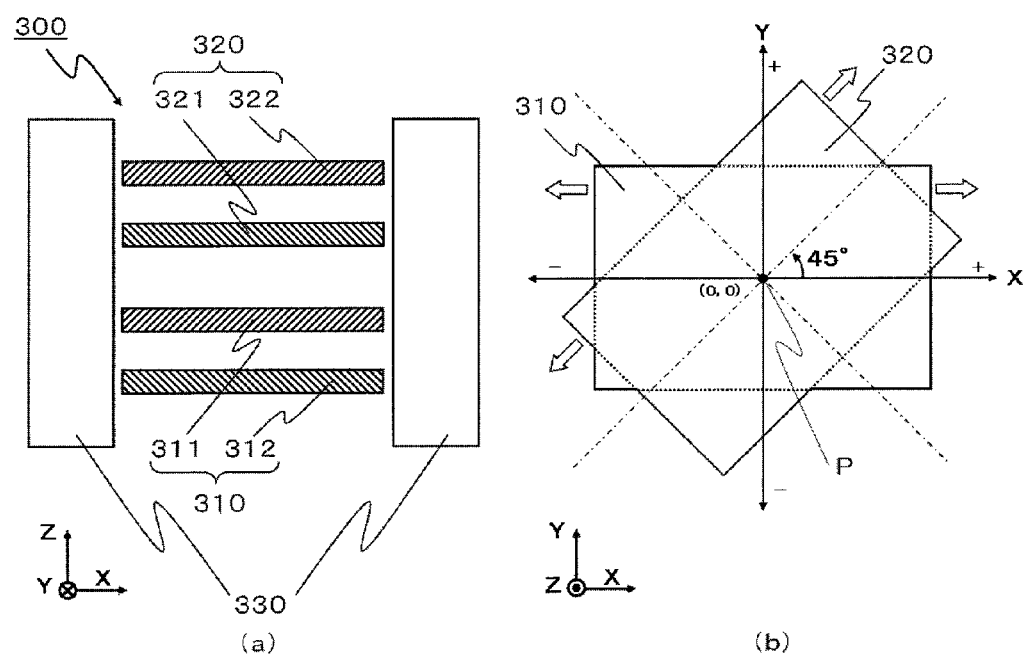
FIG. 9(a) is a schematic view of an aberration correcting device related to a second embodiment.
FIG. 9(b) is a schematic plan view showing the positional relationship between a first astigmatism correcting element and a second astigmatism correcting element.

FIG. 9(a) is a schematic view showing an aberration correcting device 300 related to the second embodiment, and the aberration correcting device 300 is configured to include a first astigmatism correcting element 310, a second astigmatism correcting element 320, and a position adjusting section 330. In addition, the first astigmatism correcting element 310 and the second astigmatism correcting element 320 are the same as the astigmatism correcting element 210 related to the first embodiment, and the second astigmatism correcting element 320 is disposed in a direction rotated around the optical axis, for example, by 45° from the first astigmatism correcting element 310. FIG. 9(b) is a schematic plan view showing the first astigmatism correcting element 310 and the second astigmatism correcting element 320.

A first astigmatism correction plate 311 and a second astigmatism correction plate 312 which form the first astigmatism correcting element 310 can move in the X direction from the reference arrangement similar to the astigmatism correcting element 210 of the first embodiment, and a third astigmatism correction plate 321 and a fourth astigmatism correction plate 322 which form the second astigmatism correcting element 320 can move in a direction of an angle of 45° from the reference arrangement in the X direction. Through this configuration, the astigmatism occurring symmetrically with the X and Y directions on the X-Y plane as axes can be offset by the first astigmatism correcting element 310, and the astigmatism occurring symmetrically with the direction of an angle of 45° from the X and Y directions on the X-Y plane as an axis can be offset by the second astigmatism correcting element 320.

This makes it possible to accurately correct the astigmatism, which occurs symmetrically with an arbitrary direction between the X and Y direction on the X-Y plane as an axis, by performing adjustment for moving the moving distances of the first astigmatism correction plate 311 and the second astigmatism correction plate 312, which form the first astigmatism correcting element 310, and the moving distances of the third astigmatism correction plate 321 and the fourth astigmatism correction plate 322, which form the second astigmatism correcting element 320, in the straight line direction. In addition, this angle may be 135°, 225°, or 315° without being limited to 45° or may be (m×45)° assuming that m is any integer of 1, 3, 5, and 7. Thus, by the aberration correcting device related to the present embodiment, the astigmatism can be accurately corrected without a large error for the astigmatism occurring in another optical system.

In addition, when the effective diameters of light beams incident on the third astigmatism correction plate 321 and the second astigmatism correction plate 322 are $D_3$ and $D_4$ and $D_4/D_3$ is generalized as k' times, it is preferable to have a configuration in which the distribution of the relationship satisfying $g_{1T}(x,y)=-f_{1T}(x/k',y/k')\}$ is given by transformation of the above expression (4g).

In addition, when the moving distance of the third astigmatism correction plate 321 along the direction of an angle of (m×45)° from the X axis is $+x_0'$, it is preferable that the position adjusting section makes a control such that the moving distance of the fourth astigmatism correction plate 322 become $-k'\times x_0'$.

Third Embodiment

Although the configuration of the aberration correcting device 300 in which the movement direction of the first astigmatism correcting element 310 and the movement direction of the second astigmatism correcting element 320 on the X-Y plane are different from each other by (m×45)° is shown in the second embodiment, an aberration correcting device 400 related to a third embodiment corrects the astigmatism, which occurs symmetrically with an arbitrary direction as an axis, by moving two astigmatism correcting elements in the same direction on the X-Y plane.

Figure 10:
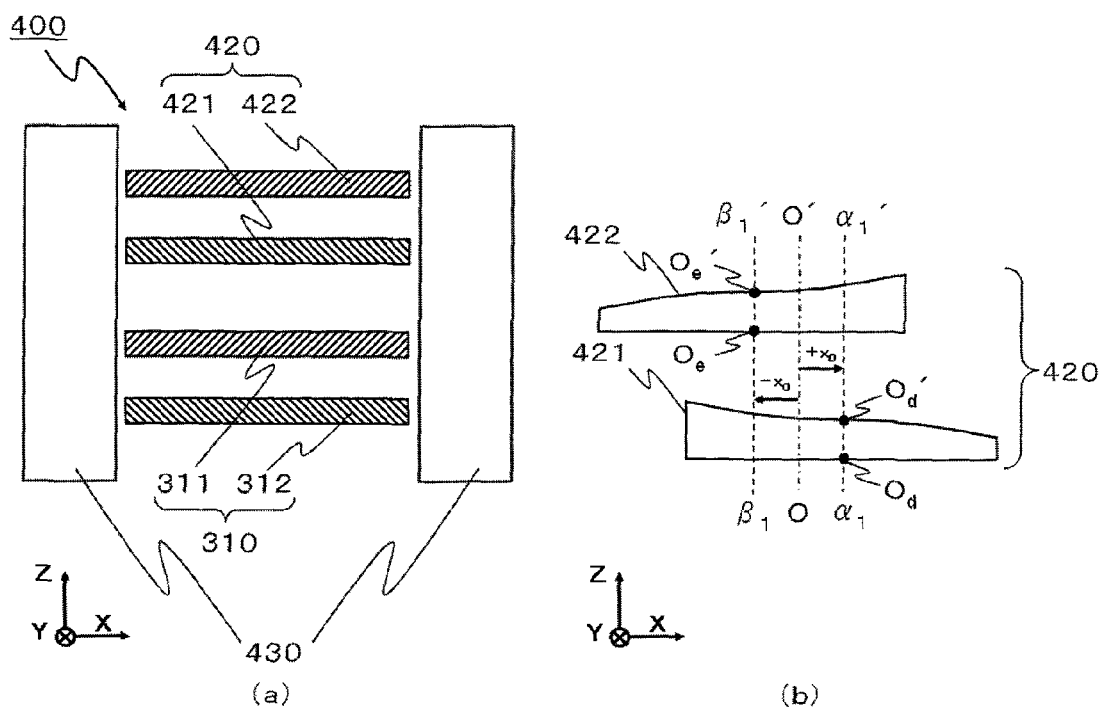
FIG. 10(a) is a schematic view of an aberration correcting device related to a third embodiment.
FIG. 10(b) is a schematic cross-sectional view showing the positional relationship of a first astigmatism correction plate and a second astigmatism correction plate which form a second astigmatism correcting element.

FIG. 10(a) is a schematic view showing the aberration correcting device 400 related to the third embodiment, and the aberration correcting device 400 is configured to include a first astigmatism correcting element 310, a second astigmatism correcting element 420, and a position adjusting section 430. In addition, since the first astigmatism correcting element has the same configuration as the first astigmatism correcting element 310 related to a second embodiment, explanation thereof is omitted herein. Next, the second astigmatism correcting element 420 will be described. The second astigmatism correcting element 420 is configured such that a third astigmatism correction plate 421 and a fourth astigmatism correction plate 422 are disposed in parallel. In addition, FIG. 10(b) is a schematic view showing the positional relationship when the third astigmatism correction plate 421 and the fourth astigmatism correction plate 422 are shifted from each other in the X direction.

Here, the relationship of the phase difference between light transmitted through the point $O_d$, which is the origin of the (Cartesian) coordinates on the X-Y plane of the third astigmatism correction plate 421, and light transmitted through the arbitrary position (x, y) on the X-Y plane in the Z direction is set as a function expressed as $f_2(x, y)$. In this case, the third astigmatism correction plate 421 is configured such that the distribution $f_2(x, y)$ of the phase difference becomes (6a).

$$f_2(x,y)=Ax^{2ly} \tag{6a}$$

(A is a Coefficient)

In addition, the value of A is a coefficient which gives the size of a phase difference. As will be described later, the size of the astigmatism to be corrected can be determined by the size of the amount of displacement $(x_0)$.

In addition, if the distribution of the phase difference when a tilt component of expression (4d) is added is taken into consideration in the above expression (6a) similar to the first embodiment, the generalized function $f_{2T}(x, y)$ becomes (6b).

$$f_{2T}(x,y)=Ax^2y+t_A x+t_B y \tag{6b}$$

(A, $t_A$, and $t_B$ are coefficients)

In addition, since $t_A$ and $t_B$ may be 0, expression (6b) is equivalent to expression (6a) if $t_A=t_B=0$.

Next, the fourth astigmatism correction plate 422 is considered. As shown in FIG. 10(b), the fourth astigmatism correction plate 422 also has the distribution of the phase difference (thickness) of light transmitted in the Z direction, similar to the third astigmatism correction plate 421. In addition, assuming that the relationship of the phase difference between light transmitted through the point $O_e$, which is the origin of the (Cartesian) coordinates on the X-Y plane, and light transmitted through the arbitrary position (x, y) on the X-Y plane in the Z direction is a function expressed as $g_{2T}(x, y)$, it has a configuration in which the distribution of the relationship satisfying (6c) is given.

$$g_{2T}(x,y)=-f_{2T}(x,y) \tag{6c}$$

In addition, the above explanation was given on the assumption that the effective diameters of light beams incident on the third astigmatism correction plate 421 and the fourth astigmatism correction plate 422 were the same as described above. However, when the effective diameter of light incident on each astigmatism correction plate is different, that is, when the effective diameter ratio of the effective diameter $D_4$ of light incident on the fourth astigmatism correction plate 422 to the effective diameter $D_3$ of light incident on the third astigmatism correction plate 421 is generalized as k' ($=D_4/D_3$), it is preferable to have a configuration in which the distribution of the relationship satisfying (6d) is given by transforming the above expression (6c).

$$g_{2T}(x,y) = -f_{2T}(x/k', y/k') \quad (6d)$$

The following explanation will be given assuming that $D_3=D_4$, that is, the effective diameter ratio k'=1 and $t_A=t_B=0$, that is, there is no tilt component for simplicity of explanation.

Here, also in the second astigmatism correcting element 420, the third astigmatism correction plate 421 and the fourth astigmatism correction plate 422 are displaced by $+x_0$ and $-x_0$, respectively, from the reference arrangement similar to the first astigmatism correcting element 310. Similarly, the absolute values of the amounts of displacement are equal ($\leq |x_0|$), and the amounts of displacement of two astigmatism correction plates from the reference arrangement along the X direction preferably have opposite signs. Here, it is assumed that the straight line shifted in parallel from the optical axis (straight line O-O') by $+x_0$ is a straight line $\alpha_1$-$\alpha_1'$ and the straight line shifted in parallel from the optical axis (straight line O-O') by $-x_0$ is a straight line $\beta_1$-$\beta_1'$. In addition, this amount of displacement $|x_0|$ indicates any value and need not necessarily be the same value as the amount of displacement $|x_0|$ given to the first astigmatism correcting element 310 in practice.

Moreover, in this case, the distribution of the phase difference of light transmitted through the second astigmatism correcting element 420 having the amount of displacement $|x_0|$ from the reference arrangement is considered, and the origin (x, y) on the X-Y plane crossing the optical axis is set to (0, 0). In this case, the distribution of the phase difference of light incident on the second astigmatism correcting element 420 and transmitted therethrough in the same phase is as follows from the above expressions (6b) and (6c).

$$f_{2T}(x-x_0,y) + g_{2T}(x+x_0,y) (= h_2(x,y)) = A(x-x_0)^2 y - A(x+x_0)^2 y,$$

By expanding this, (7a) can be obtained.

$$h_2(x,y) = -4Ax_0 xy \quad (7a)$$

The above expression (7a) is the distribution of the phase difference based on the Cartesian coordinates. If this is transformed into polar coordinates, (7b) can be obtained assuming that an arbitrary point P' is given with the point P as the origin (0, 0) and that the distance of P-P' is $\rho$ and the angle formed by the X axis as a reference and the line segment P-P' is $\theta$ (counterclockwise direction is positive), similar to the relationship of the polar coordinates in FIG. 7.

$$h_2(\rho,\theta) = -4Ax_0 \rho^2 \sin\theta \cdot \cos\theta \quad (7b)$$

That is, expression (7b) can generate an astigmatism component in proportion to the size of the amount of displacement $x_0$. For example, when the distribution of the astigmatism occurring in another optical system is $2\rho^2 \sin\theta \cdot \cos\theta$ from the relational expression of the astigmatism based on the above expression (1b) and A=1 is set in expression (7b), it is possible to offset the astigmatism occurring in directions of $\theta=45°$ and $\theta=135°$ by generating the astigmatism of $-2\rho^2 \sin\theta \cdot \cos\theta$ by performing adjustment such that the amount of displacement $x_0$ becomes 0.5. Thus, the aberration correcting device 400 related to the third embodiment can correct both the astigmatism component, which occurs symmetrically with the X direction or the Y direction as an axis, and the astigmatism component, which occurs symmetrically with the directions of $\theta=45°$ and $\theta=135°$ as axes, just by including a mechanism which moves in one direction (for example, in the X direction) on the X-Y plane by the position adjusting section 430. As a result, the astigmatism occurring in the arbitrary direction on the X-Y plane can be precisely corrected. Thus, by the aberration correcting device related to the present embodiment, the astigmatism can be accurately corrected without a large error for the astigmatism occurring in another optical system.

In addition, although the above explanation was given on the assumption that the effective diameter ratio was k'=1 and the amounts of displacement of two astigmatism correction plates were $|x_0|$ for the sake of simplicity, the position adjusting section may make a control such that the moving distance of the fourth astigmatism correction plate 422 becomes $-k \times x_0'$ when the effective diameter ratio k' is not 1 and the moving distance of the third astigmatism correction plate 421 is $+x_0'$.

(Fourth Embodiment)

In the aberration correcting device related to the embodiment up to now, a form of parallel movement in one direction, that is, a form of making a movement by $\pm x_0$ was described as a parameter for displacement of one aberration correction plate. In a fourth embodiment, however, the aberration is corrected by changing the two directions (X and Y directions) for parallel movement for one aberration correction plate. In addition, the idea of the distribution of each aberration correction plate in the case of the effective diameter ratio $k=D_2/D_1$ when the effective diameters of light beams incident on two aberration correction plates are $D_1$ and $D_2$, for example, and the distance moved in the X-axis direction or the Y-axis direction from the reference arrangement, which will be described below, is the same as the first to third embodiments. Accordingly, the explanation will be omitted in the following embodiments including the fourth embodiment, and the following explanation will be given on the assumption that light beams with the same effective diameter are incident on two aberration correction plates (k=1).

Figure 11:
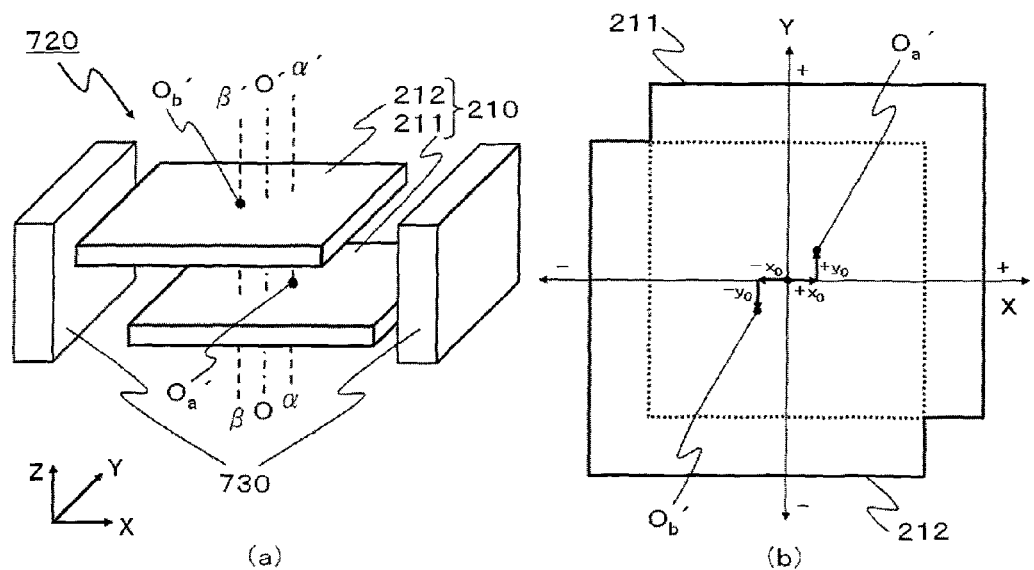
FIG. 11(a) is a schematic view of an aberration correcting device related to a fourth embodiment.
FIG. 11(b) is a schematic plan view showing the positional relationship of the astigmatism correcting element.

FIG. 11(a) is a schematic view of an aberration correcting device 720 using the astigmatism correcting element 210 related to the first embodiment, and the aberration correcting device 720 is configured to include an astigmatism correcting element 210 and a position adjusting section 730. The phase distribution of the first astigmatism correction plate 211 and the second astigmatism correction plate 212 which form the astigmatism correcting element 210 is the same as that described in the first embodiment. In addition, the position adjusting section 730 has a mechanism which moves the first astigmatism correction plate 211 and the second astigmatism correction plate 212 in opposite directions by the same distance not only for the X direction but also for the Y direction. In the present embodiment, not only the astigmatism occurring symmetrically with the X and Y directions as axes and the astigmatism occurring symmetrically with the directions of $\theta=45°$ and $\theta=135°$ as axes can be corrected by moving two astigmatism correction plates in a two-dimensional manner on the X-Y plane as described above. The principle will be described below.

FIG. 11(b) is a schematic view showing the positional relationship when the first astigmatism correction plate 211 and the second astigmatism correction plate 212 are displaced along the X-axis direction by $+x_0$ and $-x_0$, respectively, from the optical axis (reference arrangement) and displaced along the Y-axis direction by $+y_0$ and $-y_0$, respectively. Here, it is assumed that the straight line shifted in parallel from the optical axis (straight line O-O') by $+x_0$ and $+y_0$ is a straight line $\alpha$-$\alpha'$ and the straight line shifted in parallel from the optical axis (straight line O-O') by $-x_0$ and $-y_0$ is a straight line $\beta$-$\beta'$.

Moreover, in this case, the distribution of the phase difference of light transmitted through the astigmatism correcting element 210 which has the amounts of displacement $|x_0|$ and $|y_0|$ from the optical axis (reference arrangement) is considered. On the basis of FIG. 7, the point of intersection between the astigmatism correcting element 210 and the optical axis is set as the point P and this point P is set as the origin $(x, y)=(0, 0)$ on the X-Y plane. In this case, if $t_A=t_B=0$ is assumed for the sake of simplicity, that is, there is no tilt component in the astigmatism correcting element 210, the distribution of the phase difference of light incident on the astigmatism correcting element 210 and transmitted therethrough in the same phase becomes (8a) from the above expressions (4f) and (4g).

$$f_{1T}(x-x_0, y-y_0) + g_{1T}(x+x_0, y+y_0) (=h_5(x,y)) = -6x_0(x^2 - y^2) + 12y_0(xy) - 2x_0^3 + 6x_0 y_0^2 \quad (8a)$$

Here, since the third and fourth terms of expression (8a) are offsets of the phase difference occurring in light transmitted through the entire surface of the astigmatism correcting element 210, it can be neglected. Accordingly, assuming that the polar coordinates are $h_5(\rho, \theta)$, a function excluding this $-2x_0^3 + 6x_0 y_0^2$ becomes (8b).

$$h_5(\rho, \theta) = -6x_0 \rho^2 (2\cos^2\theta - 1) + 12y_0 \rho^2 \sin\theta \cos\theta \quad (8b)$$

Here, the first term of expression (8b) is equivalent to expression (1a), and the second term is equivalent to expression (1b). Accordingly, by moving the first astigmatism correction plate 211 and the second astigmatism correction plate 212 in opposite directions by the same distance in the X-axis and Y-axis directions, respectively, for the astigmatism occurring symmetrically with the X and Y directions as axes and the astigmatism occurring symmetrically with the directions of $\theta=45°$ and $\theta=135°$ as axes, astigmatisms of all components can be accurately corrected. In addition, although the astigmatism correcting element 210 was described on the assumption that there was no tilt component, the first astigmatism correction plate 211 and the second astigmatism correction plate 212 may have a shape including a tilt component.

(Fifth Embodiment)

Figure 12:
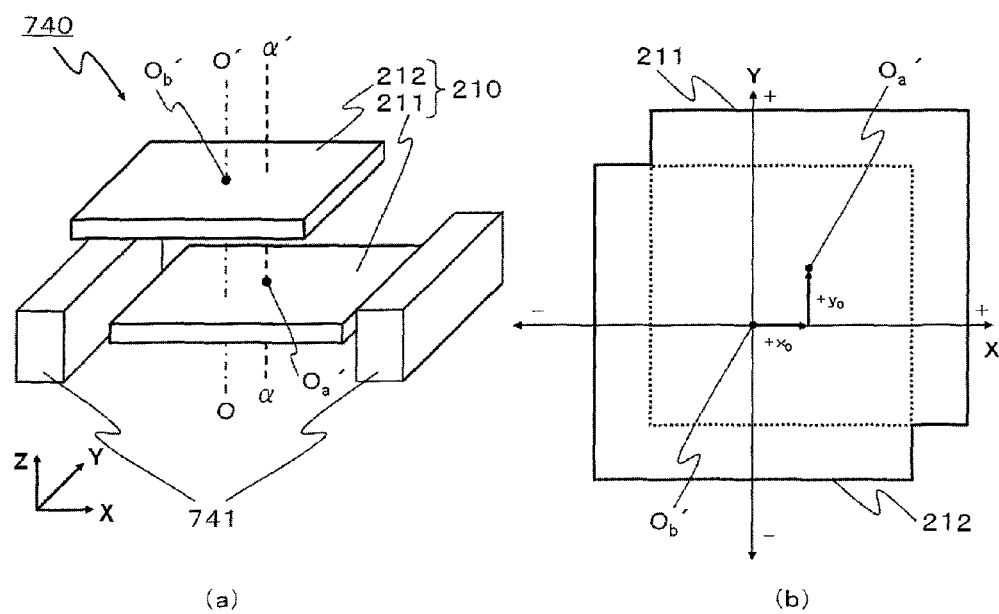
FIG. 12(a) is a schematic view of an aberration correcting device related to a fifth embodiment.
FIG. 12(b) is a schematic plan view showing the positional relationship of the astigmatism correcting element.

In a fifth embodiment, the astigmatism correcting element 210 is similarly used, but not only the astigmatism occurring symmetrically with the X and Y directions as axes and the astigmatism occurring symmetrically with the directions of $\theta=45°$ and $\theta=135°$ as axes can be corrected by moving only one astigmatism correction plate in the X and Y directions. The principle will be described below. FIG. 12(a) is a schematic view of an aberration correcting device 740, and this aberration correcting device 740 is configured to include an astigmatism correcting element 210 and a position adjusting section 741. The distribution of the phase difference of the first astigmatism correction plate 211 and the second astigmatism correction plate 212 which form the astigmatism correcting element 210 is the same as that described in the first embodiment. In addition, the position adjusting section 741 has a mechanism which moves only the first astigmatism correction plate 211 not only in the X direction but also in the Y direction.

In addition, FIG. 12(b) is a schematic view showing the positional relationship when the first astigmatism correction plate 211 is displaced along the X-axis direction by $+x_0$ from the optical axis (reference arrangement) and displaced along the Y-axis direction by $+y_0$. Here, it is assumed that the straight line shifted in parallel from the optical axis (straight line O-O') by $+x_0$ and $+y_0$ is a straight line $\alpha$-$\alpha'$.

Moreover, in this case, the distribution of the phase difference of light transmitted through the astigmatism correcting element 210 in which the first astigmatism correction plate 211 is displaced by the amounts of displacement $+x_0$ and $+y_0$ from the optical axis (reference arrangement) is considered. On the basis of FIG. 7, the point of intersection between the astigmatism correcting element 210 and the optical axis is set as the point P and this point P is set as the origin $(x, y)=(0, 0)$ on the X-Y plane. In this case, if $t_A=t_B=0$ is assumed for the sake of simplicity, that is, there is no tilt component in the astigmatism correcting element 210, the distribution of the phase difference of light incident on the astigmatism correcting element 210 and transmitted therethrough in the same phase becomes (9a) from the above expressions (4f) and (4g).

$$f_{1T}(x-x_0, y-y_0) + g_{1T}(x, y) (=h_6(x,y)) = -3x_0(x^2 - y^2) + 6y_0(xy) + (3x_0^2 - 3y_0^2)x - 6x_0 y_0 y - x_0^3 + 3x_0 y_0^2 \quad (9a)$$

Here, since the fifth and sixth terms of expression (9a) are offsets of the phase difference occurring in light transmitted through the entire surface of the astigmatism correcting element 210, it can be neglected. In addition, a function excluding this $-x_0^3 + 3x_0 y_0^2$ is assumed to be polar coordinates are $h_6(\rho, \theta)$. In this case, the radius of light which corrects an aberration can be expressed as (9d) assuming that the radius of the pupil of an objective lens is $r_0$ and (9b) and (9c) are set, for example, when light transmitted through the astigmatism correcting element 210 is incident on the objective lens with a certain pupil diameter.

$$x = r_0 \rho \cos\theta \quad (9b)$$

$$y = r_0 \rho \sin\theta \quad (9c)$$

$$h_6(\rho, \theta) = -3x_0 r_0^2 \rho^2 \cos 2\theta + 3y_0 r_0^2 \rho^2 \sin 2\theta + (3x_0^2 - 3y_0^2) r_0 \rho \cos\theta - 6x_0 y_0^2 r_0 \rho \sin\theta \quad (9d)$$

Here, assuming that the optical path difference function on a pupil is $\phi(x, y)$ and the i-th Zernike function is $Z_i$, the i-th Zernike coefficient $C_i$ is expressed as expression (10a).

[Expression 1]

$$C_i = \frac{1}{\pi} \int_0^{2\pi} \int_0^1 \Phi(x, y) \times Z_i \rho \cdot d\rho \cdot d\theta \quad (10a)$$

Moreover, here, using expression (10a), fringe Zernike polynomial approximation standardized by setting $\delta_{ij}=1$ (in the case of i=j) and $\delta_{ij}=0$ (in the case of i≠j) as the conditions of $\delta_{ij}$ of the following expression (10b) is shown in the following expression (10c).

[Expression 2]

$$\frac{1}{\pi} \int_0^{2\pi} \int_0^1 Z_j \times Z_i \rho \cdot d\rho \cdot d\theta = \delta_{ij} \quad (10b)$$

[Expression 3]

$$\left. \begin{array}{l} Z_1 = 1 \\ Z_2 = 2\rho\cos\theta \\ Z_3 = 2\rho\sin\theta \\ Z_4 = \sqrt{3}(2\rho^2 - 1) \\ Z_5 = \sqrt{6}\rho^2\cos 2\theta \\ Z_6 = \sqrt{6}\rho^2\sin 2\theta \\ Z_7 = \sqrt{8}(3\rho^2 - 2)\rho\cos\theta \\ Z_8 = \sqrt{8}(3\rho^2 - 2)\rho\sin\theta \\ Z_9 = \sqrt{5}(6\rho^4 - 6\rho^2 + 1) \\ Z_{10} = \sqrt{8}(\rho^3 \cos 3\theta) \end{array} \right\} \quad (10c)$$

In addition, in the present embodiment, expression (9d) showing the phase difference distribution $h_6(\rho, \theta)$ of the polar coordinates when only the first astigmatism correction plate 211 is made to move by $+x_0$ and $+y_0$ can be expressed as the following expression (11a) if the fringe Zernike polynomial approximation shown in expression (10c) is used. In addition, in expression (11a), the coefficient of $Z_5$, the coefficient of $Z_6$, the coefficient of $Z_2$, and the coefficient of $Z_3$ can be expressed as $C_5$, $C_6$, $C_2$, and $C_3$, respectively. Here, the relationship between each of the coefficients $C_6$, $C_2$, and $C_3$ and the coefficient $C_5$ of $Z_5$ regarding an astigmatism component in the X and Y directions as a reference is shown in expressions (11b), (11c), and (11d), respectively.

[Expression 4]

$$h_6(\rho, \theta) = \left(\frac{-3x_0 r_0^2}{\sqrt{6}}\right)Z_5 + \left(\frac{3y_0 r_0^2}{\sqrt{6}}\right)Z_6 + \left(\frac{(3x_0^2 - 3y_0^2)r_0}{2}\right)Z_2 + (-3x_0 y_0 r_0)Z_3 \quad (11a)$$

$$\left|\frac{C_6}{C_5}\right| = \left|\frac{y_0}{x_0}\right| \quad (11b)$$

$$\left|\frac{C_2}{C_5}\right| = \left|\frac{\sqrt{6}(x_0^2 - y_0^2)}{2x_0 r_0}\right| \quad (11c)$$

$$\left|\frac{C_3}{C_5}\right| = \left|\frac{\sqrt{6} y_0^2}{r_0}\right| \quad (11d)$$

Here, from expression (11a), the coefficient $C_5$ of $Z_5$ regarding an astigmatism component in the X and Y directions and the coefficient $C_6$ of $Z_6$ regarding an astigmatism component occurring symmetrically with directions of $\theta=45°$ and $\theta=135°$ from the X direction on the X-Y plane as axes can generate an astigmatism component in any direction by adjusting the amount of displacement $x_0$ and the amount of displacement $y_0$ of the first astigmatism correction plate 211. Thus, the astigmatism can be accurately corrected by moving the first astigmatism correction plate 211 so as to have the opposite sign to the astigmatism occurring in the optical system.

In addition, aberrations of $Z_2$ and $Z_3$ regarding a tilt component occur with movement of the first astigmatism correction plate 211. However, if the amount of movement of $y_0$ can be set to be sufficiently smaller than the radius $r_0$ of an objective lens, for example, the astigmatism can be corrected by moving one astigmatism correction plate in the X and Y directions without increasing the aberration of the tilt component. Although only the first astigmatism correction plate 211 is moved in the present embodiment, it is also possible to move only the second astigmatism correction plate 212. In addition, although the astigmatism correcting element 210 was described on the assumption that there was no tilt component, the first astigmatism correction plate 211 and the second astigmatism correction plate 212 may have a shape including a tilt component.

(Sixth Embodiment)

Figure 13:
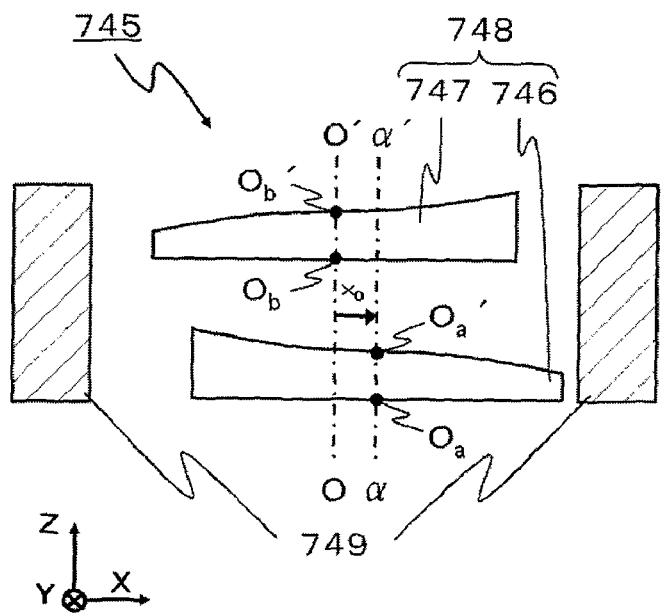
FIG. 13 is a schematic view of aberration correcting devices related to sixth and seventh embodiments.

FIG. 13 is a schematic view showing an aberration correcting device 745 related to sixth and seventh embodiments, and the aberration correcting device 745 as the aberration correcting device 100 in FIG. 1(a) is configured to include an astigmatism correcting element 748, which includes a first astigmatism correction plate 746 and a second astigmatism correction plate 747, and a position adjusting section 749. In addition, the position adjusting section 749 has a mechanism which moves only the first astigmatism correction plate 746 in the X direction. Here, in the sixth embodiment, the relationship of the phase difference between light transmitted through the point $O_a$, which is the origin of the (Cartesian) coordinates on the X-Y plane of the first astigmatism correction plate 746, and light transmitted through the arbitrary position (x, y) on the X-Y plane in the Z direction is set as a function expressed as $f_7(x, y)$. In this case, the first astigmatism correction plate 746 is configured such that the distribution $f_7(x, y)$ of the phase difference becomes (12a).

$$f_7(x,y) = Dx^3 \quad (12a)$$

(D is a coefficient)

In addition, if the distribution of the phase difference when a tilt component of the expression (4d) is added is taken into consideration in the above expression (12a) similar to the first embodiment, the generalized function $f_{7T}(x, y)$ becomes (12b).

$$f_{7T}(x,y) = Dx^3 + t_A x + t_B y \quad (12b)$$

(D, $t_A$, and $t_B$ are coefficients)

In addition, since $t_A$ and $t_B$ may be 0, the expression (12b) is equivalent to the expression (12a) if $t_A = t_B = 0$.

Next, the second astigmatism correction plate 747 is considered. As shown in FIG. 13, the second astigmatism correction plate 747 also has the distribution of the phase difference (thickness) of light transmitted in the Z direction, similar to the first astigmatism correction plate 746. In addition, assuming that the relationship of the phase difference between light transmitted through the point $O_b$, which is the origin of the (Cartesian) coordinates on the X-Y plane, and light transmitted through the arbitrary position (x, y) on the X-Y plane in the Z direction is a function expressed as $g_{7T}(x, y)$, it has a configuration in which the distribution of the relationship satisfying (12c) is given.

$$g_{7T}(x,y) = -f_{7T}(x,y) \quad (12c)$$

Next, the distribution of the phase difference of light transmitted through the astigmatism correcting element 748 in which the first astigmatism correction plate 746 is displaced by the amount of displacement $+x_0$ from the optical axis (reference arrangement) is considered. On the basis of FIG. 7, the point of intersection between the astigmatism correcting element 210 and the optical axis is set as the point P and this point P is set as the origin $(x, y)=(0, 0)$ on the X-Y plane. In this case, the distribution of the phase difference of light incident on the astigmatism correcting element 748 and transmitted therethrough in the same phase is as follows from the above expressions (12b) and (12c).

$$f_{7T}(x-x_0,y) + g_{7T}(x,y)(=h_7(x,y)) = D(x-x_0)^3 - Dx^3$$

By expanding this, (12d) can be obtained assuming that D=1 and $t_A = t_B = 0$, that is, there is no tilt component.

$$h_7(x,y) = -3x_0 x^2 + 3x x_0^2 - x_0^3 \quad (12d)$$

Here, since the third term of the above expression (12d) is an offset of the phase difference occurring in light transmitted through the entire surface of the astigmatism correcting element 748, it can be neglected. In addition, a function excluding this offset term is assumed to be polar coordinates $h_7(\rho, \theta)$. In this case, the radius of light which corrects an aberration is expressed as (12g) assuming that light transmitted through the astigmatism correcting element 748 is incident on an objective lens with a specific pupil diameter (radius=$r_0$) and that (12e) and (12f) are set.

$$x = r_0 \cdot \rho \cdot \cos\theta \quad (12e)$$

$$y = r_0 \cdot \rho \cdot \sin\theta \quad (12f)$$

$$h_7(\rho,\theta) = -3x_0 r_0 \rho^2 \cos^2\theta + 3x_0^2 r_0 \rho \cos\theta \quad (12g)$$

In addition, in the present embodiment, expression (12g) showing the phase difference distribution $h_7(\rho, \theta)$ of the polar coordinates when only the first astigmatism correction plate 746 is made to move by $+x_0$ can be expressed as the following expression (12h) if the fringe Zernike polynomial approximation shown in expression (10c) is used.

[Expression 5]

$$h_7(\rho, \theta) = \left(\frac{-\sqrt{3}\,x_0 r_0^2}{4}\right)Z_4 + \left(\frac{-\sqrt{6}\,x_0 r_0^2}{4}\right)Z_5 - \frac{3x_0^2 r_0^2}{2}Z_2 + \frac{3x_0 r_0^2}{4} \quad (12h)$$

In addition, in expression (12h), the coefficient $C_5$ of $Z_5$ regarding an astigmatism component in the X and Y directions can adjust the amount of the astigmatism component occurring symmetrically with the X and Y directions as axes by adjusting the amount of displacement of $x_0$ of the first astigmatism correction plate 746. Accordingly, the astigmatism can be accurately corrected by moving the first astigmatism correction plate 746 so as to have the opposite sign to the astigmatism occurring in the optical system.

In addition, the aberration of $Z_2$ regarding a tilt component occurs with movement of the first astigmatism correction plate 746. However, if the amount of movement of $x_0$ can be set to be sufficiently smaller than the radius $r_0$ of an objective lens, for example, the astigmatism can be corrected by moving one astigmatism correction plate in the X direction without increasing the aberration of the tilt component. In addition, although a defocusing component $Z_4$ also occurs, only an astigmatism component can be corrected because the defocusing component can be adjusted by movement of the image surface. In addition, although only the first astigmatism correction plate 746 is moved in the present embodiment, it is also possible to move only the second astigmatism correction plate 747. In addition, in an optical device including a lens (not shown) which can move in a direction perpendicular to the optical axis and the aberration correcting device 745, it is preferable that the movement direction of the astigmatism correcting element 748 and the movement direction of the lens are perpendicular to each other, that is, the lens is positioned to be movable in the Y-axis direction in this example.

(Seventh Embodiment)

Similar to the sixth embodiment, an aberration correcting device 745 related to a seventh embodiment as the aberration correcting device 100 in FIG. 1(a) is configured to include an astigmatism correcting element 748, which includes a first astigmatism correction plate 746 and a second astigmatism correction plate 747, and a position adjusting section 749. In addition, the position adjusting section 749 has a mechanism which moves only the first astigmatism correction plate 746 in the X direction. Here, the relationship of the phase difference between light transmitted through the point $O_a$, which is the origin of the (Cartesian) coordinates on the X-Y plane of the first astigmatism correction plate 746, and light transmitted through the arbitrary position (x, y) on the X-Y plane in the Z direction is set as a function expressed as $f_{8T}(x, y)$ in consideration of the distribution of the phase difference when a tilt component of expression (4d) is added. In this case, the first astigmatism correction plate 746 is configured such that the distribution $f_{8T}(x, y)$ of the phase difference becomes (13a).

$$f_{8T}(x,y) = Ex^2 y + Fx^2 + t_A x + t_B y \quad (13a)$$

(E, F, $t_A$, and $t_B$ are coefficients)

Next, the second astigmatism correction plate 747 is considered. Similar to the first astigmatism correction plate 746, the second astigmatism correction plate 747 also has the distribution of the phase difference (thickness) of light transmitted in the Z direction. In addition, assuming that the relationship of the phase difference between light transmitted through the point $O_b$, which is the origin of the (Cartesian) coordinates on the X-Y plane, and light transmitted through the arbitrary position (x, y) on the X-Y plane in the Z direction is a function expressed as $g_{8T}(x, y)$, it has a configuration in which the distribution of the relationship satisfying (13b) is given.

$$g_{8T}(x,y) = -f_{8T}(x,y) \quad (13b)$$

Next, the distribution of the phase difference of light transmitted through the astigmatism correcting element 748 in which the first astigmatism correction plate 746 is displaced by the amount of displacement $+x_0$ from the optical axis (reference arrangement) is considered. On the basis of FIG. 7, the point of intersection between the astigmatism correcting element 210 and the optical axis is set as the point P and this point P is set as the origin (x, y)=(0, 0) on the X-Y plane. In this case, the distribution of the phase difference of light incident on the astigmatism correcting element 748 and transmitted therethrough in the same phase is as follows from the above expressions (13a) and (13b).

$$f_{8T}(x-x_0,y) + g_{8T}(x,y)(=h_8(x,y)) = E(x-x_0)^2 y + F(x-x_0)^2 + t_A(x-x_0) + t_B y - (Ex^2 y + Fx^2 + t_A x + t_B y)$$

By expanding this, (13c) can be obtained assuming that E=1 and $F = t_A = t_B = 0$.

$$h_8(x,y) = -2xyx_0 + yx_0^2 \quad (13c)$$

Here, since the second term of expression (13c) is an offset of the phase difference occurring in light transmitted through the entire surface of the astigmatism correcting element 748, it can be neglected. In addition, a function excluding this offset term is assumed to be polar coordinates $h_8(\rho, \theta)$. In this case, the radius of light which corrects an aberration is expressed as (13f) assuming that light transmitted through the astigmatism correcting element 748 is incident on an objective lens with a specific pupil diameter (radius=$r_0$) and that (13d) and (13e) are set.

$$x = r_0 \cdot \rho \cdot \cos\theta \quad (13d)$$

$$y = r_0 \cdot \rho \cdot \sin\theta \quad (13e)$$

$$h_8(\rho,\theta) = -2x_0 r_0^2 \rho^2 \sin^2\theta + x_0^2 r_0 \rho \sin\theta \quad (13f)$$

In addition, in the present embodiment, expression (13f) showing the phase difference distribution $h_8(\rho, \theta)$ of the polar coordinates when only the first astigmatism correction plate 746 is made to move by $+x_0$ can be expressed as the following expression (13g) if the fringe Zernike polynomial approximation shown in expression (10c) is used.

[Expression 6]

$$h_8(\rho, \theta) = \left(\frac{-\sqrt{6}\,x_0 r_0^2}{3}\right)Z_6 + \frac{x_0^2 r_0}{2} Z_3 \quad (13g)$$

In addition, in expression (13g), the coefficient $C_6$ of $Z_6$ regarding an astigmatism component occurring symmetrically with the directions of $\theta=45°$ and $\theta=135°$ from the X direction as axes can adjust the amount of the astigmatism component occurring symmetrically with the directions of $\theta=45°$ and $\theta=135°$ as axes by adjusting the amount of displacement of $x_0$ of the first astigmatism correction plate 746. Accordingly, the astigmatism can be accurately corrected by moving the first astigmatism correction plate 746 so as to have the opposite sign to the astigmatism occurring in the optical system.

In addition, the aberration of $Z_3$ regarding a tilt component occurs with movement of the first astigmatism correction plate 746. However, if the amount of movement of $x_0$ can be set to be sufficiently smaller than the radius $r_0$ of an objective lens, for example, the astigmatism with the directions of $\theta=45°$ and $\theta=135°$ as axes can be corrected by moving one astigmatism correction plate in the X direction without increasing the aberration of the tilt component. In addition, although only the first astigmatism correction plate 746 is moved in the present embodiment, it is also possible to move only the second astigmatism correction plate 747. In addition, in an optical device including a lens (not shown) which can move in a direction perpendicular to the optical axis and the aberration correcting device 745, it is preferable that the movement direction of the astigmatism correcting element 748 and the movement direction of the lens are perpendicular to each other, that is, the lens is positioned to be movable in the Y-axis direction in this example.

(Eighth Embodiment)

Figure 14:
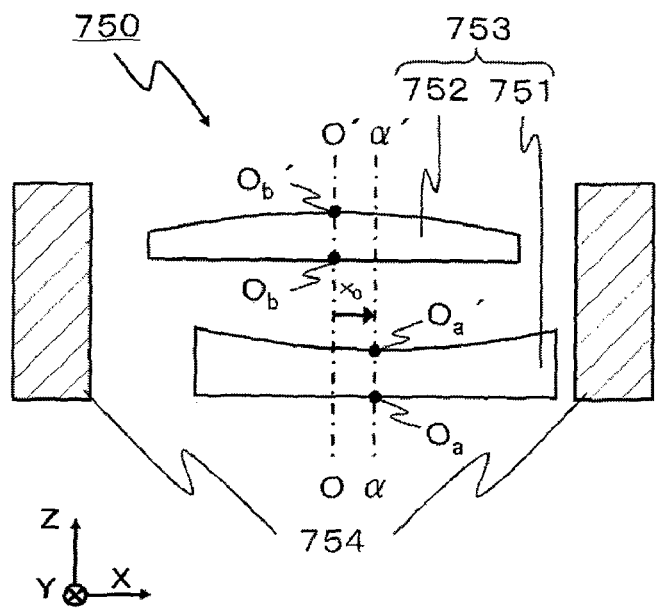
FIG. 14 is a schematic view of an aberration correcting device related to an eighth embodiment.

FIG. 14 is a schematic view showing an aberration correcting device 750 related to an eighth embodiment, and the aberration correcting device 750 as the aberration correcting device 100 in FIG. 1(*a*) is configured to include a coma aberration correcting element 753, which includes a first coma aberration correction plate 751 and a second coma aberration correction plate 752, and a position adjusting section 754. In addition, the position adjusting section 754 has a mechanism which moves only the first coma aberration correction plate 751 in the X direction. Here, the relationship of the phase difference between light transmitted through the point $O_a$, which is the origin of the (Cartesian) coordinates on the X-Y plane of the first coma aberration correction plate 751, and light transmitted through the arbitrary position (x, y) on the X-Y plane in the Z direction is set as a function expressed as $f_{9T}(x, y)$ in consideration of the distribution of the phase difference when a tilt component of expression (4d) is added. In this case, the first coma aberration correction plate 751 is configured such that the distribution $f_{9T}(x, y)$ of the phase difference becomes (14a).

$$f_{9T}(x,y) = Gx^2(x^2+Hy^2)+Jx^2+t_A x+t_B y \quad (14a)$$

(G, H, J, $t_A$, $t_B$ are Coefficients)

Next, the second coma aberration correction plate 752 is considered. Similar to the first coma aberration correction plate 751, the second coma aberration correction plate 752 also has the distribution of the phase difference (thickness) of light transmitted in the Z direction. In addition, assuming that the relationship of the phase difference between light transmitted through the point $O_b$, which is the origin of the (Cartesian) coordinates on the X-Y plane, and light transmitted through the arbitrary position (x, y) on the X-Y plane in the Z direction is a function expressed as $g_{9T}(x, y)$, it has a configuration in which the distribution of the relationship satisfying (14b) is given.

$$g_{9T}(x,y) = -f_{9T}(x,y) \quad (14b)$$

Next, the distribution of the phase difference of light transmitted through the astigmatism correcting element 753 in which the first astigmatism correction plate 751 is displaced by the amount of displacement $+x_0$ from the optical axis (reference arrangement) is considered. On the basis of FIG. 7, the point of intersection between the astigmatism correcting element 210 and the optical axis is set as the point P and this point P is set as the origin (x, y)=(0, 0) on the X-Y plane. In this case, the distribution of the phase difference of light incident on the astigmatism correcting element 753 and transmitted therethrough in the same phase can be given is (14c) from the above expressions (14a) and (14b).

$$f_{9T}(x-x_0,y)+g_{9T}(x,y)(=h_9(x,y))=G(x-x_0)^2\{(x-x_0)^2+Hy^2\}+J(x-x_0)^2+t_A(x-x_0)+t_B-\{G^2(x^2+Hy^2)+Jx^2+t_B y\}$$

By expanding this, (14c) can be obtained assuming that G=H=1 and J=$t_A$=$t_B$=0.

$$h_9(x,y) = -4x^3 x_0 + 6x^2 x_0^2 - 4xx_0^3 + x_0^4 + H(-2xx_0+x_0^2)y^2 \quad (14c)$$

Here, since the fourth term of expression (14c) is an offset of the phase difference occurring in light transmitted through the entire surface of the coma aberration correcting element 753, it can be neglected. In addition, a function excluding this offset term is assumed to be polar coordinates $h_9(\rho, \theta)$. In this case, the radius of light which corrects an aberration is expressed as follows assuming that light transmitted through the astigmatism correcting element 753 is incident on an objective lens with a specific pupil diameter (radius=$r_0$) and that (14d) and (14e) are set.

$$x = r_0 \cdot \rho \cdot \cos\theta \quad (14d)$$

$$y = r_0 \cdot \rho \cdot \sin\theta \quad (14e)$$

In addition, in the present embodiment, the phase difference distribution $h_9(\rho, \theta)$ of the polar coordinates when only the first coma aberration correction plate 751 is made to move by $+x_0$ can be expressed as the following expression (14f) if the fringe Zernike polynomial approximation shown in expression (10c) is used.

[Expression 7]

$$h_9(\rho, \theta) = \left[\frac{x_0 r_0^3}{\sqrt{8}}\left(-1+\frac{H}{2}\right)\right]Z_{10} - \left[\frac{x_0 r_0^3}{\sqrt{8}}\left(1+\frac{H}{6}\right)\right]Z_7 + \left[\frac{x_0^2 r_0^2}{\sqrt{6}}\left(3-\frac{H}{2}\right)\right]Z_5 + \left[\frac{x_0^2 r_0^2}{4\sqrt{3}}(6+H)\right]Z_4 + \left(-x_0 r_0^3 - 2x_0^3 r_0 - \frac{Hx_0 r_0^3}{2}\right)Z_2 + \left(\frac{3x_0^2 r_0^2}{2} + x_0^4 + \frac{Hx_0^2 r_0^2}{2}\right)Z_1 \quad (14f)$$

In addition, in expression (14f), a high-order aberration component $Z_{10}$ is generated in addition to the displacement of $x_0$ of the first coma aberration correction plate 751. However, this component can be reduced by adjusting the value of H. Specifically, as the range of the value of H, a range of 0.5 to 3.5 is preferable and a range of 1.0 to 3.0 is more preferable. In addition, $Z_1$ is an offset component of the phase and is not related to the aberration.

In addition, from expression (14f), $Z_5$ regarding an astigmatism component in the X and Y directions occurs with movement of the first coma aberration correction plate 751. However, if the amount of movement of $x_0$ can be set to be sufficiently smaller than the radius $r_0$ of an objective lens, for example, the coma aberration can be corrected by moving one coma aberration correction plate in the X direction without increasing the astigmatism component in the X and Y directions. In addition, although the aberration of $Z_2$ also occurs, these aberrations can be suppressed similarly if the amount of movement of $x_0$ can be set to be sufficiently smaller than the radius $r_0$ of the objective lens. In addition, although a defocusing component $Z_4$ is also generated, the defocusing component can be adjusted by movement of the image surface. Accordingly, the coma aberration can be accurately corrected by moving the first coma aberration correction plate 751 so as to have the opposite sign to the coma aberration occurring in the optical system. In addition, although only the first coma aberration correction plate 751 is moved in the present embodiment, it is also possible to move only the second coma aberration correction plate 752. In addition, in an optical device including a lens (not shown) which can move in a direction perpendicular to the optical axis and the aberration correcting device 750, it is preferable that the movement direction of the coma aberration correcting element 753 and the movement direction of the lens are perpendicular to each other, that is, the lens is positioned to be movable in the Y-axis direction in this example.

(Ninth Embodiment)

Figure 15:
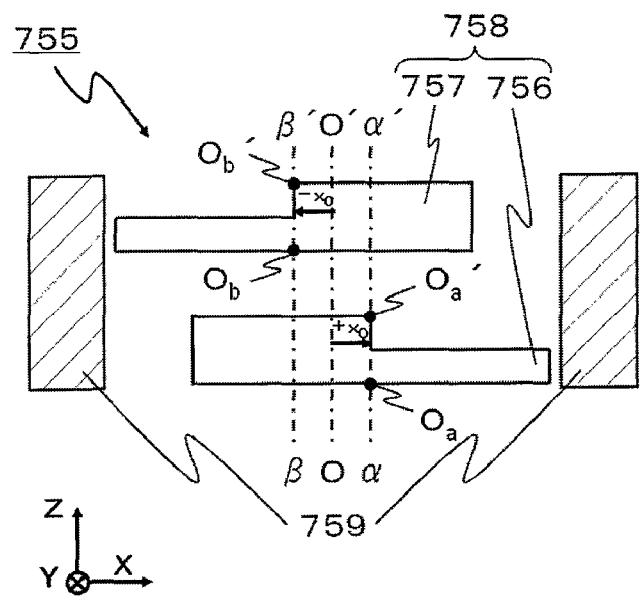
FIG. 15 is a schematic view of an aberration correcting device related to a ninth embodiment.

FIG. 15 is a schematic view showing an aberration correcting device 755 related to a ninth embodiment, and the aberration correcting device 755 as the aberration correcting device 100 in FIG. 1(a) is configured to include an astigmatism correcting element 758, which includes a first astigmatism correction plate 756 and a second astigmatism correction plate 757, and a position adjusting section 759. In addition, FIG. 15 is a schematic view showing the positional relationship when the position adjusting section 759 displaces the first astigmatism correction plate 756 and the second astigmatism correction plate 757 along the X-axis direction by $+x_0$ and $-x_0$, respectively, from the optical axis (reference arrangement). Here, it is assumed that the straight line shifted in parallel from the optical axis (straight line O-O') by $+x_0$ is a straight line α-α' and the straight line shifted in parallel by $-x_0$ is a straight line β-β'. Assuming that the relationship of the phase difference between light transmitted through the point $O_b$, which is the origin of the (Cartesian) coordinates on the X-Y plane, and light transmitted through the arbitrary position (x, y) on the X-Y plane in the Z direction is a function expressed as $f_u(x, y)$, the first astigmatism correction plate 756 which forms the astigmatism correcting element 758 has a shape satisfying the distribution of (15a).

$$f_U(x,y)=AU(x) \quad (15a)$$

(A: coefficient and U(x): step function of 1 if $x \geqq 0$ and 0 if $x < 0$)

In addition, as shown in FIG. 15, assuming that the relationship of the phase difference between light transmitted through the point $O_b{}'$, which is the origin of the (Cartesian) coordinates on the X-Y plane, and light transmitted through the arbitrary position (x, y) on the X-Y plane in the Z direction is a function expressed as $g_u(x, y)$, the second astigmatism correction plate 757 has a shape satisfying the distribution of (15b).

$$g_U(x,y)=-f_U(x,y) \quad (15b)$$

In addition, if the first astigmatism correction plate 756 and the second astigmatism correction plate 757 are displaced along the X-axis direction by $+x_0$ and $-x_0$, respectively, from the optical axis (reference arrangement), the phase difference between light transmitted in the Z direction through the range of $x > x_0$ and $x < -x_0$, of the region where the first astigmatism correction plate 756 and the second astigmatism correction plate 757 overlap each other, and light transmitted through the range of $-x_0 \leqq x \leqq x_0$ in the Z direction becomes A. In addition, such phase difference distribution has an astigmatism component when it is decomposed into components of the Zernike polynomial. Accordingly, the amount of occurrence of an astigmatism component can be controlled by adjusting the size of the amount of displacement $|x_0|$. Through such a mechanism, the correction can be performed to offset the astigmatism occurring in the optical system. In addition, in an optical device including a lens (not shown) which can move in a direction perpendicular to the optical axis and the aberration correcting device 755, it is preferable that the movement direction of the astigmatism correcting element 758 and the movement direction of the lens are perpendicular to each other, that is, the lens is positioned to be movable in the Y-axis direction in this example.

(Tenth Embodiment)

All aberration correction plates which form the aberration correcting device related to each embodiment up to now were formed of optically isotropic materials and were configured to generate desired phase difference distribution for light of a specific wavelength range. In the present embodiment, assuming that the wavelengths of light beams are $\lambda_1$ and $\lambda_2$ ($\lambda_1 < \lambda_2$) in an optical system in which aberration correcting devices are disposed in the common optical path of at least two light beams with different wavelengths, it has a function of performing aberration correction for light with one of the wavelengths so that a phase difference does not occur for light with the other wavelength.

Figure 16:
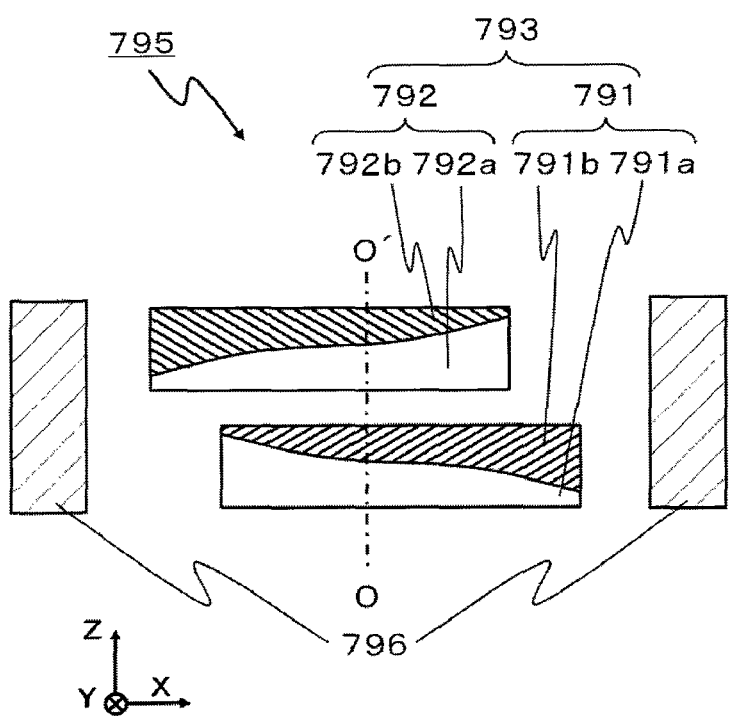
FIG. 16 is a schematic view of an aberration correcting device related to a tenth eighth embodiment.

FIG. 16 is an aberration correcting device related to the present embodiment, and is a schematic view of an astigmatism correcting device 795 which has the same function as the astigmatism correcting device related to the first embodiment. The astigmatism correcting device 795 includes an astigmatism correcting element 793 and a position adjusting section 796, and the astigmatism correcting element 793 includes a first astigmatism correction plate 791 and a second astigmatism correction plate 792. The first astigmatism correction plate 791 has a first aberration correcting section 791a and a second aberration correcting section 791b, and the first aberration correcting section 791a has phase difference distribution equivalent to expression (4a) or a shape obtained by approximation of the distribution for light with a wavelength $\lambda_1$ or light with a wavelength $\lambda_2$ incident from the Z direction. In addition, the second aberration correcting section 791b is configured to be adjacent to the uneven surface of the first aberration correcting section 791a and to make the light emission surface flat.

Similarly, the second astigmatism correction plate 792 has a first aberration correcting section 792a and a second aberration correcting section 792b, and the first aberration correcting section 792a has phase difference distribution equivalent to expression (4b) or a shape obtained by approximation of the distribution for light with a wavelength $\lambda_1$ or light with a wavelength $\lambda_2$ incident from the Z direction. In addition, the second aberration correcting section 792b is configured to be adjacent to the uneven surface of the first aberration correcting section 792a and to make the light emission surface flat. In addition, the first astigmatism correction plate 791 and the second astigmatism correction plate 792 may include a transparent substrate which is optically isotropic. In this case, for example, the case is considered in which aberration correction is performed for light with a wavelength $\lambda_2$ and aberration correction is not performed for light with a wavelength $\lambda_1$. In this case, assuming that the refractive index of each of the first aberration correcting sections 791a and 792a with respect to the light with a wavelength $\lambda_1$ is $n_1(\lambda_1)$, the refractive index of each of the first aberration correcting sections 791a and 792a with respect to the light with a wavelength $\lambda_2$ is $n_1(\lambda_2)$, and the refractive index of each of the second aberration correcting sections 791b and 792b with respect to the light with a wavelength $\lambda_1$ is $n_2(\lambda_1)$ and $n_2(\lambda_2)$, the combination of materials having a wavelength dispersion characteristic of a refractive index which satisfies $n_1(\lambda_1)=n_2(\lambda_1)$ and $n_1(\lambda_2) \neq n_2(\lambda_2)$ is preferable.

As the above-described combination of materials having a wavelength dispersion characteristic of a refractive index, for example, resin materials or inorganic materials such as glass, $SiO_2$, $SiO_xN_y$ (x and y indicate the element ratio of O and N), and $AlO_2$ may be used for the first aberration correcting section and organic resin or the like may be used for the second aberration correcting sections 791b and 792b. As organic resin, a material containing pigment or dye which has an absorption band near the wavelength $\lambda_1$ or $\lambda_2$ may be used so that it is possible to use a characteristic in which the difference between the refractive index with respect to the light with a wavelength $\lambda_1$ and the refractive index with respect to the light with a wavelength $\lambda_2$ is large due to the effect occurring through a steep change in the dielectric constant caused by absorption of light.

Figure 17:
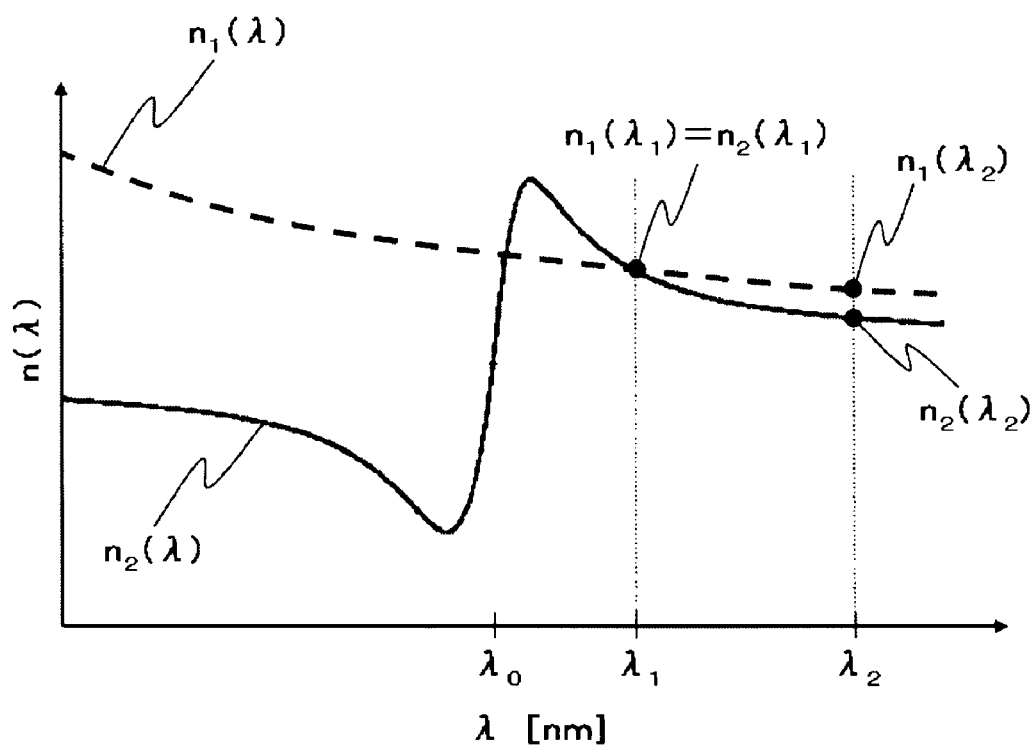
FIG. 17 is a graph showing the wavelength dependency of refractive index of first and second phase adjusting sections which form an aberration correction plate related to the tenth embodiment.

FIG. 17 is a graph showing the wavelength dependency of the refractive index (wavelength dispersion characteristic). Here, it is assumed that the wavelength dependency of the refractive index of a material which forms a first aberration correcting section is $n_1(\lambda)$, the wavelength dependency of the refractive index of a material which forms a second aberration correcting section is $n_2(\lambda)$, and the second aberration correcting section is formed of a material having a wavelength $\lambda_0$ of maximum absorption at the shorter wavelength side than $\lambda_1$. Here, in the case of a material which forms the second aberration correcting section, the refractive index changes largely near the wavelength $\lambda_0$ of maximum absorption, but especially the transmittance of light is largely reduced in the abnormal dispersion region which is a region where the refractive index becomes high as the wavelength becomes long. Therefore, by avoiding the abnormal dispersion region and making the relationship satisfied in which the difference between the refractive index with respect to the wavelength $\lambda_1$ and the refractive index with respect to the wavelength $\lambda_2$ is large, the absorption of light can be avoided to improve the light utilization efficiency.

In addition, a material which does not have absorption at least near the wavelengths $\lambda_1$ and $\lambda_2$ and in which the wavelength dependency of refractive index between these wavelengths is small is selected as the material which forms the first aberration correcting section. Moreover, by making the refractive index with respect to light with a wavelength $\lambda_1$ equal to that of a material which forms the second aberration correcting section as shown in FIG. 17, aberration correction can be performed by generating a phase difference only for light with a wavelength $\lambda_2$ and adjusting the uneven shape to give a distribution of a phase difference without performing aberration correction for the light with a wavelength $\lambda_1$. In addition, without being limited to this, when aberration correction is performed for the light with a wavelength $\lambda_1$ without performing aberration correction for the light with a wavelength $\lambda_2$, materials satisfying $n_1(\lambda_1) \neq n_2(\lambda_1)$ and $n_1(\lambda_2) = n_2(\lambda_2)$ may be combined. In addition, although the distribution of the phase difference has been described on the basis of expression (4a) related to the first embodiment until now, the aberration correction plates may be formed of the above two different materials in any of the aberration correcting devices of the second to ninth embodiments.

Moreover, as a combination of materials by which aberration correction is performed only for light with one wavelength when at least light with a wavelength $\lambda_1$ and light with a wavelength $\lambda_2$ are incident, for example, a birefringent material showing birefringence for incident light may be used for the second aberration correcting sections 791b and 792b. Moreover, also in this case, the first astigmatism correction plate 791 and the second astigmatism correction plate 792 may include a transparent substrate which is optically isotropic. In this case, assuming that the refractive index of an optically isotropic material which forms the first aberration correcting sections 791a and 792a is $n_s$ and the ordinary light refractive index and the extraordinary light refractive index of birefringent materials which form the second aberration correcting sections 791b and 792b are $n_o$ and $n_e$ ($n_o \neq n_e$), respectively, the relationship in which $n_s$ and $n_o$ are approximately equal is set. In this case, for example, by making the light with a wavelength $\lambda_1$ become linearly polarized light matched with a fast axis (axis which becomes an ordinary light refractive index) of a birefringent material and the light with a wavelength $\lambda_2$ become linearly polarized light matched with a slow axis (axis which becomes an extraordinary light refractive index) of a birefringent material, aberration correction can be performed by generating the distribution of the phase difference only for the light with a wavelength $\lambda_2$ without performing aberration correction for the light with a wavelength $\lambda_1$. In addition, it is also possible to use a combination using the relationship in which $n_s$ and $n_e$ are approximately equal.

For example, in the case of an optical system in which the linearly polarized light with a wavelength $\lambda_1$ and the linearly polarized light with a wavelength $\lambda_2$ propagate in a state where their polarization directions are the same, it is possible to dispose an optical element, such as an optical rotator or a ½ wavelength plate with wavelength selectivity, so that the linear polarization direction of the light with a wavelength $\lambda_1$ and the linear polarization direction of the light with a wavelength $\lambda_2$ are perpendicular to each other before these light beams are incident on the aberration correcting element. Of light beams transmitted through such an optical element, for example, light with a wavelength $\lambda_1$ has a polarization direction in which the refractive index is approximately equal between the first and second aberration correcting sections and accordingly, aberration correction is not performed, and light with a wavelength $\lambda_2$ can be subjected to aberration correction because a difference of refractive indices between the first and second aberration correcting sections occurs.

(Eleventh Embodiment)

Figure 18:
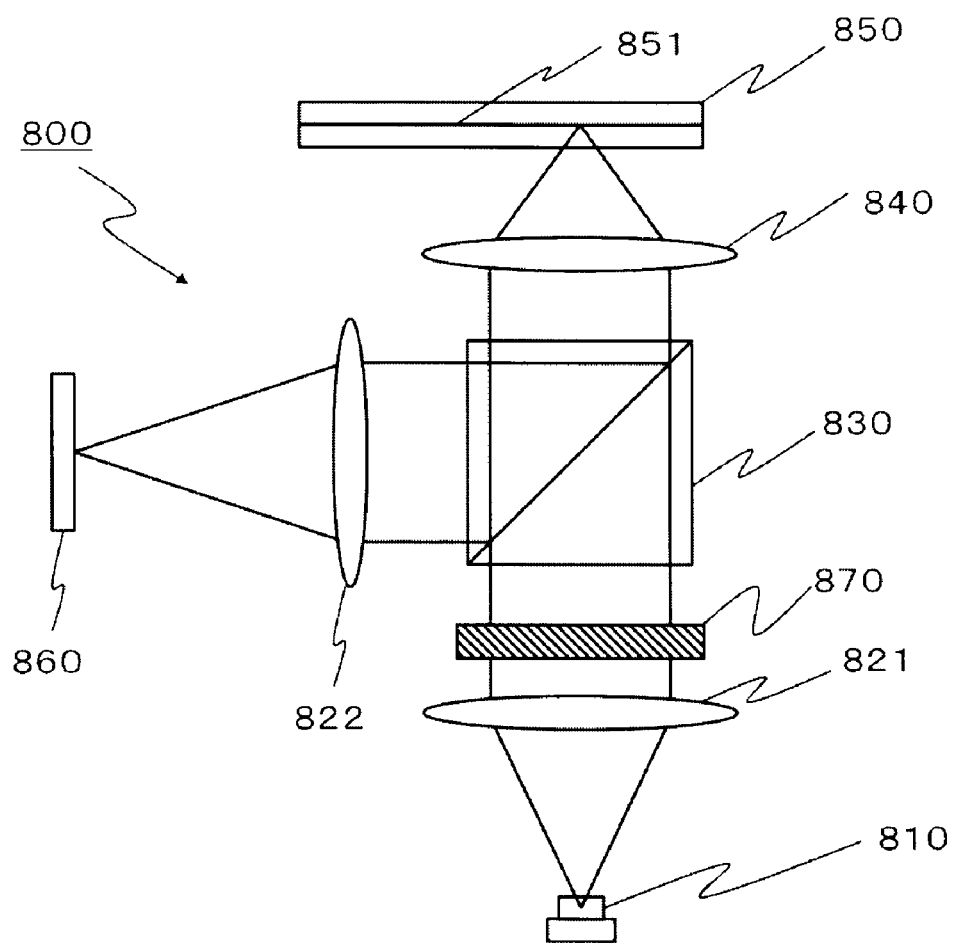
FIG. 18 is a schematic view showing an optical head device.

FIG. 18 is a schematic view of an optical head device 800. The optical head device 800 includes: a light source 810 which emits light with a predetermined wavelength; a collimator lens 821 which converts light from the light source 810 into parallel light; a beam splitter 830 through which the light emitted through the collimator lens 821 is transmitted in the direction of an optical disc 850 and which guides signal light reflected by an information recording surface 851 of the optical disc 850 in the direction of a photodetector 860 by deflection separation; an objective lens 840 which focuses the light from the light source 810 on the information recording surface 851 of the optical disc 850; a collimator lens 822 which focuses the signal light to a photodetector 860; the photodetector 860 which detects the signal light; and an aberration correcting device 870.

In the photodetector 860, a reading signal of the information recorded on the information recording surface 851 which is read by the optical disc 850, and a focus error signal, and a tracking error signal are detected. In addition, the optical head device 800 includes a focus servo (not shown), which controls a lens in the optical axis direction on the basis of the focus error signal, and a tracking servo (not shown), which controls a lens in a direction almost perpendicular to the optical axis on the basis of the tracking error signal.

The light source 810 is formed by a semiconductor laser which emits linearly polarized diverging light of a 405-nm wavelength range, for example. In addition, the light source 810 used in the present invention may emit light of a 660-nm wavelength range, light of a 780-nm wavelength range, or light of another wavelength range, for example, without being limited to the light of a 405-nm wavelength range. Here, the 405-nm wavelength range, the 660-nm wavelength range, and the 780-nm wavelength range are assumed to be 385 nm to 430 nm, 630 nm to 690 nm, and 760 nm to 800 nm, respectively.

Here, the aberration of an optical system can be corrected easily and accurately by disposing the aberration correcting device 200, 300, 400, 720, 740, 745, 750, 755, or 795 related to one of the first to tenth embodiments as the aberration correcting device 870. In addition, the aberration correcting device 870 may be disposed not only in the optical path between the light source 810 and beam splitter 830 but also in the optical path between the light source 810 and the objective lens 840.

Figure 19:
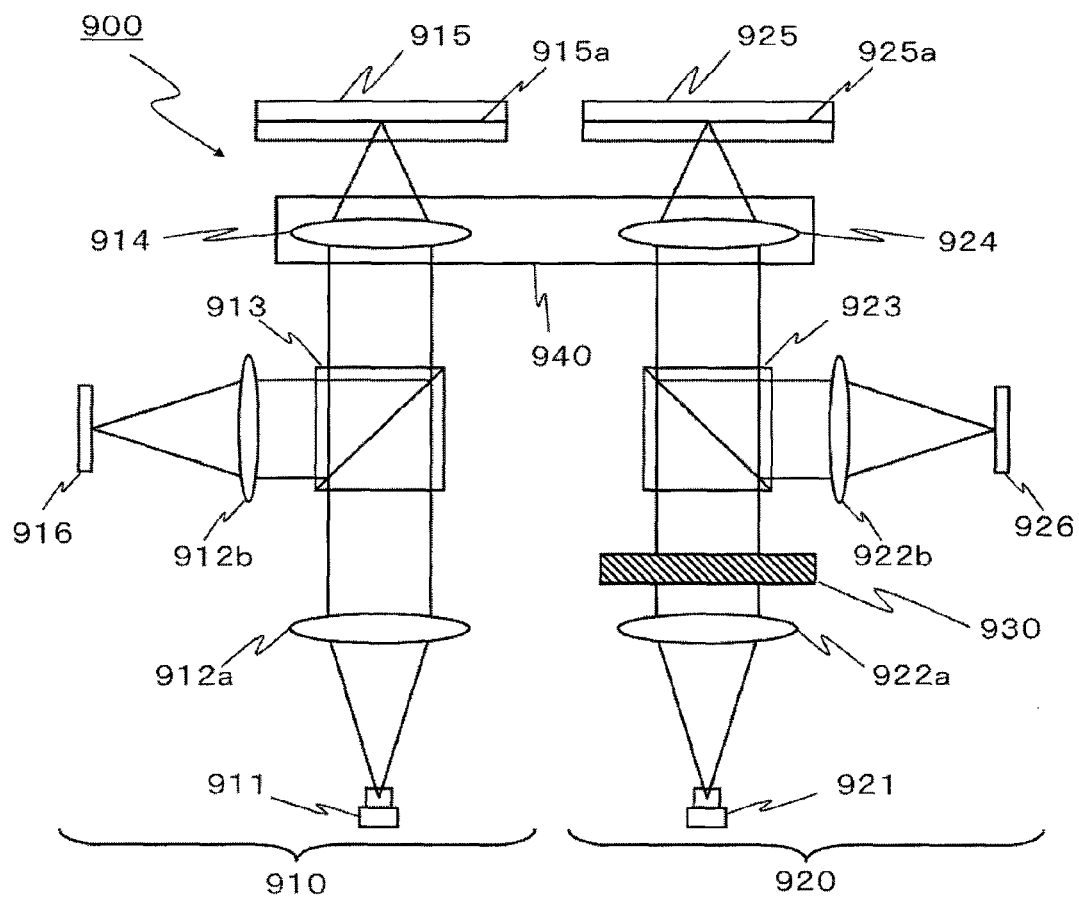
FIG. 19 is a schematic view showing an optical head device having two optical systems.

FIG. 19 is a schematic view showing an optical head device 900 of a different form from the optical head device 800. The optical head device 900 performs recording reading of an optical disc based on a plurality of specifications and has two optical systems 910 and 920 corresponding to the respective specifications. Similar to the optical head device 800 shown in FIG. 18, each optical system includes: a light source (light source 911 or 921) which emits light with a predetermined wavelength; a photodetector (photodetector 916 or 926) which detects light; a collimator lens (collimator lens 912*a* or 922*a*) which converts light from the light source into parallel light; a beam splitter (beam splitter 913 or 923) which allows light from the light source emitted from the collimator lens to be transmitted therethrough and guides the light in a direction of an optical disc (optical disc 915 or 925) and which guides signal light reflected by the optical disc in a direction of the photodetector by deflection separation; an objective lens (objective lens 914 or 924) which focuses the light from the light source on an information recording surface (information recording surface 915*a* or 925*a*) of the optical disc; and a collimator lens (collimator lens 912*b* or 922*b*) which focuses the signal light deflection-separated by the beam splitter to the photodetector. In addition, the objective lens 914 of the optical system 910 and the objective lens 924 of the optical system 920 are fixed by a common lens holder 940.

In addition, the optical head device 900 in FIG. 19 shows an example in which an aberration correcting device 930 is included only in the optical system 920. Any of the aberration correcting devices 200, 300, 400, 720, 740, 745, 750, 755, and 795 related to the first to tenth embodiments may be disposed as the aberration correcting device 930. In addition, what is equivalent to the aberration correcting device 930 may be disposed in the optical system 910.

The optical head device 900 detects the type, such as the optical disc 915 or 925, and performs switching regarding whether to use the optical system 910 or the optical system 920 corresponding to the type when performing recording reading of an optical disc, for example.

In the case of such an optical head device 900, assembly is first performed from one optical system (for example, the optical system 910). In this case, the arrangement positions are precisely adjusted so that there is neither optical axis deviation nor inclination in each optical component which forms the optical system. At this time, the lens holder 940 is fixed. Then, assembly of the other optical system (for example, the optical system 920) is performed. However, since the position of the lens holder 940 which fixes the objective lens of the optical system is already fixed, the objective lens housed in the lens holder 940 may have an inclination (deviation of an angle) from the optical axis of the optical system. For example, the coma aberration occurring due to this inclination can be corrected by disposing the aberration correcting device 750 of the eighth embodiment at the position of the aberration correcting device 930.

Figure 20:
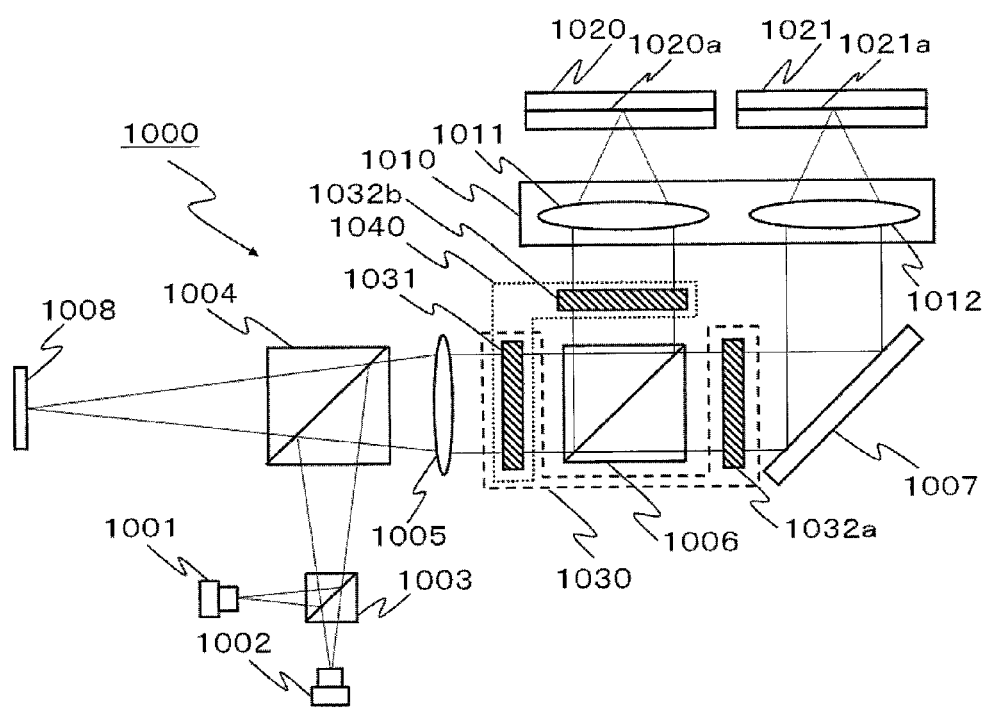
FIG. 20 is a schematic view showing an optical head device.

In addition, an optical head device corresponding to the case where a different optical element from an aberration correction plate is disposed between a plurality of aberration correction plates as shown in FIG. 1(*b*) will be specifically described. FIG. 20 is a schematic view showing an optical head device 1000 of a different form from the optical head device 900. A light source 1001 is formed by a semiconductor laser which emits linearly polarized diverging light of a 405-nm wavelength range, for example, and a light source 1002 is formed by a hybrid-type semiconductor laser which emits linearly polarized diverging light of a 660-nm wavelength range and a 785-nm wavelength range.

A dichroic prism 1003 has a function of making light of a 405-nm wavelength range reflected therefrom and light of a 660-nm wavelength range and light of a 785-nm wavelength range transmitted therethrough, these light beams propagate to a beam splitter 1004. The beam splitter 1004 reflects these light beams of three wavelength ranges, which become linearly polarized light beams in the same direction, and these light beams become parallel light beams using a collimator lens 1005. Then, the parallel light beams propagate to a dichroic prism 1006. The dichroic prism 1006 has a function of making light of a 660-nm wavelength range and light of a 785-nm wavelength range reflected therefrom and light of a 405-nm wavelength range transmitted therethrough. Then, the light of a 660-nm wavelength range and the light of a 785-nm wavelength range are focused on the information recording surface 1020*a* of a DVD or a CD as an optical disc 1020 by an objective lens 1011 housed in a lens holder 1010. On the other hand, the light of a 405-nm wavelength range is reflected by a mirror 1007 and focused on the information recording surface 1021*a* of a BD or the like as an optical disc 1021 by an objective lens 1012. Then, the reflected light propagates along the same optical path in the opposite direction to pass through the beam splitter 1004 and reaches a photodetector 1008.

Here, two aberration correction plates (first and second aberration correction plates) which form an aberration correcting device may be disposed before and after the dichroic prism 1006 in the optical path, for example. For example, a first aberration correction plate 1031 is disposed in the optical path common to the light of a 405-nm wavelength range, the light of a 660-nm wavelength range, and the light of a 785-nm wavelength range, and a second aberration correction plate 1032*a* is disposed in the optical path of only the light of a 405-nm wavelength range. In this case, the first aberration correction plate 1031, the second aberration correction plate 1032*a*, and a position adjusting section (not shown) which adjusts their movements may be collectively called an aberration correcting device 1030. Similarly, a second aberration correction plate 1032*b* may be disposed in the optical path common to the light of a 660-nm wavelength range and the light of a 785-nm wavelength range, and the first aberration correction plate 1031, the second aberration correction plate 1032*b*, and a position adjusting section (not shown) which adjusts their movements may be collectively called an aberration correcting device 1040.

The number of aberration correction plates included in each of the aberration correcting devices 1030 and 1040 is not limited to 2. For example, each of the aberration correcting devices 1030 and 1040 may include four aberration correction plates like the aberration correcting device 400 related to the third embodiment. In addition, all of the plurality of aberration correction plates may be displaced, and only one of them may be displaced like the aberration correcting device 740 of the fifth embodiment. In addition, since the first and second aberration correction plates are disposed in the optical path of parallel light in both the aberration correcting devices 1030 and 1040 included in the optical head device 1000, that is, the effective diameter of light incident on any aberration correction plate is the same, it is possible to use aberration correction plates subjected to the same processing. In addition, for example, these aberration correction plates may be laminated on the surface of the dichroic prism 1006 or may be laminated on a ¼ wavelength plate (not shown) in the optical path between the dichroic prism 1006 and the objective lens 1011. This is preferable because miniaturization can be realized. In addition, the second aberration correction plate 1032*b* may also be laminated on a mirror by adjusting processing of irregularities and the like of the surface having a distribution of the phase difference.

Figure 21:
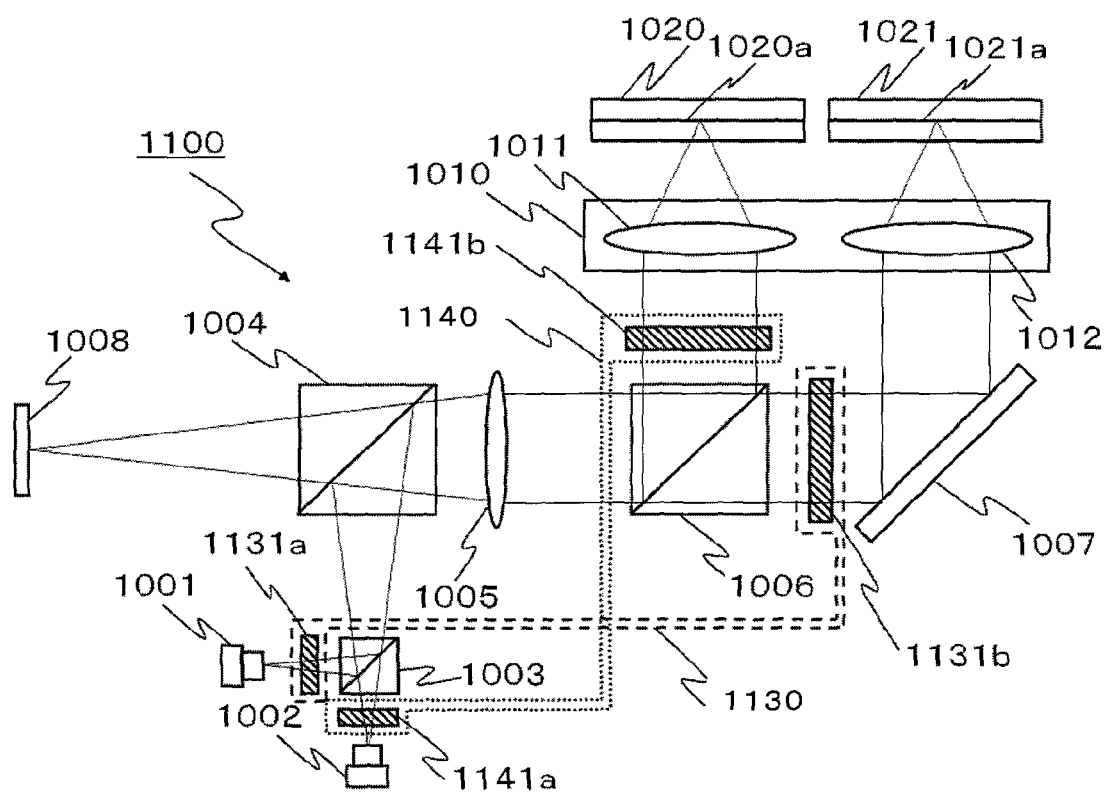
FIG. 21 is a schematic view showing an optical head device.

FIG. 21 is a schematic view showing an optical head device 1100 with a different arrangement of aberration correcting devices from the optical head device 1000. Accordingly, the same reference numerals are given to optical components and the like other than aberration correcting devices 1130 and 1140, and a repeated explanation is avoided. The aberration correcting device 1130 includes a first aberration correction plate 1131*a*, a second aberration correction plate 1131*b*, and a position adjusting section (not shown) which adjusts their movements. In addition, for example, the first aberration correction plate 1131*a* may be laminated on a diffraction element (grating; not shown) which generates a main beam and two sub-beams, for example, in the optical path of diverging light between the light source 1001 and the dichroic prism 1003 and the second aberration correction plate 1131*b* may be laminated on the dichroic prism 1006 or a ¼ wavelength plate (not shown) in the optical path between the dichroic prism 1006 and the objective lens 1011 in order to realize miniaturization.

The aberration correcting device 1140 includes a first aberration correction plate 1141*a*, a second aberration correction plate 1141*b*, and a position adjusting section (not shown). The first aberration correction plate 1141*a* may be laminated on a diffraction element (grating; not shown) which generates a main beam and two sub-beams, for example, in the optical path of diverging light between the light source 1002 and the dichroic prism 1003, for example. The second aberration correction plate 1141*b* may be laminated, for example, on the dichroic prism 1006 or a ¼ wavelength plate (not shown) in the optical path between the dichroic prism 1006 and the objective lens 1012 in order to realize miniaturization. In addition, the second aberration correction plate 1141*b* may also be laminated on a mirror by adjusting processing of irregularities and the like of the surface having a distribution of the phase difference.

In addition, since divergent light and parallel light are incident on the first aberration correction plate 1131*a* and the second aberration correction plate 1131*b* included in the aberration correcting device 1130, respectively, the effective diameters ($D_1$ and $D_2$) are different. Accordingly, optical design taking into consideration the distribution of the phase difference between the first aberration correction plate 1131*a* and the second aberration correction plate 1131*b* according to the effective diameter ratio k ($=D_2/D_1$) is preferable. In addition, according to this effective diameter ratio k, a position adjusting section (not shown) may adjust the amounts of displacement of the first aberration correction plate 1131*a* and the second aberration correction plate 1131*b*. Also for the first aberration correction plate 1141*a* and the second aberration correction plate 1141*b* included in the aberration correcting device 1140, it is preferable to carry out such an optical design and adjust the amount of displacement using a position adjusting section in the same manner.

EXAMPLES

First Example

The case is considered in which a quartz glass substrate with a refractive index $n_s=1.47$ is used as the astigmatism correcting element 210 based on the first embodiment, the surrounding medium is air (refractive index: 1), and light with a wavelength of 405 nm is incident. The quartz glass substrate is processed such that the distribution of the phase difference of the X-Y plane having the point $O_a$ of the first astigmatism correction plate 211 of the astigmatism correcting element 210 as the origin $(x, y)=(0, 0)$ and the distribution of the phase difference of the X-Y plane having the point $O_b$ of the second astigmatism correction plate 212 as the origin $(x, y)=(0, 0)$ become as follows on the basis of expressions (4a) and (4b), respectively $$f_1(x,y)=ax^3+bxy^2,$$

$$g_1(x,y)=-f_1(x,y),$$

and $a=1.6 \times 10^{-5}$ [mm$^{-2}$] and $b=-4.8 \times 10^{-5}$ [mm$^{-2}$] are set.

Figure 22:
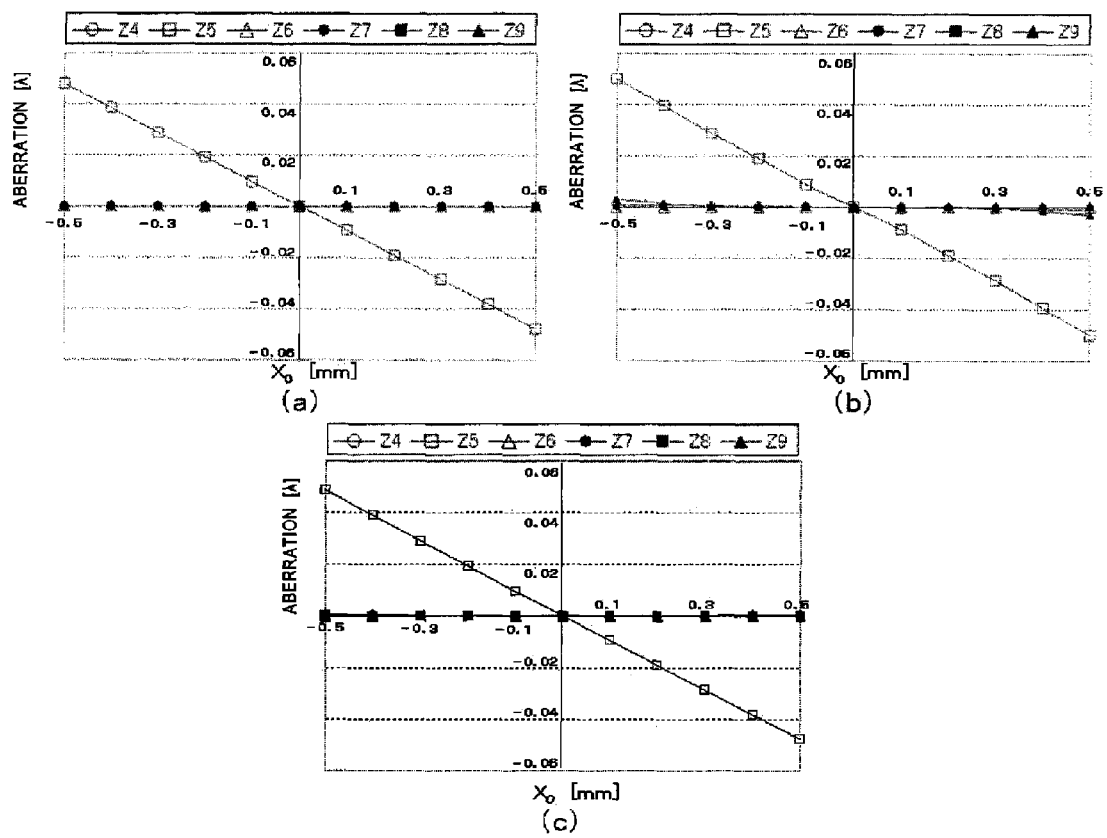
FIGS. 22(a) to 22(c) are graphs showing various kinds of aberrations with respect to the amount of displacement ($x_0$) in first to third examples.

The calculation result of the amount of aberration [λ] occurring when the first astigmatism correction plate 211 is displaced along the X direction in a range of +0.5 mm to −0.5 mm from the optical axis and the second astigmatism correction plate 212 is displaced along the X direction in a range of −0.5 mm to +0.5 mm from the optical axis (each amount of displacement $|x_0|$ is the same) assuming that the wavelength of light incident in the Z direction is 405 nm and the effective diameter of the effective region where light is incident on the astigmatism correcting element 210 is 2 mmφ is shown in FIG. 22(*a*). In addition, the amount of aberration [λ] means the square root of the mean of the squares of aberrations and can also be expressed in units of [λrms]. In the following examples and comparative examples, the same expression of the amount of aberration [λ] is used. Z4 to Z9 in FIG. 22(*a*) indicate Zernike coefficients. Z4 is an amount of aberration corresponding to defocusing, Z5 and Z6 are amounts of aberration corresponding to the astigmatism, Z7 and Z8 are amounts of aberration corresponding to the coma aberration, and Z9 is an amount of aberration corresponding to the spherical aberration. The wavefront aberration in FIG. 22(*a*) is standardized by the wavelength of incident light. From FIG. 22(*a*), since the astigmatism correcting element of the present example generates the astigmatism proportional to the amount of displacement but does not generate other aberration components, the astigmatism occurring in the optical system can be accurately corrected by adjusting the amount of displacement ($x_0$).

In addition, FIG. 22(*b*) is a graph showing the calculation result of a function $f_1(x, y)=ax^3+bxy^2$ and a function $g_1(x, y)=-f_1(x, y)$ when the difference between the maximum and minimum values of the functions is equally divided into seven parts in a range where light is incident, processing based on the number of steps N=8 is performed such that one step difference becomes about 34 nm, and the same conditions are set for the others. In addition, the method of approximation to the height of each step is based on the idea illustrated in FIG. 5(*a*). This is the same in examples of the step shape in the following fifth and sixth examples. Similarly, also in this case, since the astigmatism proportional to the amount of displacement occurs but other aberration components do not occur, the astigmatism correcting element can be manufactured through easy processing and the astigmatism occurring in the optical system can be accurately corrected by adjusting the amount of displacement ($x_0$).

In addition, FIG. 22(c) is a graph showing the calculation result of a function $f_1(x, y)=ax^3+bxy^2$ and a function $g_1(x, y)=-f_1(x, y)$ when the step difference is equally divided into seven parts in a range where the value of the function is $-5.4\times10^{-5}$ to $5.4\times10^{-5}$ and processing based on the number of steps N=8 is performed such that one step difference becomes about 33 nm but the conditions in this case are that the height of each step does not exceed the value of the function on the basis of the idea illustrated in FIG. 5(b). Similarly, also in this case, since the astigmatism proportional to the amount of displacement occurs but other aberration components do not occur, the astigmatism correcting element can be manufactured through easy processing and the astigmatism occurring in the optical system can be accurately corrected by adjusting the amount of displacement ($x_0$).

Second Example

The first example is an example where the quartz glass substrate is directly processed to have an uneven shape for the astigmatism correcting element 210, but the second example is an example using an ultraviolet curable resin as the material with an uneven shape.

First, a flat quartz glass substrate and a molded substrate with an uneven shape are prepared. The depth of a groove of the molded substrate is set as follows on the basis of the above expressions (4a) and (4b)

$f_1(x,y)=ax^3+bxy^2$, $g_1(x,y)=-f_1(x,y)$, and $a=1.45\times10^{-5}$ [mm$^{-2}$] and $b=-4.35\times10^{-5}$ [mm$^{-2}$] are assumed.

Then, the quartz glass substrate and the molded substrate are washed and dried. Then, a silane coupling treatment for improving the adhesion between the ultraviolet curable resin and the quartz glass substrate is performed on one surface of the quartz glass substrate, and a releasing treatment for improving the release efficiency between the ultraviolet curable resin and the molded substrate is performed on the uneven surface of the molded substrate. Then, ultraviolet curable resin monomers are dropped onto the quartz glass substrate surface subjected to the silane coupling treatment, and the uneven surface of the molded substrate is made to face the quartz glass substrate surface so that ultraviolet curable resin monomers are interposed therebetween. Then, ultraviolet rays are irradiated to the quartz glass substrate to cure the curable resin monomers and release the molded substrate. AR coating is performed on the surface by vacuum deposition after releasing, and the AR-coated substrate is diced to obtain the first astigmatism correction plate 211. The second astigmatism correction plate 212 is obtained by the same method. In addition, a material is used for which the refractive index of resin after ultraviolet curing becomes 1.519 for light with a wavelength of 405 nm.

The amount of aberration [λ] occurring when the first astigmatism correction plate 211 is displaced along the X direction in a range of +0.5 mm to −0.5 mm from the optical axis and the second astigmatism correction plate 212 is displaced along the X direction in a range of −0.5 mm to +0.5 mm from the optical axis (each amount of displacement |$x_0$| is the same) assuming that the wavelength of light incident in the Z direction is 405 nm and the effective diameter of the effective region where light is incident on the astigmatism correcting element 210 is 2 mmφ is the same as in the first example, and the astigmatism proportional to the amount of displacement occurs but other aberration components do not occur. Accordingly, the astigmatism correcting element can be manufactured through easy processing and the astigmatism occurring in the optical system can be accurately corrected by adjusting the amount of displacement ($x_0$).

Third Example

The third example is an example where an ultraviolet curable resin containing a fluorine-containing monomer is used as the material with an uneven shape in order to obtain an aberration correction plate without a releasing treatment.

First, a flat quartz glass substrate and a molded substrate with an uneven shape are prepared. The depth of a groove of the molded substrate is set as follows on the basis of the above expressions (4a) and (4b)

$f_1(x,y)=ax^3+bxy^2$, $g_1(x,y)=-f_1(x,y)$, and $a=1.53\times10^{-5}$ [mm$^{-2}$] and $b=-4.6\times10^{-5}$ [mm$^{-2}$] are assumed.

Then, the quartz glass substrate and the molded substrate are washed and dried. Then, a silane coupling treatment for improving the adhesion between the ultraviolet curable resin containing a fluorine-containing monomer and the quartz glass substrate is performed on one surface of the quartz glass substrate. Then, a material obtained by mixing acrylic monomers with a fluorine-containing monomers having a fluoroalkyl group is dropped onto the quartz glass substrate surface subjected to the silane coupling treatment, and the uneven surface of the molded substrate is made to face the quartz glass substrate surface so that ultraviolet curable resin monomers containing a fluorine-containing monomer is interposed therebetween. Then, ultraviolet rays are irradiated to the quartz glass substrate in this state to cure the curable resin monomers and release the molded substrate. AR coating is performed on the surface by vacuum deposition after releasing, and the AR-coated substrate is diced to obtain the first astigmatism correction plate 211. The second astigmatism correction plate 212 is obtained by the same method. In addition, the refractive index of resin after ultraviolet curing becomes 1.49 for light with a wavelength of 405 nm.

The amount of aberration [λ] occurring when the first astigmatism correction plate 211 is displaced along the X direction in a range of +0.5 mm to −0.5 mm from the optical axis and the second astigmatism correction plate 212 is displaced along the X direction in a range of −0.5 mm to +0.5 mm from the optical axis (each amount of displacement |$x_0$| is the same) assuming that the wavelength of light incident in the Z direction is 405 nm and the effective diameter of the effective region where light is incident on the astigmatism correcting element 210 is 2 mmφ is the same as in the first example, and the astigmatism proportional to the amount of displacement occurs but other aberration components do not occur. Accordingly, the astigmatism correcting element can be manufactured through easy processing and the astigmatism occurring in the optical system can be accurately corrected by adjusting the amount of displacement ($x_0$).

Fourth Example

The case is considered in which a quartz glass substrate with a refractive index $n_s=1.47$ is used as the astigmatism correcting element 210 based on the fourth embodiment, the surrounding medium is air (refractive index: 1), and light with a wavelength of 405 nm is incident. The quartz glass substrate is processed such that the distribution of the phase difference of the X-Y plane having the point $O_a$ of the first astigmatism correction plate 211 of the astigmatism correcting element 210 as the origin (x, y)=(0, 0) and the distribution of the phase difference of the X-Y plane having the point $O_b$ of the second astigmatism correction plate 212 as the origin (x, y)=(0, 0) become as follows on the basis of expressions (4a) and (4b), respectively $$f_1(x,y)=ax^3+bxy^2,$$

$$g_1(x,y)=-f_1(x,y),$$

and a=1.6×10$^{-5}$ [mm$^{-2}$] and b=−4.8×10$^{-5}$ [mm$^{-2}$] are set.

The amount of aberration [λ] occurring when the position adjusting section 730 displaced the first astigmatism correction plate 211 along the X direction in a range of +0.5 mm to −0.5 mm from the optical axis and along the Y direction in a range of +0.5 mm to −0.5 mm from the optical axis and displaced the second astigmatism correction plate 212 along the X direction in a range of −0.5 mm to +0.5 mm from the optical axis and along the Y direction in a range of −0.5 mm to +0.5 mm from the optical axis (each amount of displacement $|x_0|$ and $|y_0|$ is the same) assuming that the wavelength of light incident in the Z direction was 405 nm and the effective diameter of the effective region where light was incident on the astigmatism correcting element 210 was 2 mmφ ($r_0$=1 [mm]) was calculated.

Figure 23:
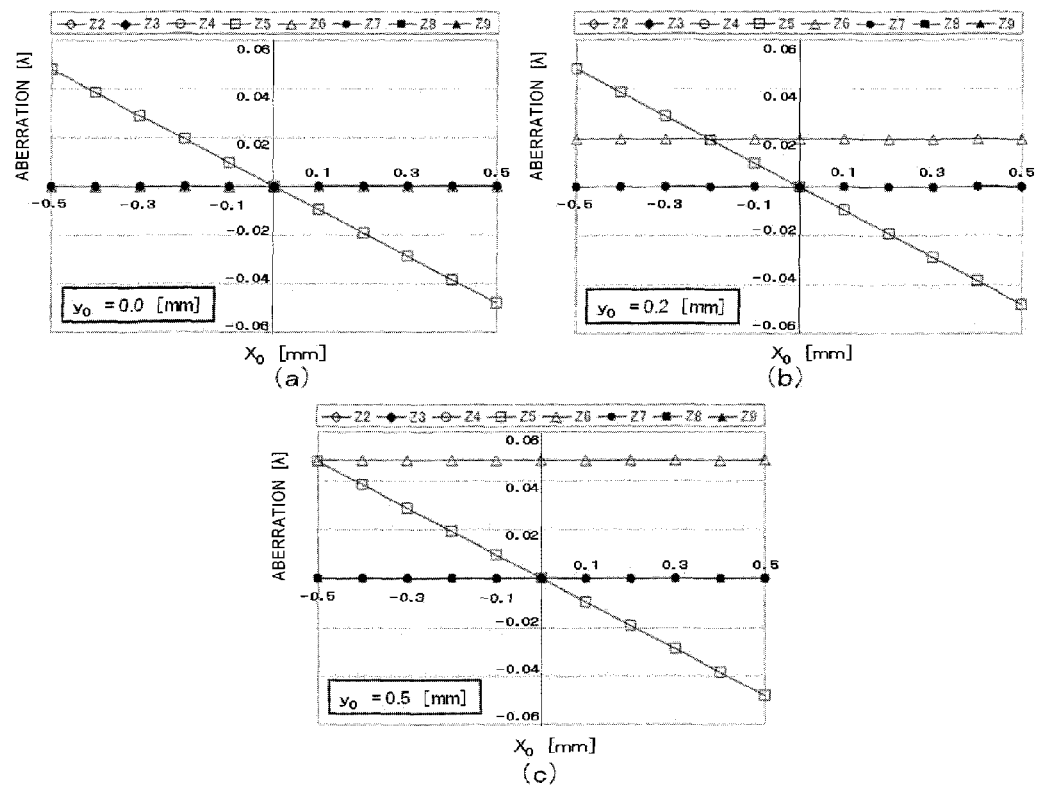
FIGS. 23(a) to 23(c) are graphs showing various kinds of aberrations with respect to the amount of displacement ($x_0$, $y_0$) in a fourth example.

FIGS. 23(a) to 23(c) show the amount of displacement [λ] in a range of $x_0$ of −0.5 to +0.5 [mm] when $y_0$ is fixed to 0.0 [mm], 0.2 [mm], and 0.5 [mm], respectively. Z2 to Z9 in FIGS. 23(a) to 23(c) indicate Zernike coefficients. Z2 and Z3 are amounts of aberration corresponding to tilt, Z4 is an amount of aberration corresponding to defocusing, Z5 and Z6 are amounts of aberration corresponding to the astigmatism, Z7 and Z8 are amounts of aberration corresponding to the coma aberration, and Z9 is an amount of aberration corresponding to the spherical aberration. The wavefront aberration is standardized by the wavelength of incident light. From these results, since the aberration correcting device 720 of the present embodiment generates the astigmatism proportional to the amount of displacement but does not generate other aberration components, the astigmatism occurring in the optical system can be accurately corrected by adjusting the amount of displacement ($x_0$, $y_0$). Moreover, although not shown, it can be confirmed that the amount of aberration of Z6 corresponding to the amount of displacement of $y_0$ also occurs in the case of $y_0$<0 similar to the case of $y_0$>0.

Fifth Example

The case is considered in which a quartz glass substrate with a refractive index $n_s$=1.47 is used as the astigmatism correcting element 210 based on the fifth embodiment, the surrounding medium is air (refractive index: 1), and light with a wavelength of 405 nm is incident. The quartz glass substrate is processed such that the distribution of the phase difference of the X-Y plane having the point $O_a$ of the first astigmatism correction plate 211 of the astigmatism correcting element 210 as the origin (x, y)=(0, 0) and the distribution of the phase difference of the X-Y plane having the point $O_b$ of the second astigmatism correction plate 212 as the origin (x, y)=(0, 0) become as follows on the basis of expressions (4a) and (4b), respectively $$f_1(x,y)=ax^3+bxy^2,$$

$$g_1(x,y)=-f_1(x,y),$$

and a=3.2×10$^{-5}$ [mm$^{-2}$] and b=−9.6×10$^{-5}$ [mm$^{-2}$] are set.

The amount of aberration [λ] occurring when the position adjusting section 741 displaced the first astigmatism correction plate 211 along the X direction in a range of +0.5 mm to −0.5 mm from the optical axis and along the Y direction in a range of +0.5 mm to −0.5 mm from the optical axis and did not displace the second astigmatism correction plate 212 assuming that the wavelength of light incident in the Z direction was 405 nm and the effective diameter of the effective region where light was incident on the astigmatism correcting element 210 was 2 mmφ ($r_0$=1 [mm]) was calculated.

Figure 24:
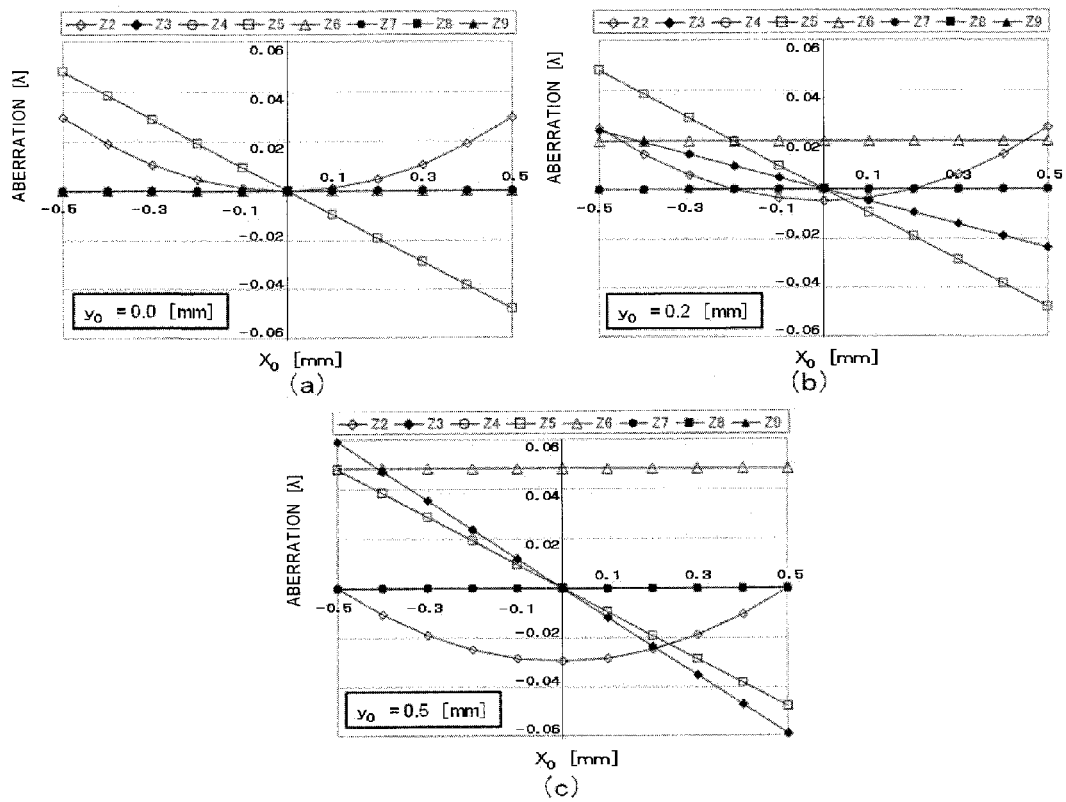
FIGS. 24(a) to 24(c) are graphs showing various kinds of aberrations with respect to the amount of displacement ($x_0$, $y_0$) in a fifth example.

FIGS. 24(a) to 24(c) show the amount of displacement [λ] in a range of $x_0$ of −0.5 to +0.5 [mm] when $y_0$ is fixed to 0.0 [mm], 0.2 [mm], and 0.5 [mm], respectively. Z2 to Z9 in FIGS. 24(a) to 24(c) indicate Zernike coefficients, and the wavefront aberration is standardized by the wavelength of incident light. From these results, the aberration correcting device 740 of this example generates the astigmatism proportional to the amount of displacement. In addition, the aberration of a tilt component regarding Z2 and Z3 occurs. However, when Z2 and Z3 are $r_0$=1 [mm] at 0.05 [λ], the tilt angle is about 0.001[°] (Tan$^{-1}$(50 mmλ/1)). Accordingly, there is little influence on the optical system. In addition, since aberration components other than the tilt component are not generated, the astigmatism occurring in the optical system can be accurately corrected by adjusting the amount of displacement ($x_0$, $y_0$). Moreover, although not shown, it can be confirmed that the amount of aberration of Z6 corresponding to the amount of displacement of $y_0$ also occurs in the case of $y_0$<0 similar to the case of $y_0$>0.

Sixth Example

The case is considered in which a quartz glass substrate with a refractive index of 1.47 is used as the astigmatism correcting element 748 based on the sixth embodiment, the surrounding medium is air (refractive index: 1), and light with a wavelength of 405 nm is incident. The quartz glass substrate is processed such that the distribution of the phase difference of the X-Y plane having the point $O_a$ of the first astigmatism correction plate 746 as the origin (x, y)=(0, 0) and the distribution of the phase difference of the X-Y plane having the point $O_b$ of the second astigmatism correction plate 747 as the origin (x, y)=(0, 0) become as follows on the basis of expressions (12b) and (12c), respectively $$f_{7T}(x,y)=Dx^3+t_Ax+t_By,$$

$$g_{7T}(x,y)=-f_{7T}(x,y),$$

and D=7.05×10$^{-5}$ [mm$^{-2}$] is set.

Figure 25:
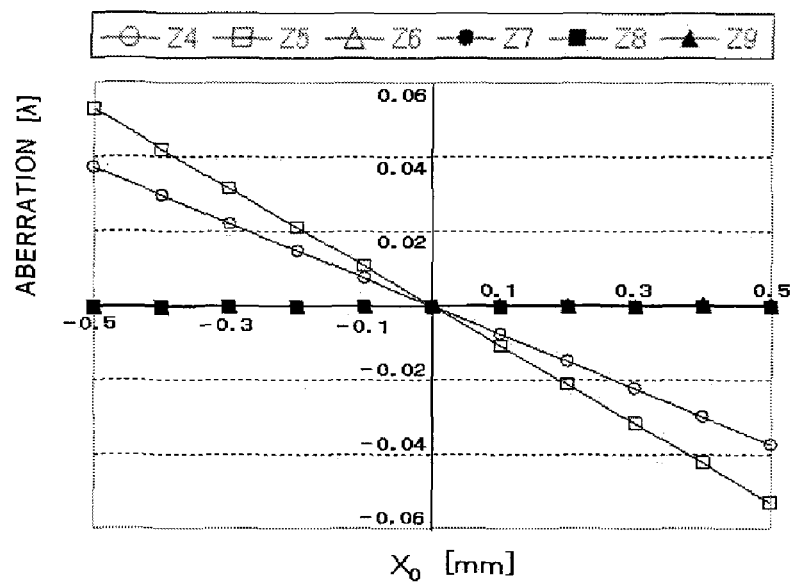
FIG. 25 is a graph showing various kinds of aberrations with respect to the amount of displacement ($x_0$) in a sixth example.

The calculation result of the amount of aberration [λ] occurring when the first astigmatism correction plate 746 is displaced along the X direction in a range of +0.5 mm to −0.5 mm from the optical axis (each amount of displacement $|x_0|$ is the same) assuming that the wavelength of light incident in the Z direction is 405 nm and the effective diameter of the effective region where light is incident on the astigmatism correcting element 748 is 2 mmφ is shown in FIG. 25. From FIG. 25, the astigmatism correcting element of this example generates the astigmatism proportional to the amount of displacement. As other aberration components, defocusing (Z4) occurs. However, when there are movable collimator lens and focusing lens in the optical system, correction of defocusing is possible. Accordingly, an aberration increase can be suppressed. In this way, the astigmatism occurring in the optical system can be accurately corrected by adjusting the amount of displacement ($x_0$).

Seventh Example

In a seventh example, the case is considered in which a quartz glass substrate with a refractive index of 1.47 is used as the astigmatism correcting element 748 based on the seventh embodiment, a surrounding medium is air (refractive index: 1), and light with a wavelength of 405 nm is incident. The quartz glass substrate is processed such that the distribution of the phase difference of the X-Y plane having the point $O_a$ of the first astigmatism correction plate 746 as the origin (x, y)=(0, 0) and the distribution of the phase difference of the X-Y plane having the point $O_b$ of the second astigmatism correction plate 747 as the origin (x, y)=(0, 0) become as follows on the basis of expressions (13a) and (13b), respectively $F = t_A = t_B = 0$ $f_{8T}(x,y) = Ex^2 y,$ $g_{8T}(x,y) = -f_{8T}(x,y),$ and $E = 2.1 \times 10^{-4}$ [mm$^{-2}$] is set.

Figure 26:
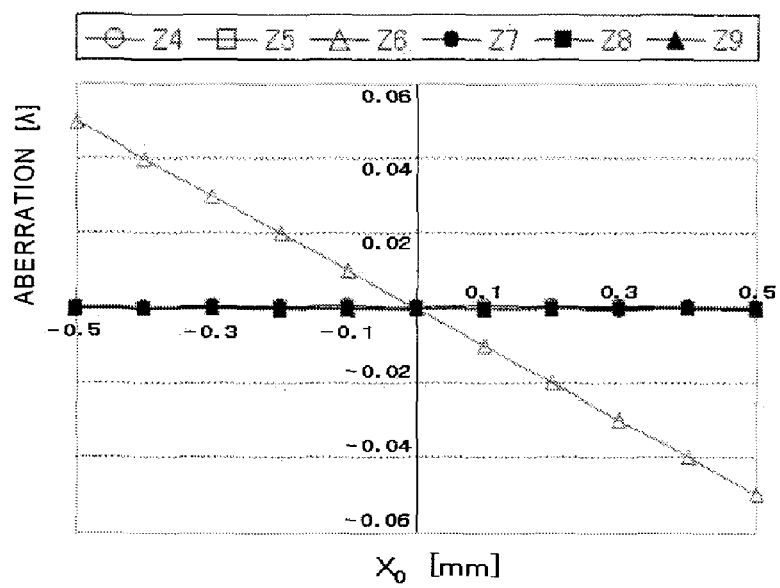
FIG. 26 is a graph showing various kinds of aberrations with respect to the amount of displacement ($x_0$) in a seventh example.

The calculation result of the amount of aberration [λ] occurring when the first astigmatism correction plate 746 is displaced along the X direction in a range of +0.5 mm to −0.5 mm from the optical axis (each amount of displacement $|x_0|$ is the same) assuming that the wavelength of light incident in the Z direction is 405 nm and the effective diameter of the effective region where light is incident on the astigmatism correcting element 748 is 2 mmφ is shown in FIG. 26. From FIG. 26, the astigmatism correcting element of this example generates the astigmatism which is proportional to the amount of displacement and symmetrical with the directions of θ=45° and θ=135° from the X direction as axes. In this way, the astigmatism occurring in the optical system can be accurately corrected by adjusting the amount of displacement ($x_0$).

Eighth Example

In an eighth example, the case is considered in which a quartz glass substrate with a refractive index of 1.47 is used as the coma aberration correcting element 753 based on the eighth embodiment, the surrounding medium is air (refractive index: 1), and light with a wavelength of 405 nm is incident. The quartz glass substrate is processed such that the distribution of the phase difference of the X-Y plane having the point $O_a$ of the first coma aberration correction plate 751 as the origin (x, y) and the distribution of the phase difference of the X-Y plane having the point $O_b$ of the second coma aberration correction plate 752 as the origin (x, y)=(0, 0) become as follows on the basis of expressions (14a) and (14b), respectively $J = t_A = t_B = 0$ $f_{9T}(x,y) = Gx^2(x^2 + Hy^2),$ $g_{9T}(x,y) = -f_{9T}(x,y),$ and $G = 9.0 \times 10^{-4}$ [mm$^{-3}$] and H=2 are set.

Figure 27:
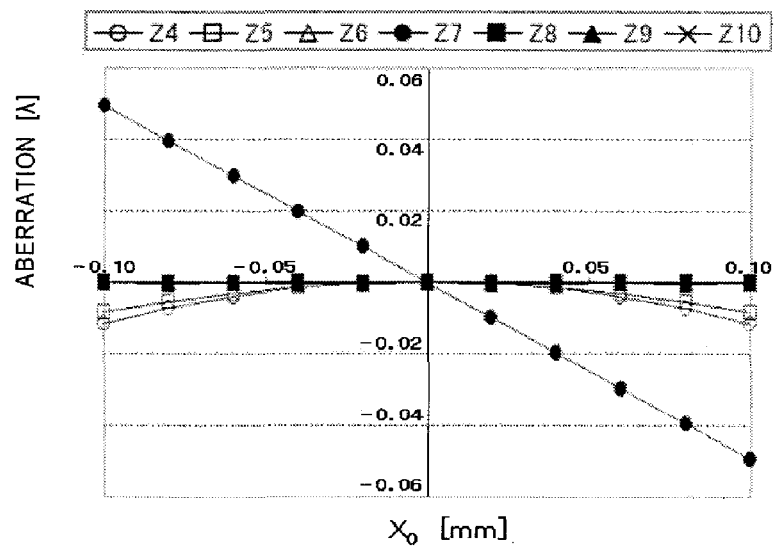
FIG. 27 is a graph showing various kinds of aberrations with respect to the amount of displacement ($x_0$) in an eighth example.

The calculation result of the amount of aberration [λ] occurring when the first coma aberration correction plate 751 is displaced along the X direction in a range of +0.1 mm to −0.1 mm from the optical axis (each amount of displacement $|x_0|$ is the same) assuming that the wavelength of light incident in the Z direction is 405 nm and the effective diameter of the effective region where light is incident on the coma aberration correcting element 753 is 2 mmφ is shown in FIG. 27. From FIG. 27, the coma aberration correcting element of this example generates the coma aberration which is proportional to the amount of displacement and symmetrical with the X direction as an axis. In this way, the coma aberration occurring in the optical system can be accurately corrected by adjusting the amount of displacement ($x_0$).

Ninth Example

In a ninth example, the first astigmatism correction plate 756 and the second astigmatism correction plate 757 based on FIG. 15 are considered as the astigmatism correcting element 758 based on the ninth embodiment. A quartz glass substrate with a refractive index $n_s = 1.47$ is used, the surrounding medium is air (refractive index: 1), and light with a wavelength of 405 nm is incident. The quartz glass substrate is processed such that the distribution of the phase difference of the X-Y plane having the point $O_a$ of the first astigmatism correction plate 756 of the astigmatism correcting element 758 as the origin (x, y)=(0, 0) and the distribution of the phase difference of the X-Y plane having the point $O_b$ of the second astigmatism correction plate 757 as the origin (x, y)=(0, 0) become as follows on the basis of expressions (15a) and (15b), respectively $f_U(x,y) = AU(x),$ (U(x): step function which is 1 when x≧0 and 0 when x<0)

$g_U(x,y) = -f_U(x,y),$ and $A = 9.4 \times 10^{-5}$ [mm$^{-2}$] is set.

Figure 28:
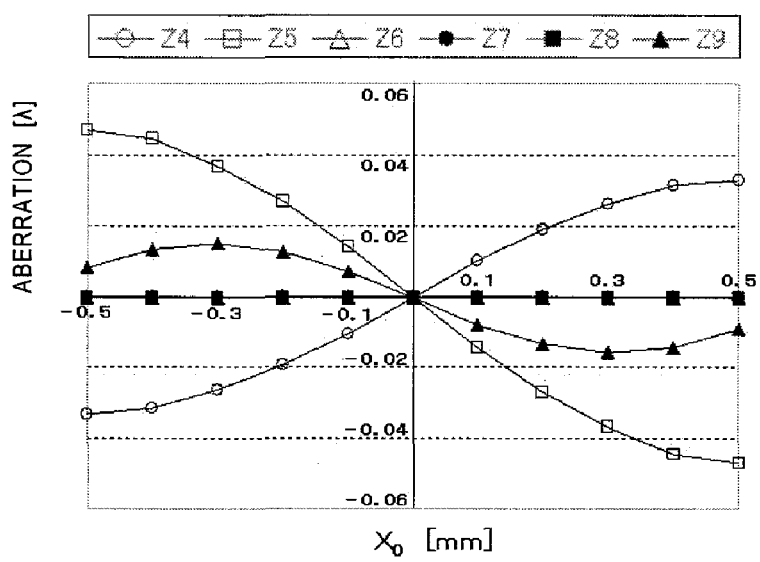
FIG. 28 is a graph showing various kinds of aberrations with respect to the amount of displacement ($x_0$) in a ninth example.

The calculation result of the amount of aberration [λ] occurring when the first astigmatism correction plate 756 is displaced along the X direction in a range of +0.5 mm to −0.5 mm from the optical axis and the second astigmatism correction plate 757 is displaced along the X direction in a range of −0.5 mm to +0.5 mm from the optical axis (each amount of displacement $|x_0|$ is the same) assuming that the wavelength of light incident in the Z direction is 660 nm and the effective diameter of the effective region where light is incident on the astigmatism correcting element 758 is 2 mmφ is shown in FIG. 28. From FIG. 28, the astigmatism correcting element of this example generates the astigmatism proportional to the amount of displacement. As other aberration components, defocusing (Z4) or the spherical aberration (Z9) occurs. However, when there are movable collimator lens and focusing lens in the optical system, correction of these components (Z4 and Z9) is possible. Accordingly, an aberration increase can be suppressed. Therefore, the astigmatism occurring in the optical system can be accurately corrected by adjusting the amount of displacement ($x_0$).

Tenth Example

In a tenth example, the aberration correcting device 795 using the astigmatism correcting element 793 based on the tenth embodiment is considered. The first astigmatism correcting element 791 and the second astigmatism correcting element 792 of the astigmatism correcting elements 793 are manufactured. First, a red resist containing an organic pigment is applied on a flat quartz glass substrate (not shown) by spin coating. In this case, the organic pigment has a characteristic that the absorption end defined by a wavelength exceeding an absorption coefficient of 0.01 for the first time at 650 nm or less is 590 nm, and the refractive index of the red resist with respect to light with a wavelength of 650 nm is 1.654 and the refractive index of the red resist with respect to light with a wavelength of 790 nm is 1.626. Then, the applied red resist is cured by UV light, and the UV cured film is processed to have an uneven shape by photolithography and etching.

Then, a resin material which has a refractive index of 1.654 for the light with a wavelength of 650 nm and a refractive index of 1.644 for the light with a wavelength of 790 nm is filled on the formed uneven surface. In this case, the resin material is interposed between the uneven surface and a flat quartz glass substrate which is optically isotropic so that the resin material is flattened. In addition, the resin material is equivalent to the first aberration correcting section, and the film formed by the red resist containing the organic pigment is equivalent to the second aberration correcting section. As a result, a phase difference does not occur for the light with a wavelength of 650 nm whose refractive indices between these materials are the same. On the other hand, by forming the uneven shape as a shape in which the distribution of the phase difference with respect to the light with a wavelength of 790 nm can be aberration-corrected, the aberration correction becomes possible by selecting the wavelength of incident light with the aberration correcting device 795 using the first astigmatism correcting element 791 and the second astigmatism correcting element 792 manufactured in this way.

Comparative Example

As a comparative example, the case using a conventional aberration correcting device is considered. At this time, a case is considered in which two coma aberration correction plates are disposed in parallel, a quartz glass substrate with a refractive index $n_s=1.47$ is used as the coma aberration correction plate, the surrounding medium is air (refractive index: 1), and light with a wavelength of 405 nm is incident. The quartz glass substrate is processed such that the distribution of the phase difference of the X-Y plane having the origin $(x, y)=(0, 0)$ of one of the two coma aberration correction plates is set as follows $$f_5(x,y)=(ax)^4-(bx)^2,$$

and the distribution of the phase difference of the X-Y plane having the origin $(x, y)=(0, 0)$ of the other coma aberration correction plate is set as follows $$g_5(x,y)=-f_5(x,y),$$

and $a=1.03\times10^{-1}$ [mm$^{-3/4}$] and $b=2.122\times10^{-2}$ [mm$^{-1/2}$] are set.

Figure 29:
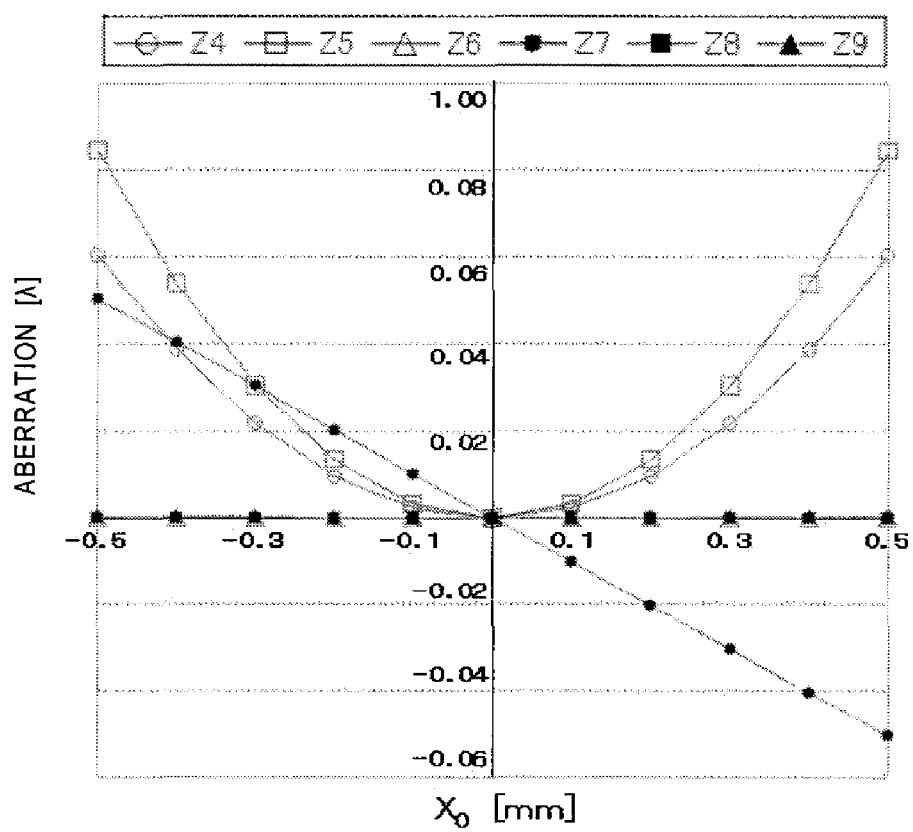
FIG. 29 is a graph showing various kinds of aberrations with respect to the amount of displacement ($x_0$) in a comparative example.

The calculation result of the amount of aberration [λ] occurring when only one coma aberration correction plate is displaced by $(x_0)$ along the X direction in a range of +0.5 mm to −0.5 mm from the optical axis assuming that the wavelength of light incident in the Z direction is 405 nm and the effective diameter of the effective region where light is incident on the two coma aberration correction plates is 2 mmφ is shown in FIG. 29. The coma aberration correcting element of the comparative example generates the coma aberration (Z7) proportional to the amount of displacement, but a defocusing component and the astigmatism of the aberration components occur as the amount of displacement increases. Accordingly, it can be seen that the correction accuracy of the aberration occurring in the optical system is not improved.

While the present invention has been described in detail with reference to the specific embodiments, it is apparent to those skilled in the art that various changes and modifications may be made without departing from the spirit and scope of the present invention.

The present invention is based on Japanese Patent Application No. 2008-281615 filed on Oct. 31, 2008, Japanese Patent Application No. 2008-310927 filed on Dec. 5, 2008, Japanese Patent Application No. 2009-068414 filed on Mar. 19, 2009, and Japanese Patent Application No. 2009-151262 filed on Jun. 25, 2009, the entire content of which is incorporated herein by reference.

Industrial Applicability

The present invention is useful because it can accurately correct the aberration occurring in a device of an optical system formed by assembly and adjustment of optical components, such as an optical head device which performs recording reading for an optical disc, without a large error.

Reference Signs List 100, 130, 200, 300, 400, 720, 740, 745, 750, 755, 795, 870, 930, 1030, 1040, 1130, 1140: aberration correcting device
110, 140: aberration correcting element
111, 141, 1031, 1131a, 1141a: first aberration correction plate
112, 142, 1032a, 1032b, 1131b, 1141b: second aberration correction plate
120, 150, 220, 330, 430, 730, 741, 749, 754, 759, 796: position adjusting section
151: first position adjusting section
152: second position adjusting section
160: optical element
210, 748, 758, 793: astigmatism correcting element
211, 211c, 211d, 211t, 311, 746, 756, 791: first astigmatism correction plate
212, 312, 747, 757, 792: second astigmatism correction plate
310: first astigmatism correcting element
320, 420: second astigmatism correcting element
321, 421: third astigmatism correction plate
322, 422: fourth astigmatism correction plate
753: coma aberration correcting element
751: first coma aberration correction plate
752: second coma aberration correction plate
791a, 792a: first aberration correcting section
791b, 792b: second aberration correcting section
800, 900, 1000, 1100: optical head device
810, 911, 921, 1001, 1002: light source
821, 822, 912a, 912b, 922a, 922b, 1005: collimator lens
830, 913, 923, 1004: beam splitter
840, 914, 924, 1011, 1012: objective lens
850, 915, 925, 1020, 1021: optical disc
851, 915a, 925a, 1020a, 1021a: information recording surface
860, 916, 926, 1008: photodetector
910, 920: optical system
940, 1010: lens holder
1003, 1006: dichroic prism
1007: mirror

The invention claimed is:

1. An aberration correcting device, comprising:
an aberration correcting element which modulates a phase of incident light; and
a position adjusting section which moves the aberration correcting element in a direction perpendicular to an optical axis of the incident light,
wherein the aberration correcting element includes first and second aberration correction plates, each of which is disposed such that the phase of transmitted light beam differs with transmission position of the incident light beam with the same phase, and the aberration correcting element includes a reference arrangement which is an arrangement of the first and second aberration correction plates in which the light beams transmitted through the aberration correcting element have the same phase, and a point on the first aberration correction plate crossing the optical axis is a point $O_a$ and a point on the second aberration correction plate crossing the optical axis is a point $O_b$ in the reference arrangement, wherein the position adjusting section includes a mechanism which moves the first and second aberration correction plates in a direction perpendicular to the optical axis and the points $O_a$ and $O_b$ in opposite directions from the reference arrangement and/or a mechanism which rotates and moves the first and second aberration correction plates by the same angle in different directions from the reference arrangement with the points $O_a$ and $O_b$ as the center, wherein the aberration correcting element is an astigmatism correcting element which generates an astigmatism for the incident light, and the first aberration correction plate is a first astigmatism correction plate and the second aberration correction plate is a second astigmatism correction plate, when the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape in which the point $O_a$, on an X-Y plane perpendicular to the optical axis is the origin and a distribution function $f_u(x, y)$ of a phase difference, which is a difference between the phase of the light transmitted through the point $O_a$, and the phase of the light transmitted through an arbitrary position (x, y) of the first astigmatism correction plate, has a shape of a curved surface as follows $$f_U(x,y)=AU(x),$$

where A is a coefficient and U(x) is a step function which is 1 when x>0 and 0 when x<0, and the second astigmatism correction plate has a shape in which the point $O_b$ on the X-Y plane perpendicular to the optical axis is the origin and a distribution function $g_u(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_u(x,y)=-f_u(x/k,y/k), \text{ and}$$

the position adjusting section includes a mechanism which moves the first astigmatism correction plate by a distance $x_0$ along an X axis from the reference arrangement and moves the second astigmatism correction plate by a distance $k \times x_0$ in an opposite direction to the movement direction of the first astigmatism correction plate.

2. The aberration correcting device of claim 1, wherein the position adjusting section includes a mechanism which rotates and moves the astigmatism correcting element in a direction perpendicular to the optical axis in a range of 0° to 90° from the reference arrangement with the optical axis as the center.

3. The aberration correcting device of claim 1, wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light.

4. An optical head device, comprising:
a light source;
an objective lens which focuses light emitted from the light source on an information recording surface of an optical disc; and a photodetector which detects signal light reflected from the information recording surface of the optical disc,
wherein the aberration correcting device of claim 1 is disposed in the optical path between the light source and the objective lens.

5. An aberration correcting device, comprising:
an aberration correcting element which modulates a phase of incident light; and
a position adjusting section which moves the aberration correcting element in a direction perpendicular to an optical axis of the incident light,
wherein the aberration correcting element includes first and second aberration correction plates, each of which is disposed such that the phase of transmitted light beam differs with transmission position of the incident light beam with the same phase, and the aberration correcting element includes a reference arrangement which is an arrangement of the first and second aberration correction plates in which the light beams transmitted through the aberration correcting element have the same phase, and a point on the first aberration correction plate crossing the optical axis is a point $O_a$ and a point on the second aberration correction plate crossing the optical axis is a point $O_b$ in the reference arrangement,
wherein the position adjusting section includes a mechanism which moves the first and second aberration correction plates in a direction perpendicular to the optical axis and the points $O_a$ and $O_b$ in opposite directions from the reference arrangement and/or a mechanism which rotates and moves the first and second aberration correction plates by the same angle in different directions from the reference arrangement with the points $O_a$ and $O_b$ as a center, wherein the first and second aberration correction plates are astigmatism correction plates, and the mechanism moves and rotates the astigmatism correction plates in the direction perpendicular to the optical axis in a range of 0° to 90°.

6. The aberration correcting device of claim 5,
wherein the aberration correcting element is an astigmatism correcting element which generates an astigmatism for the incident light, and the first aberration correction plate is a first astigmatism correction plate and the second aberration correction plate is a second astigmatism correction plate,
when the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape of a curved surface in which the point $O_a$ on an X-Y plane perpendicular to the optical axis is the origin and a distribution function $f_{1T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{1T}(x,y)=ax^3+bxy^2+t_Ax+t_By,$$

a/b=−⅓ where a, b, $t_A$, and $t_B$ are coefficients,
or has a shape obtained by approximating the curved surface to a step shape, and the second astigmatism correction plate has a shape of a curved surface in which the point $O_b$ on the X-Y plane perpendicular to the optical axis is the origin and a distribution function $g_{1T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{1T}(x,Y)=-f_{1T}(x/k,y/k),$$

or has a shape obtained by approximating the curved surface to a step shape, and the position adjusting section includes a mechanism which moves the first astigmatism correction plate by a distance $x_0$ along an X axis from the reference arrangement and moves the second astigmatism correction plate by a distance $k \times x_0$ in an opposite direction to the movement direction of the first astigmatism correction plate.

7. The aberration correcting device of claim 6, wherein the position adjusting section includes a mechanism which moves the first astigmatism correction plate by a distance $y_0$ along a Y axis from the reference arrangement and moves the second astigmatism correction plate by a distance $k \times y_0$ in an opposite direction to the movement direction of the first astigmatism correction plate.

8. The aberration correcting device of claim 6, wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light.

9. The aberration correcting device of claim 5, wherein the aberration correcting element is an astigmatism correcting element which generates an astigmatism for the incident light, and the first aberration correction plate is a first astigmatism correction plate and the second aberration correction plate is a second astigmatism correction plate, when the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape in which the point $O_a$ on an X-Y plane perpendicular to the optical axis is the origin and a distribution function $f_U(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_U(x,y)=AU(x),$$

where A is a coefficient and U(x) is a step function which is 1 when $x \geq 0$ and 0 when $x<0$, and the second astigmatism correction plate has a shape in which the point $O_b$ on the X-Y plane perpendicular to the optical axis is the origin and a distribution function $g_U(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_U(x,y)=-f_U(x/k,y/k), \text{ and}$$

the position adjusting section includes a mechanism which moves the first astigmatism correction plate by a distance $x_0$ along an X axis from the reference arrangement and moves the second astigmatism correction plate by a distance $k \times x_0$ in an opposite direction to the movement direction of the first astigmatism correction plate.

10. The aberration correcting device of claim 9, wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light.

11. The aberration correcting device of claim 5, wherein the aberration correcting element is an astigmatism correcting element which generates an astigmatism for the incident light, and the first aberration correction plate is a first astigmatism correction plate and the second aberration correction plate is a second astigmatism correction plate, when the effective diameter of light incident on the first astigmatism correction plate is $D_1$, the effective diameter of light incident on the second astigmatism correction plate is $D_2$, and $D_2/D_1$ is an effective diameter ratio k, the first astigmatism correction plate has a shape of a curved surface in which the point $O_a$ on an X-Y plane perpendicular to the optical axis is the origin and a distribution function $f_{7T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{7T}(x,y)=Dx^3+t_A x+t_B y,$$

where D $t_A$, and $t_B$ are coefficients, or has a shape obtained by approximating the curved surface to a step shape, and the second astigmatism correction plate has a shape of a curved surface in which the point $O_b$ on the X-Y plane perpendicular to the optical axis is the origin and a distribution function $g_{7T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{7T}(x,y)=-f_{7T}(x/k,y/k),$$

or has a shape obtained by approximating the curved surface to a step shape, and the position adjusting section includes a mechanism which moves the first astigmatism correction plate by a distance $x_0$ along an X axis from the reference arrangement and moves the second astigmatism correction plate by a distance $k \times x_0$ in an opposite direction to the movement direction of the first astigmatism correction plate.

12. The aberration correcting device of claim 11, wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light.

13. The aberration correcting device of claim 5, wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light.

14. An optical head device, comprising:
a light source;
an objective lens which focuses light emitted from the light source on an information recording surface of an optical disc; and
a photodetector which detects signal light reflected from the information recording surface of the optical disc,
wherein the aberration correcting device of claim 5 is disposed in the optical path between the light source and the objective lens.

15. An aberration correcting device, comprising:
an aberration correcting element which modulates a phase of incident light; and
a position adjusting section which moves the aberration correcting element in a direction perpendicular to an optical axis of the incident light,
wherein the aberration correcting element includes two astigmatism correcting elements which generate an astigmatism for the incident light,
when the two astigmatism correcting elements are first and second astigmatism correcting elements, respectively, the first astigmatism correcting element includes a first astigmatism correction plate and a second astigmatism correction plate, and the second astigmatism correcting element includes a third astigmatism correction plate and a fourth astigmatism correction plate,
wherein, each of the astigmatism correction plates is disposed such that the phase of transmitted light beam differs with transmission position of the incident light beam with the same phase, and the aberration correcting element includes a reference arrangement which is an arrangement of the astigmatism correction plates in which the light beams transmitted through the astigmatism correcting elements have the same phase, and a point on the first astigmatism correction plate crossing the optical axis is a point $O_a$, and a point on the second astigmatism correction plate crossing the optical axis is a point $O_b$ in the reference arrangement,
wherein the position adjusting section includes a mechanism which moves the first and second astigmatism correction plates in a direction perpendicular to the optical axis and the points $O_a$ and $O_b$ in opposite directions from the reference arrangement and/or a mechanism which rotates and moves the first and second astigmatism correction plates by the same angle in different directions from the reference arrangement with the points $O_a$ and $O_b$ as a center.

16. The aberration correcting device of claim 15,
wherein the position adjusting section includes a mechanism which rotates and moves the astigmatism correcting element in a direction perpendicular to the optical axis in a range of 0° to 90° from the reference arrangement with the optical axis as the center.

17. The aberration correcting device of claim 15,
wherein when an effective diameter of light incident on the third astigmatism correction plate is $D_3$, the effective diameter of light incident on the fourth astigmatism correction plate is $D_4$, and $D_4/D_3$ is an effective diameter ratio k', the second astigmatism correcting element is disposed to have the same phase difference distribution in an arrangement rotated by (m×45)° on the X-Y plane perpendicular to the optical axis with respect to the first astigmatism correcting element with the optical axis as the center where m is 1, 3, 5, or 7, and
the position adjusting section includes a mechanism which moves the third astigmatism correction plate by a distance $x_0'$ along a direction, which forms an angle of the (m×45)° from the X axis, from the reference arrangement and moves the fourth astigmatism correction plate by a distance k'×$x_0'$ in an opposite direction to the movement direction of the third astigmatism correction plate.

18. The aberration correcting device of claim 15,
wherein the second astigmatism correcting element includes the third astigmatism correction plate with the same configuration as the first astigmatism correction plate and the fourth astigmatism correction plate with the same configuration as the second astigmatism correction plate,
wherein when an effective diameter of light incident on the third astigmatism correction plate is $D_3$, the effective diameter of light incident on the fourth astigmatism correction plate is $D_4$, and $D_4/D_3$ is an effective diameter ratio k', the second astigmatism correcting element is disposed to have the same phase difference distribution in an arrangement rotated by (m×45)° on the X-Y plane perpendicular to the optical axis with respect to the first astigmatism correcting element with the optical axis as the center where m is 1, 3, 5, or 7, and
the position adjusting section includes a mechanism which moves the third astigmatism correction plate by a distance $x_0'$ along a direction, which forms an angle of the (m×45)° from the X axis, from the reference arrangement and moves the fourth astigmatism correction plate by a distance k'×$x_0'$ in an opposite direction to the movement direction of the third astigmatism correction plate.

19. The aberration correcting device of claim 15,
wherein the second astigmatism correcting element is different from first the astigmatism correcting element,
the first astigmatism correcting element includes the first and second astigmatism correction plates,
in the second astigmatism correcting element, third and fourth astigmatism correction plates having a distribution in which the incident light beams with the same phase have different phases at transmission positions,
the effective diameter of light incident on the third astigmatism correction plate is set to $D_3$, the effective diameter of light incident on the fourth astigmatism correction plate is set to $D_4$, and $D_4/D_3$ is set to an effective diameter ratio k',
a reference arrangement which is an arrangement of the first and second astigmatism correction plates in which the light beams transmitted through the second astigmatism correcting element have the same phase is set,
wherein when a point on the third astigmatism correction plate crossing the optical axis is $O_d$ and a point on the fourth astigmatism correction plate crossing the optical axis is $O_e$ in the reference arrangement, the third astigmatism correction plate has a shape of a curved surface in which the point $O_d$ on an X-Y plane perpendicular to the optical axis is an origin and a distribution function $f_{2T}(x, y)$ of a phase difference, which is a difference between the phase of the light transmitted through the point $O_d$ and the phase of the light transmitted through an arbitrary position (x, y) of the third astigmatism correction plate, has a shape of a curved surface as follows $$f_{2T}(x,y)=Ax^2y+t_Ax+t_By$$

where A, $t_A$, and $t_B$ are coefficients, or has a shape obtained by approximating the curved surface to a step shape, and the fourth astigmatism correction plate has a shape of a curved surface in which the point $O_e$ on the X-Y plane perpendicular to the optical axis is the origin and a distribution function $g_{2T}(x, y)$ of a phase difference, which is a difference between the phase of the light transmitted through the point $O_e$ and the phase of the light transmitted through an arbitrary position (x, y) of the fourth astigmatism correction plate, has a shape of a curved surface as follows $$g_{2T}(x,y)=-f_{2T}(x/k,y/k)$$

or has a shape obtained by approximating the curved surface to a step shape, and the position adjusting section includes a mechanism which moves the third astigmatism correction plate by a distance $x_0'$ along an X axis from the reference arrangement and moves the fourth astigmatism correction plate by a distance $k' \times x_0'$ in an opposite direction to the movement direction of the third astigmatism correction plate.

20. The aberration correcting device of claim 15,
wherein the incident light includes light with a wavelength $\lambda_1$ and light with a wavelength $\lambda_2$ ($\lambda_1 \neq \lambda_2$), and
the aberration correcting element has the phase difference distribution for one of the light with a wavelength $\lambda_1$ and the light with a wavelength $\lambda_2$ and does not generate the phase difference for the other light.

21. An optical head device comprising:
a light source;
an objective lens which focuses light emitted from the light source on an information recording surface of an optical disc; and
a photodetector which detects signal light reflected from the information recording surface of the optical disc,
wherein the aberration correcting device of claim 15 is disposed in the optical path between the light source and the objective lens.

22. An aberration correcting device, comprising:
an aberration correcting element which modulates a phase of incident light; and
a position adjusting section which moves the aberration correcting element in a direction perpendicular to an optical axis of the incident light,
wherein the aberration correcting element includes first and second aberration correction plates, each of which is disposed such that the phase of transmitted light beam differs with transmission position of the incident light beam with the same phase,
wherein the aberration correcting element includes a reference arrangement which is an arrangement of the first and second aberration correction plates in which the light beams transmitted through the aberration correcting element have the same phase is set, and a point on the first aberration correction plate crossing the optical axis is a point $O_a$ and a point on the second aberration correction plate crossing the optical axis is a point $O_b$ in the reference arrangement,
wherein the position adjusting section includes a mechanism which moves the first aberration correction plate or the second aberration correction plate in a direction perpendicular to the optical axis along the X-axis and/or Y-axis,
wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $\lambda_2$ and does not generate the phase difference for the other light, and
wherein an effective diameter of light incident on the first aberration correction plate is set to $D_1$, the effective diameter of light incident on the second aberration correction plate is set to $D_2$, and $D_2/D_1$ is set to an effective diameter ratio k.

23. The aberration correcting device of claim 22,
wherein the position adjusting section includes a mechanism which rotates and moves the astigmatism correcting element in a direction perpendicular to the optical axis in a range of 0° to 90° from the reference arrangement with the optical axis as the center.

24. The aberration correcting device of claim 22,
wherein when a point on the first astigmatism correction plate crossing the optical axis is $O_a$ and a point on the second astigmatism correction plate crossing the optical axis is $O_b$ in the reference arrangement, the first astigmatism correction plate has a shape of a curved surface in which the point $O_a$ on an X-Y plane perpendicular to the optical axis is the origin and a distribution function $f_{1T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{1T}(x,y)=ax^3+bxy^2+t_Ax+t_By,$$

a/b=−⅓, where a, b, $t_A$, and $t_B$ are coefficients, or has a shape obtained by approximating the curved surface to a step shape, and the second astigmatism correction plate has a shape of a curved surface in which the point $O_b$ on the X-Y plane perpendicular to the optical axis is the origin and a distribution function $g_{1T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{1T}(x,y)=-f_{1T}(x/k,y/k),$$

or has a shape obtained by approximating the curved surface to a step shape, and
wherein the position adjusting section includes a mechanism which can move either the first astigmatism correction plate or the second astigmatism correction plate in a direction perpendicular to the optical axis and along X-axis and Y-axis directions.

25. The aberration correcting device of claim 22,
wherein the first and second aberration correcting plates are first and second astigmatism correction plates,
wherein when a point on the first astigmatism correction plate crossing the optical axis is $O_a$ and a point on the second astigmatism correction plate crossing the optical axis is $O_b$ in the reference arrangement, the first astigmatism correction plate has a shape of a curved surface in which the point $O_a$ on an X-Y plane perpendicular to the optical axis is the origin and a distribution function $f_{7T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{7T}(x,y)=Dx^3+t_Ax+t_By,$$

where D, $t_A$, and $t_B$ are coefficients, or has a shape obtained by approximating the curved surface to a step shape, and the second astigmatism correction plate has a shape of a curved surface in which the point $O_b$ on the X-Y plane perpendicular to the optical axis is the origin and a distribution function $g_{7T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{7T}(x,y) = -f_{7T}(x/k, y/k),$$

or has a shape obtained by approximating the curved surface to a step shape, and the position adjusting section includes a mechanism which can move either the first astigmatism correction plate or the second astigmatism correction plate in a direction perpendicular to the optical axis and along an X-axis direction.

26. The aberration correcting device of claim 22, wherein the first and second aberration correcting plates are first and second astigmatism correction plates, the effective diameter of light incident on the first astigmatism correction plate is set to $D_1$, the effective diameter of light incident on the second astigmatism correction plate is set to $D_2$, and $D_2/D_1$ is set to an effective diameter ratio k, wherein when a point on the first astigmatism correction plate crossing the optical axis is $O_a$ and a point on the second astigmatism correction plate crossing the optical axis is $O_b$ in the reference arrangement, the first astigmatism correction plate has a shape of a curved surface in which the point $O_a$ on an X-Y plane perpendicular to the optical axis is an origin and a distribution function $f_{8T}(x, y)$ of a phase difference, which is a difference between the phase of the light transmitted through the point $O_a$ and the phase of the light transmitted through an arbitrary position (x, y) of the first astigmatism correction plate, has a shape of a curved surface as follows $$f_{8T}(x,y) = Ex^2 y + Fx^2 + t_A x + t_B y,$$

where E, F, $t_A$, and $t_B$ are coefficients, or has a shape obtained by approximating the curved surface to a step shape, and the second astigmatism correction plate has a shape of a curved surface in which the point $O_b$ on the X-Y plane perpendicular to the optical axis is the origin and a distribution function $g_{8T}(x, y)$ of a phase difference, which is a difference between the phase of the light transmitted through the point $O_b$ and the phase of the light transmitted through an arbitrary position (x, y) of the second astigmatism correction plate, has a shape of a curved surface as follows $$g_{8T}(x,y) = -f_{8T}(x/k, y/k),$$

or has a shape obtained by approximating the curved surface to a step shape, and wherein the position adjusting section includes a mechanism which can move either the first astigmatism correction plate or the second astigmatism correction plate in a direction perpendicular to the optical axis and along an X-axis direction.

27. The aberration correcting device of claim 22, wherein the first and second aberration corretion plates are first and second coma aberration correction plates, wherein when a point on the first coma aberration correction plate crossing the optical axis is $O_a$ and a point on the second coma aberration correction plate crossing the optical axis is $O_b$ in the reference arrangement, the first coma aberration correction plate has a shape of a curved surface in which the point $O_a$ on an X-Y plane perpendicular to the optical axis is the origin and a distribution function $f_{9T}(x, y)$ of a phase difference, which is a difference between the phase of the light transmitted through the point $O_a$ and the phase of the light transmitted through an arbitrary position (x, y) of the first coma aberration correction plate, has a shape of a curved surface as follows $$f_{9T}(x,y) = Gx^2(x^2 + Hy^2) + Jx^2 + t_A x + t_B y,$$

where G, H, J, $t_A$, and $t_B$ are coefficients, or has a shape obtained by approximating the curved surface to a step shape, and the second coma aberration correction plate has a shape of a curved surface in which the point $O_b$ on the X-Y plane perpendicular to the optical axis is the origin and a distribution function $g_{9T}(x, y)$ of a phase difference, which is a difference between the phase of the light transmitted through the point $O_b$ and the phase of the light transmitted through an arbitrary position (x, y) of the second coma aberration correction plate, has a shape of a curved surface as follows $$g_{9T}(x,y) = -f_{9T}(x/k, y/k),$$

or has a shape obtained by approximating the curved surface to a step shape, and wherein the position adjusting section includes a mechanism which can move either the first coma aberration correction plate or the second coma aberration correction plate in a direction perpendicular to the optical axis and along an X-axis direction.

28. An optical head device, comprising:

a light source;

an objective lens which focuses light emitted from the light source on an information recording surface of an optical disc; and a photodetector which detects signal light reflected from the information recording surface of the optical disc, wherein the aberration correcting device of claim 22 is disposed in the optical path between the light source and the objective lens.

29. An aberration correcting device, comprising:

an aberration correcting element which modulates a phase of incident light; and a position adjusting section which moves the aberration correcting element in a direction perpendicular to an optical axis of the incident light, wherein the aberration correcting element includes first and second aberration correction plates, each of which is disposed such that the phase of transmitted light beam differs with transmission position of the incident light beam with the same phase, and the aberration correcting element includes a reference arrangement which is an arrangement of the first and second aberration correction plates in which the light beams transmitted through the aberration correcting element have the same phase, and a point on the first aberration correction plate crossing the optical axis is a point $O_a$ and a point on the second aberration correction plate crossing the optical axis is a point $O_b$ in the reference arrangement, wherein the position adjusting section includes a mechanism which moves the first and second aberration correction plates in a direction perpendicular to the optical axis and the points $O_a$ and $O_b$ in opposite directions from the reference arrangement and/or a mechanism which rotates and moves the first and second aberration correction plates by the same angle in different directions from the reference arrangement with the points $O_a$ and $O_b$ as a center, and wherein the incident light includes light with a wavelength $\lambda_1$ and light with a wavelength $\lambda_2$ ($\lambda_1 \neq \lambda_2$), and the aberration correcting element has the phase difference distribution for one of the light with a wavelength $\lambda_1$ and the light with a wavelength $X_2$ and does not generate the phase difference for the other light.

30. An optical head device, comprising:

a light source;

an objective lens which focuses light emitted from the light source on an information recording surface of an optical disc; and a photodetector which detects signal light reflected from the information recording surface of the optical disc, wherein the aberration correcting device of claim 29 is disposed in the optical path between the light source and the objective lens.

31. The aberration correcting device of claim 29, wherein the first and second aberration correction plates are astigmatism correction plates, and the mechanism rotates and moves the astigmatism correction plates in the direction perpendicular to the optical axis in a range of 0° to 90°.

* * * * *